US012112716B2

(12) United States Patent
Li et al.

(10) Patent No.: US 12,112,716 B2
(45) Date of Patent: Oct. 8, 2024

(54) METHOD FOR DRIVING PIXEL MATRIX AND DISPLAY DEVICE

(71) Applicant: Xianyang Caihong Optoelectronics Technology Co., Ltd, Xianyang (CN)

(72) Inventors: Zhuo Li, Xianyang (CN); Yuan-Liang Wu, Xianyang (CN); Haiyan Kang, Xianyang (CN); Yusheng Huang, Xianyang (CN); Yuyeh Chen, Xianyang (CN)

(73) Assignee: Xianyang Caihong Optoelectronics Technology Co., Ltd, Xianyang (CN)

( * ) Notice: Subject to any disclaimer, the term of this patent is extended or adjusted under 35 U.S.C. 154(b) by 526 days.

(21) Appl. No.: 17/218,412

(22) Filed: Mar. 31, 2021

(65) Prior Publication Data

US 2021/0217373 A1 Jul. 15, 2021

Related U.S. Application Data

(62) Division of application No. 16/391,516, filed on Apr. 23, 2019, now Pat. No. 10,997,932.

(51) Int. Cl.
*G09G 3/36* (2006.01)

(52) U.S. Cl.
CPC ......... *G09G 3/3607* (2013.01); *G09G 3/3614* (2013.01); *G09G 3/3674* (2013.01); *G09G 3/3685* (2013.01); *G09G 3/3696* (2013.01); *G09G 2310/08* (2013.01); *G09G 2320/0209* (2013.01); *G09G 2320/0233* (2013.01); *G09G 2320/0242* (2013.01)

(58) Field of Classification Search
CPC .. G09G 3/3607; G09G 3/3614; G09G 3/3674; G09G 3/3685; G09G 3/3696; G09G 2300/0426; G09G 2320/0209; G09G 2320/0233; G09G 2320/0242; G09G 2320/0673; G09G 2320/068
See application file for complete search history.

(56) References Cited

U.S. PATENT DOCUMENTS

2004/0012554 A1* 1/2004 Song .................. G02F 1/13624 345/92
2007/0176878 A1* 8/2007 Lee ...................... G09G 3/2011 345/98
2013/0050282 A1* 2/2013 Kim ........................ G09G 5/02 345/690

(Continued)

*Primary Examiner* — Stacy Khoo

(57) ABSTRACT

A method for driving a pixel matrix is provided, and the pixel matrix includes multiple sub-pixels arranged in a matrix. Voltages applied along any one of data lines change in polarity once every four sub-pixels or every two sub-pixels, any one of the data lines controls voltage inputs of sub-pixel respectively connected to two sides thereof or controls voltage inputs of two sub-pixels both connected to one side thereof. The method includes: receiving an image data and acquiring original pixel data according to the image data; generating a first driving voltage and a second driving voltage according to the original pixel data; and loading the first driving voltage or the second driving voltage to the pixel matrix along any one of the data lines. The invention also provides a display device corresponding to the method. The invention can avoid crosstalk, bright dark lines and improve display effect.

12 Claims, 28 Drawing Sheets

(56) References Cited

U.S. PATENT DOCUMENTS

| | | | | |
|---|---|---|---|---|
| 2013/0169619 | A1* | 7/2013 | Jeong | G09G 5/001 345/212 |
| 2016/0093258 | A1* | 3/2016 | Ahn | G09G 3/3688 345/96 |
| 2016/0133214 | A1* | 5/2016 | Kwon | G09G 3/3614 345/87 |
| 2018/0197495 | A1* | 7/2018 | Xu | G09G 3/3655 |
| 2020/0225527 | A1* | 7/2020 | Long | G02F 1/13624 |
| 2020/0372869 | A1* | 11/2020 | Yang | G09G 3/3688 |
| 2020/0372870 | A1* | 11/2020 | Chen | G09G 3/3688 |

* cited by examiner

METHOD FOR DRIVING PIXEL MATRIX AND DISPLAY DEVICE

CROSS-REFERENCE TO RELATED APPLICATION

This application is a division of U.S. patent application Ser. No. 16/391,516, filed on Apr. 23, 2019, the disclosure of which is incorporated herein by reference in its entirety.

FIELD OF THE DISCLOSURE

The present invention relates to the field of pixel matrix display technologies, and in particular to a method for driving a pixel matrix and a display device.

BACKGROUND OF THE DISCLOSURE

VA type liquid crystal panels are widely used in current display products. At present, VA type panels are mainly divided into two types, one is Multi-domain Vertical Alignment (MVA) type, and the other is Patterned Vertical Alignment (PVA) type. The principle of MVA technology is to add protrusions to form multiple visible areas. The liquid crystal molecules are not completely vertically aligned in the static state, and the liquid crystal molecules are horizontally arranged after the voltage is applied, so that the light can pass through the layers. PVA is an image vertical adjustment technology that directly changes the structure of the liquid crystal cell, so that the display performance can be greatly improved to obtain brightness output and contrast superior to MVA.

However, in the existing 4-domain VA technology, with the adjustment of the viewing angle, the structure of the VA-type liquid crystal display panel is prone to color washout at a large viewing angle, so that the displayed image is easily distorted, especially the performance of the character's skin color tends to be lighter blue or brighter white. See FIG. 1, as the viewing angle increases (0°, 45°, 60°), the color washout phenomenon becomes more serious. In the 4-domain arrangement, the sub-pixel polarity is affected, which causes crosstalk and bright dark lines, and the display effect is poor.

SUMMARY OF THE DISCLOSURE

In order to solve the above problems in the prior art, the present invention provides a method for driving a pixel matrix and a corresponding display device that solve the color washout phenomenon and improve the display effect.

Specifically, embodiments of the present invention provide a method for driving a pixel matrix, the pixel matrix includes a plurality of sub-pixels arranged in a matrix, wherein voltages applied along any one of data lines change in polarity once every four sub-pixels or every two sub-pixels; any one of the data lines controls voltage inputs of sub-pixels in a scan line direction and respectively connected to two sides of the data line, or controls voltage inputs of two sub-pixels in the scan line direction and both connected to one side of the data line; the method includes: receiving an image data, and acquiring original pixel data according to the image data; generating a first driving voltage and a second driving voltage according to the original pixel data; and loading the first driving voltage or the second driving voltage to the pixel matrix along each of the data lines.

In a specific embodiment, the step of generating a first driving voltage and a second driving voltage according to the original pixel data includes: obtaining a first gray scale data and a second gray scale data according to the original pixel data; and generating the first driving voltage corresponding to the first gray scale data and the second driving voltage corresponding to the second gray scale data, according to the first gray scale data and the second gray scale data.

In a specific embodiment, the step of obtaining a first gray scale data and a second gray scale data according to the original pixel data includes: obtaining an original gray scale value of each pixel position according to the original pixel data, and converting the original gray scale value of each pixel position into the first gray scale data or the second gray scale data according to a predetermined conversion manner.

In a specific embodiment, the step of generating a first driving voltage and a second driving voltage according to the original pixel data includes: obtaining an original data driving signal for each pixel position according to the original pixel data; and converting the original data driving signal into the first driving voltage or the second driving voltage according to a preset conversion rule.

In a specific embodiment, the step of obtaining an original data driving signal for each pixel position according to the original pixel data includes: obtaining an original gray scale value for each pixel position according to the original pixel data; and obtaining the original data driving signal according to the original gray scale value.

In a specific embodiment, the voltages applied along any one of the data lines change in polarity once every four sub-pixels, any one of the data lines controls voltage inputs of sub-pixels in the scan line direction and respectively connected to the two sides of the data line, and the sub-pixels in the scan line direction and respectively connected to the two sides of the data line have a same polarity; the step of loading the first driving voltage or the second driving voltage to the pixel matrix along any one of the data lines includes: loading the first driving voltage and the second driving voltage alternately as per every two sub-pixels along the data line; and loading the first driving voltage and the second driving voltage alternately as per every sub-pixel or loading the first driving voltage and the second driving voltage alternately as per every two sub-pixels, along the scan line direction.

In a specific embodiment, the voltages applied along any one of the data lines change in polarity once every four sub-pixels, any one of the data lines controls voltage inputs of the sub-pixels in the scan line direction and respectively connected to the two sides of the data line, and the sub-pixels in the scan line direction and respectively connected to the two sides of the data line have a same polarity; the step of loading the first driving voltage or the second driving voltage to the pixel matrix along any one of the data lines includes: loading the first driving voltage and the second driving voltage alternately as per every four sub-pixels along the data line; and loading the first driving voltage and the second driving voltage alternately as per every two sub-pixels along the scan line direction.

In a specific embodiment, the voltages applied along any one of the data lines change in polarity once every two sub-pixels, any one of the data lines controls voltage inputs of the sub-pixels in the scan line direction and respectively connected to the two sides of the data line, the sub-pixels in the scan line direction and respectively connected to the two sides of the data line have opposite polarities, the voltages applied to the sub-pixels in a data line direction change in polarity once every two sub-pixels, and the voltages applied to the sub-pixels along the scan line direction change in polarity once every two sub-pixels; the step of loading the first driving voltage or the second driving voltage to the pixel matrix along any one of the data lines includes: loading the first driving voltage and the second driving voltage alternately as per every sub-pixel along the data line direction; and loading the first driving voltage and the second driving voltage alternately as per every sub-pixel along the scan line direction.

In a specific embodiment, the voltages applied along any one of the data lines change in polarity once every two sub-pixels, any one of the data lines controls voltage inputs of the sub-pixels in the scan line direction and respectively connected to the two sides of the data line, the sub-pixels in the scan line direction and respectively connected to the two sides of the data line have opposite polarities, the voltages applied to the sub-pixels in a data line direction change in polarity once every two sub-pixels, and the voltages applied to the sub-pixels along the scan line direction change in polarity once every two sub-pixels; the step of loading the first driving voltage or the second driving voltage to the pixel matrix along any one of the data lines includes: loading the first driving voltage and the second driving voltage alternately as per every two sub-pixels along the data line direction; and loading the first driving voltage and the second driving voltage alternately as per every sub-pixel along the scan line direction.

In a specific embodiment, the voltages applied along any one of the data lines change in polarity once every two sub-pixels, any one of the data lines controls voltage inputs of the sub-pixels in the scan line direction and respectively connected to the two sides of the data line, the sub-pixels in the scan line direction and respectively connected to the two sides of the data line have opposite polarities; the step of loading the first driving voltage or the second driving voltage to the pixel matrix along any one of the data lines includes: loading the first driving voltage and the second driving voltage alternately as per every sub-pixel along a data line direction; and loading the first driving voltage and the second driving voltage alternately as per every sub-pixel along the scan line direction.

In a specific embodiment, the voltages applied along any one of the data lines change in polarity once every two sub-pixels, any one of the data lines controls voltage inputs of the sub-pixels in the scan line direction and respectively connected to the two sides of the data line, the sub-pixels in the scan line direction and respectively connected to the two sides of the data line have opposite polarities; the step of loading the first driving voltage or the second driving voltage to the pixel matrix along any one of the data lines includes: loading the first driving voltage and the second driving voltage alternately as per every two sub-pixels along a data line direction; and loading the first driving voltage and the second driving voltage alternately as per every sub-pixel along the scan line direction.

In a specific embodiment, the voltages applied along any one of the data lines change in polarity once every two sub-pixels, any one of the data lines controls voltage inputs of the sub-pixels in the scan line direction and respectively connected to the two sides of the data line, the sub-pixels in the scan line direction and respectively connected to the two sides of the data line have opposite polarities; the step of loading the first driving voltage or the second driving voltage to the pixel matrix along any one of the data lines includes: loading the first driving voltage and the second driving voltage alternately as per every sub-pixel along a data line direction; and loading the first driving voltage and the second driving voltage alternately as per every two sub-pixels along the scan line direction.

In a specific embodiment, the voltages applied along any one of the data lines change in polarity once every two sub-pixels, any one of the data lines controls voltage inputs of the two sub-pixels in the scan line direction and both connected to the one side of the data line, the two sub-pixels in the scan line direction and both connected to the one side of the data line have a same polarity; the step of loading the first driving voltage or the second driving voltage to the pixel matrix along any one of the data lines includes: loading the first driving voltage and the second driving voltage alternately as per every sub-pixel along a data line direction; and loading the first driving voltage and the second driving voltage alternately as per every sub-pixel along the scan line direction.

In a specific embodiment, the voltages applied along any one of the data lines change in polarity once every two sub-pixels, any one of the data lines controls voltage inputs of the two sub-pixels in the scan line direction and both connected to the one side of the data line, the two sub-pixels in the scan line direction and both connected to the one side of the data line have a same polarity; the step of loading the first driving voltage or the second driving voltage to the pixel matrix along any one of the data lines includes: loading the first driving voltage and the second driving voltage alternately as per every sub-pixel along a data line direction; and loading the first driving voltage and the second driving voltage alternately as per every two sub-pixels along the scan line direction.

In addition, a display device provided by an embodiment of the present invention includes a timing controller, a data driving unit, a scan driving unit and a pixel matrix, wherein in the pixel matrix, voltages applied along any one of data lines change in polarity once every four sub-pixels or every two sub-pixels, any one of the data lines controls voltage inputs of sub-pixels in a scan line direction and respectively connected to two sides of the data line or controls voltage inputs of two sub-pixels in the scan line direction and both connected to one side of the data line; the timing controller is individually connected to the data driving unit and the scan driving unit, and the data driving unit and the scan driving unit are individually connected to the pixel matrix; wherein the scan driving unit is configured to load a scan signal to the pixel matrix; and the timing controller is configured to receive an image data, acquire original pixel data according to the image data, and obtain a first gray scale data and a second gray scale data according to the original pixel data; and the data driving unit is configured to generate a first driving voltage corresponding to the first gray scale data and a second driving voltage corresponding to the second gray scale data according to the first gray scale data and the second gray scale data, and load the first driving voltage or the second driving voltage into the pixel matrix along any one of the data lines; or the timing controller is configured to receive an image data, acquire original pixel data according to the image data, and obtain an original data driving signal for each pixel position according to the original pixel data; and the data driving unit is configured to convert the original data driving signal into a first driving voltage or a second driving voltage according to a preset conversion rule, and load the first driving voltage or the second driving voltage into the pixel matrix along any one of the data lines.

In a specific embodiment, the voltages applied along any one of the data lines change in polarity once every four sub-pixels, any one of the data lines controls voltage inputs of the sub-pixels in the scan line direction and respectively connected to the two sides of the data line, and the sub-pixels in the scan line direction and respectively connected to the two sides of the data line have a same polarity; the data driving unit is specifically configured to: load the first driving voltage and the second driving voltage alternately as per every two sub-pixels along the data line, and load the first driving voltage and the second driving voltage alternately as per every sub-pixel or as per every two sub-pixels along the scan line direction; or, the data driving unit is specifically configured to: load the first driving voltage and the second driving voltage alternately as per every four sub-pixels along the data line, and load the first driving voltage and the second driving voltage alternately as per every two sub-pixels along the scan line direction.

In a specific embodiment, the voltages applied along any one of the data lines change in polarity once every two sub-pixels, any one of the data lines controls voltage inputs of the sub-pixels in the scan line direction and respectively connected to the two sides of the data line, the sub-pixels in the scan line direction and respectively connected to the two sides of the data line have opposite polarities, the voltages applied to the sub-pixels along a data line direction change in polarity once every two sub-pixels, and the voltages applied to the sub-pixels along the scan line direction change in polarity once every two sub-pixels; the data driving unit is specifically configured to: load the first driving voltage and the second driving voltage alternately as per every sub-pixel along the data line direction, and load the first driving voltage and the second driving voltage alternately as per every sub-pixel along the scan line direction; or load the first driving voltage and the second driving voltage alternately as per every two sub-pixels along the data line direction, and load the first driving voltage and the second driving voltage alternately as per every sub-pixel along the scan line direction.

In a specific embodiment, the voltages applied along any one of the data lines change in polarity once every two sub-pixels, any one of the data lines controls voltage inputs of the sub-pixels in the scan line direction and respectively connected to the two sides of the data line, the sub-pixels in the scan line direction and respectively connected to the two sides of the data line have opposite polarities; the data driving unit is specifically configured to: load the first driving voltage and the second driving voltage alternately as per every sub-pixel along the data line direction, and load the first driving voltage and the second driving voltage alternately as per every sub-pixel along the scan line direction; or load the first driving voltage and the second driving voltage alternately as per every two sub-pixels along the data line direction, and load the first driving voltage and the second driving voltage alternately as per every sub-pixel along the scan line direction; or load the first driving voltage and the second driving voltage alternately as per every sub-pixel along the data line direction, and load the first driving voltage and the second driving voltage alternately as per every two sub-pixels along the scan line direction.

In a specific embodiment, the voltages applied along any one of the data lines change in polarity once every two sub-pixels, any one of the data lines controls voltage inputs of the two sub-pixels in the scan line direction and both connected to the one side of the data line, the two sub-pixels in the scan line direction and both connected to the one side of the data line have a same polarity; the data driving unit is specifically configured to: load the first driving voltage and the second driving voltage alternately as per every sub-pixel along the data line direction, and load the first driving voltage and the second driving voltage alternately as per every sub-pixel along the scan line direction; or load the first driving voltage and the second driving voltage alternately as per every sub-pixel along the data line direction, and load the first driving voltage and the second driving voltage alternately as per every two sub-pixels along the scan line direction.

Compared with the prior art, the beneficial effects of the invention: the method for driving the pixel matrix and the display device of the embodiment of the invention combine the reasonable high gray scale voltage with the low gray scale voltage, so that the pixels in the pixel matrix are not affected by the polarity, thereby crosstalk, bright and dark lines and the like are avoided, and the display effect is improved.

DETAILED DESCRIPTION OF PREFERRED EMBODIMENTS

The present invention will be further described in detail below with reference to specific embodiments, but the embodiments of the present invention are not limited thereto.

Embodiment 1

Figure 1:
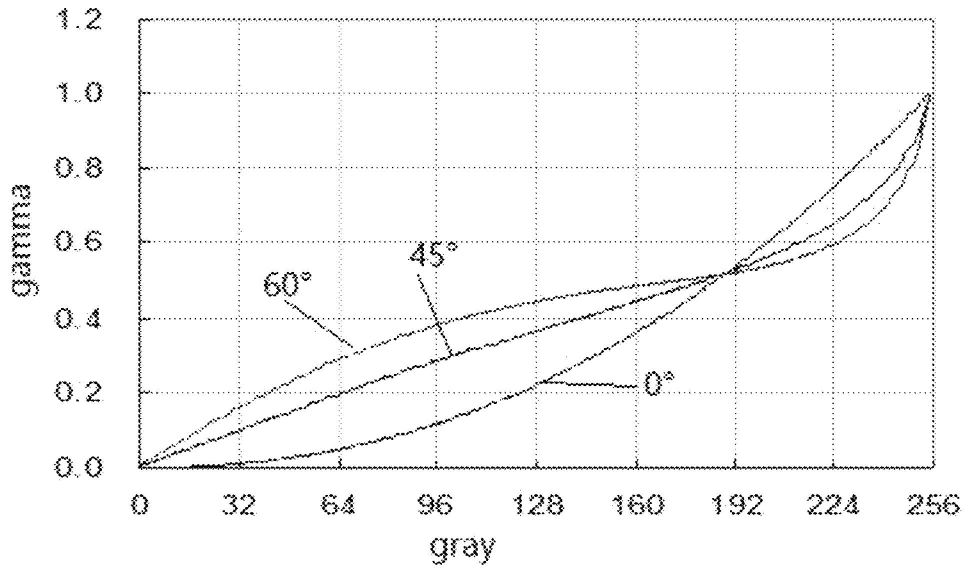
FIG. 1(Related Art)
FIG. 1 is a schematic diagram showing changes in viewing angle with gray scale in the related art.
Figure 2:
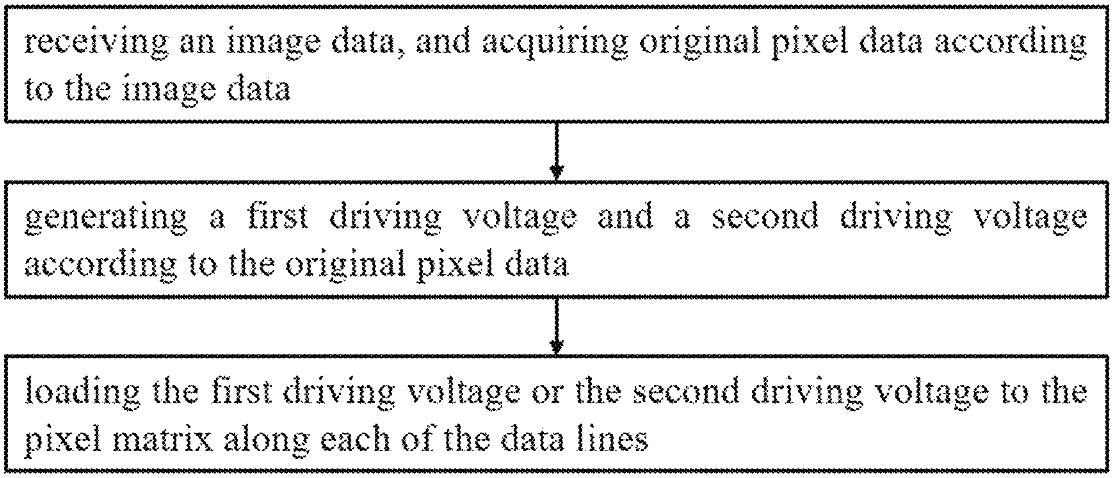
FIG. 2 is a flowchart of a method for driving a pixel matrix according to an embodiment of the present invention.

Referring to FIG. 2, FIG. 2 is a flowchart of a method for driving a pixel matrix according to an embodiment of the present invention. The method for driving the pixel matrix is applicable to displays currently having a pixel array, such as an LCD display, an LED display, an OLED display, and the like.

Further, the pixel matrix includes a plurality of sub-pixels arranged in a matrix, the voltages applied along any one of the data line change in polarity once every four sub-pixels, and any one of the data lines controls the voltage input of each sub-pixel on both sides thereof. In the direction of the data line, the voltage applied to the sub-pixel is changed once every two sub-pixels, and the voltage applied to the sub-pixels in the direction of the scan line is changed once every two sub-pixels. Specifically, for the sub-pixel polarity, both the scan line direction and the data line direction are 2N inverted, and the data line polarity inversion mode is 4N.

Figure 3:
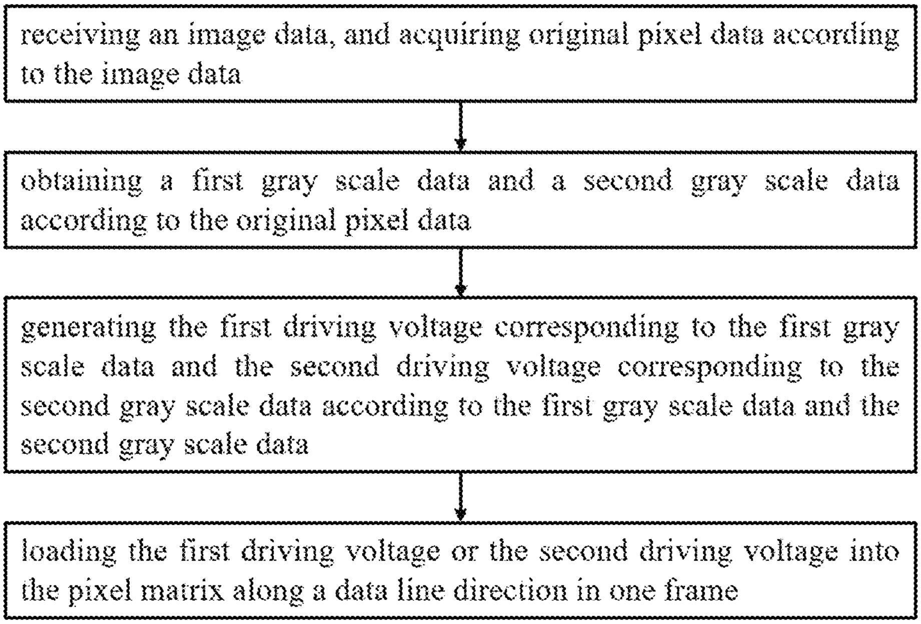
FIG. 3 is a flow chart of a specific implementation manner of the method for driving the pixel matrix shown in FIG. 2.

Specifically, referring to FIG. 3, the method may include the following steps:

Step 1, receiving an image data, and acquiring original pixel data according to the image data;

Step 2, obtaining a first gray scale data and a second gray scale data according to the original pixel data;

Step 3, generating the first driving voltage corresponding to the first gray scale data and the second driving voltage corresponding to the second gray scale data according to the first gray scale data and the second gray scale data;

Step 4, loading the first driving voltage or the second driving voltage into the pixel matrix along a data line direction in one frame.

Wherein, the image data refers to a digital signal input to the timing controller TCON, and the image data is input frame by frame, and the original pixel data is parsed by the image data. In one of the prior arts, the original pixel data, that is, a specific gray scale value corresponding to each sub-pixel in the pixel matrix corresponding to the display, the gray scale value input to each sub-pixel is directly determined by the image data input into the TCON, and the original pixel data is not processed. Such methods are affected by the polarity of the sub-pixels, which causes the sub-pixel polarity to easily cause crosstalk, bright and dark lines and other negative effects.

In this embodiment, by processing the original pixel data, further first gray scale data and second gray scale data are obtained, and the gray scales of the first gray scale data and the second gray scale data are different. Furthermore, the image is loaded into the corresponding sub-pixels at different intervals between different pixels or between different frames. The solution in this embodiment can generate two sets of different gray scales, respectively corresponding to different sub-pixels. In this way, it is possible to prevent the voltage applied to the sub-pixel from being affected by the polarity inversion, thereby avoiding the occurrence of crosstalk and bright and dark lines.

In a specific example, the first gray scale data is considered to be high gray scale data, and the second gray scale data is considered to be low gray scale data. Correspondingly, the magnitude of the voltage input to the sub-pixel is determined by the gray scale, the high gray scale voltage generated corresponding to the high gray scale data, that is, the first driving voltage; and the low gray scale voltage generated corresponding to the low gray scale data, that is, the second driving voltage. It is worth mentioning that the above-mentioned high gray scale and low gray scale represent the relative values of the gray scale sizes of the two groups, and the magnitude of the values is not separately limited.

Figure 4A:
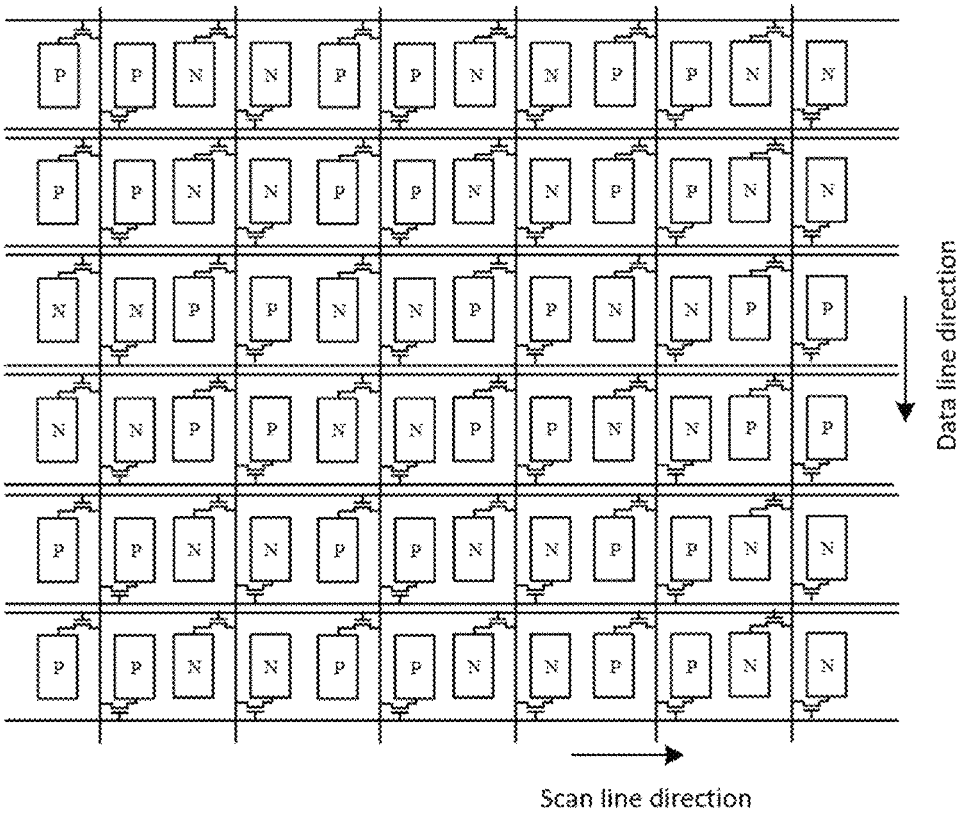
FIG. 4A is a schematic diagram of polarity loading of a pixel matrix according to a first embodiment of the present invention.

Referring to FIG. 4A, FIG. 4A is a schematic diagram of polarity loading of a pixel matrix according to an embodiment of the present invention. From a certain line, the two consecutive sub-pixels have the same polarity, and the next two consecutive sub-pixels have opposite polarities to the last two polarities, from a column, the two consecutive sub-pixels have the same polarity, and the next two sub-pixel polarities are opposite to the last two polarities, and so on. As a whole, the voltage applied to the sub-pixels is inverted once every two sub-pixels in the scan line direction, and the voltage applied to the sub-pixels is inverted once every two sub-pixels in the data line direction. In FIG. 4A, P represents a positive voltage and N represents a negative voltage. From a certain column, the polarity transformation can be expressed as PPNN . . . PPNN or NNPP . . . NNPP. From a certain line, the polarity transformation can be expressed as PPNN . . . PPNN or NNPP . . . NNPP.

In a specific embodiment, the step of obtaining a first gray scale data and a second gray scale data according to the original pixel data includes: obtaining an original gray scale value of each pixel position according to the original pixel data, and converting the original gray scale value of each pixel position into the first gray scale data or the second gray scale data according to a predetermined conversion manner.

After determining the gray scale corresponding to each pixel position according to the rule of the present invention, the timing controller adjusts the original gray scale correspondence of the pixel position to a high gray scale or a low gray scale, and transmits the adjusted gray scale value to the data driving unit, and the number driving unit outputs the corresponding voltage according to the gray scale value.

For example, the original gray scale value of the A position is 128 gray scale. If the above rule according to the present invention, the A position should output a high gray scale, that is, H, after calculation, in this example, 128 gray scale corresponding H=138 gray scale value, then output 138 gray scale to the A position, the data driving unit receives 138 gray scale, according to the established conversion rule, the voltage corresponding to 138 gray scale is 10V, and finally the voltage signal of 10V is output to the A position. Generally, the adjustment range of the high and low gray scales is determined by the difference of materials such as liquid crystal.

For another example, the original gray scale value of the B position is 128 gray scale. If the above rule is used according to the present invention, the B position should output a low gray scale, that is, L, after calculation, in this example, the 128 gray scale corresponds to the L=118 gray scale value, then the output is 118 gray scale to the B position, and the data driving unit receives the 118 gray scale, according to the established conversion rules, the voltage corresponding to the gray scale of 118 is 8V, and finally the voltage signal of 8V is output to the B position.

In a specific embodiment, the step of loading the first driving voltage or the second driving voltage to the pixel matrix along the data lines includes:

loading the first driving voltage or the second driving voltage to adjacent pixel sub-pixels to the pixel matrix in a data line direction; and loading the first driving voltage or the second driving voltage alternately to the adjacent pixel in the scan line direction to the pixel matrix. That is, the first driving voltage and the second driving voltage are alternately loaded for every two sub-pixels along the data line, and the gray scales on the adjacent sub-pixels on both sides of the data line are different. The gray scale on the adjacent sub-pixels on both sides of the data line is different, that is, when the adjacent sub-pixel on the left side of the data line is H, the adjacent sub-pixel on the right side of the data line is L, and vice versa.

The pixel matrix is physically divided into a plurality of small blocks arranged in a matrix by a plurality of interleaved data lines and scan lines, and each small block is one sub-pixel.

Figure 4B:
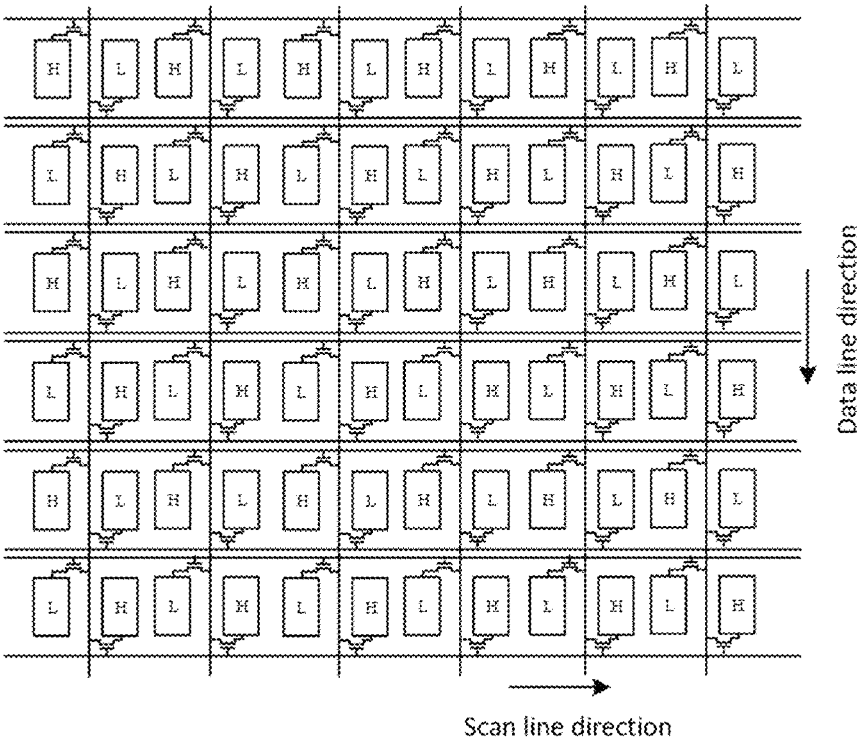
FIG. 4B is a schematic diagram of a gray matrix loading of a pixel matrix according to a first embodiment of the present invention.

For example, refer to FIG. 4B, which is a schematic diagram of a gray matrix loading of a pixel matrix according to an embodiment of the present invention. From a certain line, the gray-scale voltages loaded into the sub-pixels are alternately transformed, from a certain column, the gray-scale voltages loaded into the sub-pixels are alternately transformed, and so on. In FIG. 4B, H represents a high gray scale voltage, and L represents a low gray scale voltage. From a certain column, the gray scale transformation can be expressed as HLHL . . . HLHL or LHLH . . . LHLH. From a certain line, the gray scale transformation can be expressed as HLHL . . . HLHL or LHLH . . . LHLH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Embodiment 2

Figure 4C:
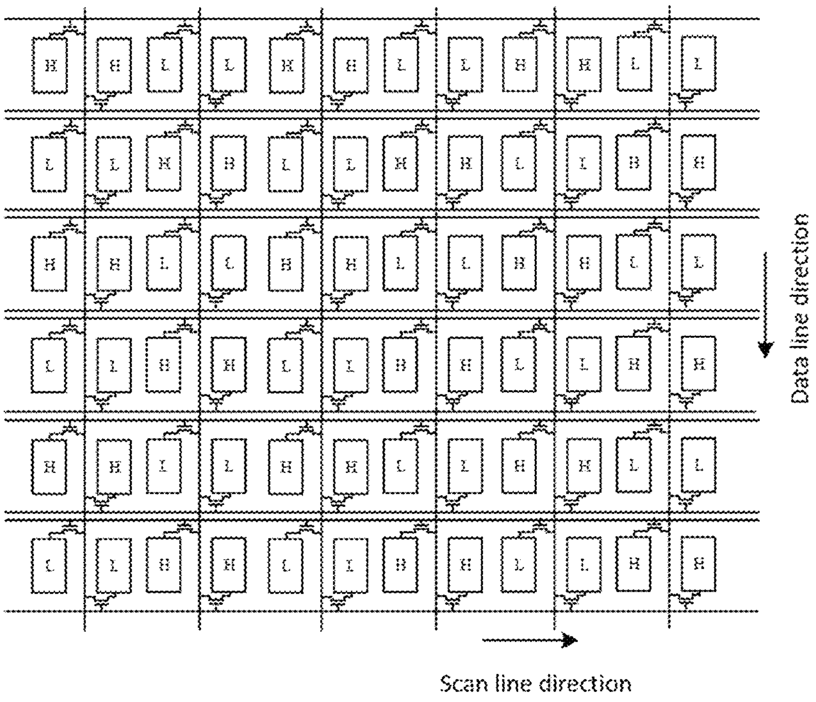
FIG. 4C is a schematic diagram of a gray matrix loading of a pixel matrix according to a second embodiment of the present invention.

For example, refer to FIG. 4C, which is a schematic diagram of another gray matrix loading of a pixel matrix according to an embodiment of the present invention. The step of loading the first driving voltage or the second driving voltage into the pixel matrix along a data line direction includes:

loading the first driving voltage and the second driving voltage alternately to adjacent sub-pixels along a data line direction, and gray scales on adjacent sub-pixels on both sides of the data line are the same; and loading the first driving voltage and the second driving voltage alternately to every two sub-pixels in the scan line direction.

The gray scale on the adjacent sub-pixels on both sides of the data line is the same, that is, when the adjacent sub-pixel on the left side of the data line is H, the adjacent sub-pixel on the right side of the data line is H, and vice versa.

From a certain column, the gray scale voltages applied to two consecutive sub-pixels are the same, and the gray scale voltages of two consecutive sub-pixels loaded are different from the previous two, from a certain line, the gray-scale voltages loaded into the sub-pixels alternately change, and so on. In FIG. 4C, H represents a high gray scale voltage, and L represents a low gray scale voltage. From a certain column, the gray scale transformation can be expressed as HLHL . . . HLHL or LHLH . . . LHLH. From a certain line, the gray scale transformation can be expressed as HHLL . . . HHLL or LLHH . . . LLHH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Figure 4D:
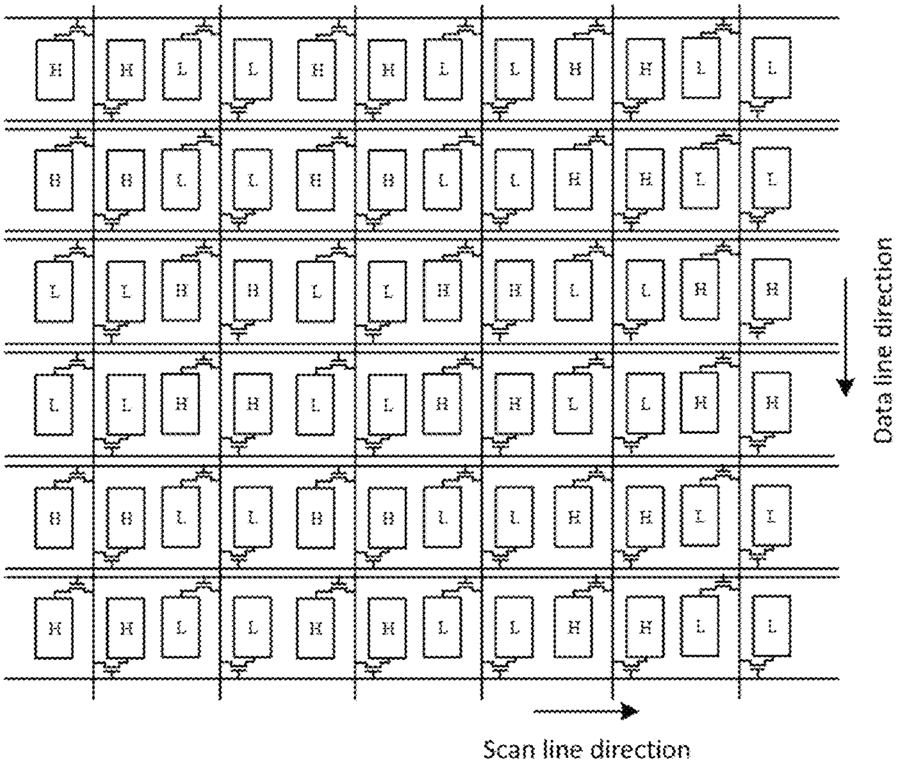
FIG. 4D is a schematic diagram of another gray matrix loading of a pixel matrix according to a second embodiment of the present invention.

For example, refer to FIG. 4D. FIG. 4D is a schematic diagram of another gray matrix loading of a pixel matrix according to an embodiment of the present invention. The step of loading the first driving voltage or the second driving voltage into the pixel matrix along a data line direction includes:

loading the first driving voltage and the second driving voltage alternately to every two sub-pixels along a data line direction, and gray scales on adjacent sub-pixels on both sides of the data line are the same; and loading the first driving voltage and the second driving voltage alternately to every two sub-pixels in the scan line direction.

The gray scale on the adjacent sub-pixels on both sides of the data line is the same, that is, when the adjacent sub-pixel on the left side of the data line is H, the adjacent sub-pixel on the right side of the data line is H, and vice versa. The first driving voltage and the second driving voltage are alternately loaded for every four sub-pixels along the data line.

From a certain line, the gray scale voltages of two consecutive sub-pixels are the same, and the gray scale voltages of two consecutive sub-pixels loaded are different from the previous two, from a certain column, the gray-scale voltages loaded into the sub-pixels are alternately transformed, and so on. In FIG. 4D, H represents a high gray scale voltage, and L represents a low gray scale voltage. From a certain column, the gray scale transformation can be expressed as HHLL . . . HHLL or LLHH . . . LLHH. From a certain line, the gray scale transformation can be expressed as HHLL . . . HHLL or LLHH . . . LLHH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Embodiment 3

Figure 5:
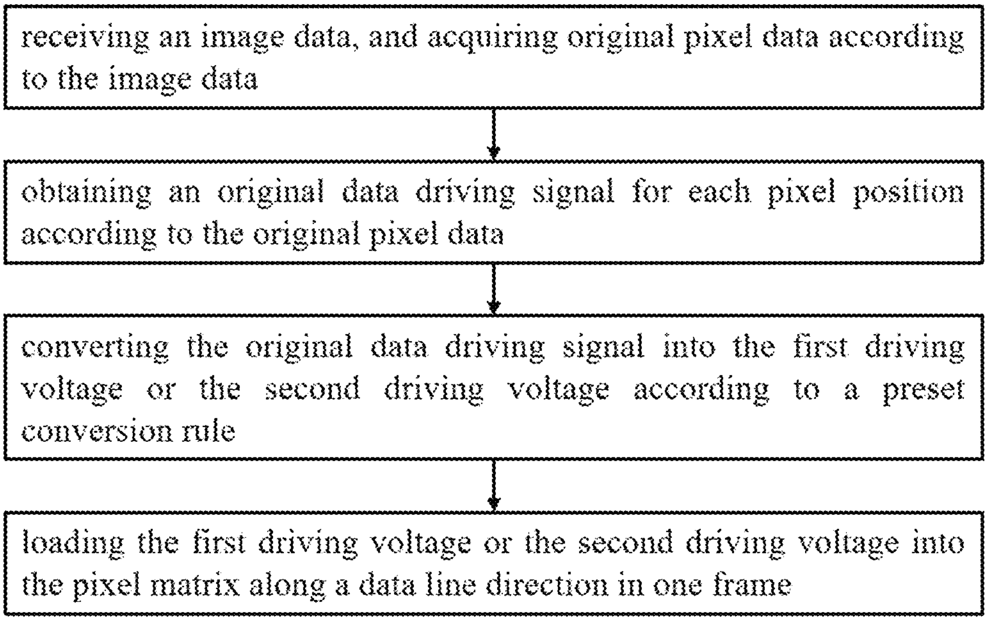
FIG. 5 is a flow chart of another specific implementation manner of the method for driving the pixel matrix shown in FIG. 2.

Referring to FIG. 5, FIG. 5 is a flowchart of another method for driving a pixel matrix according to an embodiment of the present invention. The pixel matrix includes a plurality of sub-pixels arranged in a matrix, the voltages applied to the sub-pixels are inverted once every two sub-pixels in the direction of the data line, and the voltages applied to the sub-pixels are inverted once per sub-pixel polarity in the scan line direction.

Specifically, the method includes:

Step 1, receiving an image data, and acquiring original pixel data according to the image data;

Step 2, obtaining original data driving signals for each pixel positions according to the original pixel data;

Step 3, converting the original data driving signals into the first driving voltage or the second driving voltage according to a preset conversion rule;

Step 4, loading the first driving voltage or the second driving voltage into the pixel matrix along a data line direction in one frame.

Loading the first driving voltage or the second driving voltage to adjacent pixel sub-pixels to the pixel matrix in a data line direction; and loading the first driving voltage or the second driving voltage alternately to the adjacent pixel in the scan line direction to the pixel matrix.

Or in a frame, along the data line direction, loading the first driving voltage and the second driving voltage alternately to adjacent sub-pixels, and gray scales on adjacent sub-pixels on both sides of the data line are different;

loading the first driving voltage and the second driving voltage alternately to every two sub-pixels in the scan line direction.

Or in a frame, along the data line direction, loading the second driving voltage of the first driving voltage alternately to adjacent sub-pixels, and gray scales on adjacent sub-pixels on both sides of the data line are the same;

loading the second driving voltage of the first driving voltage alternately to every two sub-pixels along the scan line direction.

In the method, the original pixel data of the embodiment corresponds to a set of gray scale values. In the data driving circuit, the original data driving signal corresponding to the gray scale value is generated, and the original data driving signal is adjusted to two different driving voltages. That is, the first driving voltage or the second driving voltage is output correspondingly, in this embodiment, by using two sets of different gammas to generate driving signals for driving sub-pixels, a set of original data driving signals are generated under different gamma to generate two sets of driving voltages, and then the driving control of the present invention is implemented. In a specific implementation of the solution of the embodiment, the TCON outputs a set of gray scales, and the data driving circuit generates two sets of gammas, and each group respectively drives different sub-pixels, thereby achieving the same technical effect as the first embodiment.

In a specific embodiment, the step of obtaining original data driving signals for each pixel positions according to the original pixel data includes: obtaining an original gray scale value of each pixel position according to the original pixel data, and obtaining the original data driving signals according to the original gray scale value.

The timing controller of the present invention analyzes the original image, analyzes the original gray scale value of each pixel position, and determines a conversion rule corresponding to the position, and the conversion rule adjusts the original gray scale value to a high gray scale H or a low gray scale L. The method of the present invention does not directly perform gray scale conversion in the timing controller, and sends the original gray scale value and the corresponding H or L conversion rule to the data driving unit, the data driving unit directly outputs the corresponding driving voltage according to the original gray scale value and the corresponding H or L according to the rule.

For example, in one embodiment, the original gray scale value of the A position is 128 gray scales, and 128 gray scales are output for the A position. According to the conversion rule, the position of A should be H. After the driver circuit receives 128 gray scales, find the corresponding voltage 10V in the gray-scale corresponding voltage conversion table of H, and finally output the driving voltage signal of 10V to the A position.

For example, the original gray scale value of the B position is 128 gray scale, for the B position output 128 gray scale according to the conversion rule B position should be L drive circuit after receiving 128 gray scale, find the corresponding voltage 8V in the gray scale corresponding pressure conversion table of L, and finally output 8V data signal to the B position.

In this embodiment, the reasonable high gray scale voltage is matched with the low gray scale voltage, so that the pixels in the pixel matrix are not affected by the polarity, and the problems such as crosstalk, bright and dark lines are avoided, and the display effect is improved.

Embodiment 4

In a specific embodiment, in order to more clearly show the solution of the first embodiment of the present invention, the pixel matrix includes a plurality of sub-pixel areas, and each of the sub-pixel areas includes:

- a first sub-pixel;
- a second sub-pixel adjacent to the first sub-pixel along a scan line direction;
- a third sub-pixel adjacent to the second sub-pixel along a scan line direction;
- a fourth sub-pixel adjacent to the third sub-pixel along a scan line direction;
- a fifth sub-pixel adjacent to the first sub-pixel along a data line direction;
- a sixth sub-pixel adjacent to the second sub-pixel along a data line direction;
- a seventh sub-pixel adjacent to the third sub-pixel along a data line direction;
- an eighth sub-pixel adjacent to the fourth sub-pixel along a data line direction;
- a first data line electrically connecting the first sub-pixel, the second sub-pixel, the fifth sub-pixel, and the sixth sub-pixel;
- a second data line electrically connecting the third sub-pixel, the fourth sub-pixel, the seventh sub-pixel, and the eighth sub-pixel;
- a first scan line electrically connecting the first sub-pixel and the third sub-pixel;
- a second scan line electrically connecting the second sub-pixel and the fourth sub-pixel;
- a third scan line electrically connecting the fifth sub-pixel and the seventh sub-pixel;
- a fourth scan line electrically connecting the sixth sub-pixel and the eighth sub-pixel.

Figure 6A:
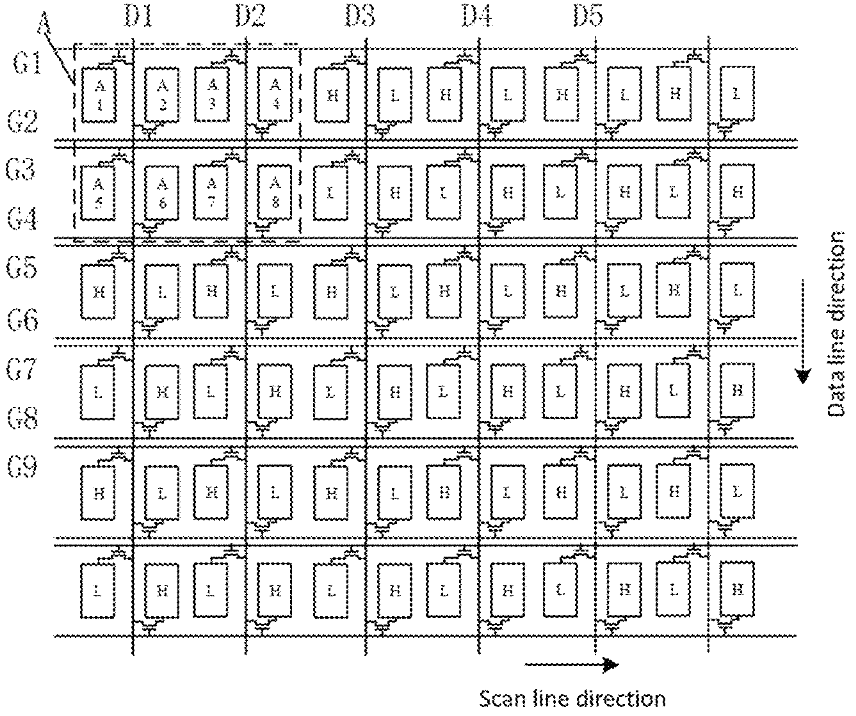
FIG. 6A is a schematic diagram of a sub-pixel area according to a fourth embodiment of the present invention.

Referring to FIG. 6A, FIG. 6A is a schematic diagram of a sub-pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific implementation, the voltages applied to the first pixel A1, the second pixel A2, the fifth pixel A5, and the sixth pixel A6 have the same polarity, and the polarity of the voltage applied to the third pixel A3, the fourth pixel A4, the seventh pixel A7, and the eighth pixel A8 is opposite.

The voltage gray scales loaded onto the first pixel A1, the third pixel A3, the sixth pixel A6, and the eighth pixel A8 are different from the voltage gray scales loaded onto the second pixel A2, the fourth pixel A4, the fifth pixel A5, and the seventh pixel A7.

According to the above-mentioned cooperation relationship between the polarity of the voltage applied to the sub-pixel and the gray scale of the voltage, a specific embodiment is shown. Within one frame, loading a positive polarity high gray scale voltage to the first pixel A1, which can be expressed as HP; loading a positive low-gray scale voltage to the second pixel A2, which can be expressed as LP; loading a negative polarity high gray scale voltage to the third pixel A3, which can be expressed as HN; loading a negative polarity gray scale voltage to the fourth pixel A4, which can be expressed as LN; loading a positive low-gray scale voltage to the fifth pixel A5, which can be expressed as LP; loading a positive polarity high gray scale voltage to the sixth pixel A6, which can be expressed as HP; loading a negative polarity gray scale voltage to the seventh pixel A7, which can be expressed as LN; loading a negative polarity high gray scale voltage to the eighth pixel A8, which can be expressed as HN.

In order to more clearly describe the above voltage loading relationship, from a certain column, the voltage relationship loaded for each sub-pixel in any column is sequentially expressed as: HP, LP, HN, LN, HP, LP, HN, LN . . . sequentially cycle; from a certain line, the voltage relationship loaded for each sub-pixel in any row is sequentially expressed as: HP, LP, HN, LN, HP, LP, HN, LN . . . sequentially cycle.

Or, loading a negative polarity high gray scale voltage to the first pixel A1, which can be expressed as HN; loading a negative polarity gray scale voltage to the second pixel A2, which can be expressed as LN; loading a positive polarity high gray scale voltage to the third pixel A3, which can be expressed as HP; loading a positive low-gray scale voltage to the fourth pixel A4, which can be expressed as LP; loading a negative low gray scale voltage to the fifth pixel A5, which can be expressed as LN; loading a negative polarity high gray scale voltage to the sixth pixel A6, which can be expressed as HN; loading a positive low-gray scale voltage to the seventh pixel A7, which can be expressed as LP; loading a positive polarity high gray scale voltage to the eighth pixel A8, which can be expressed as HP.

In order to more clearly describe the above voltage loading relationship, from a certain column, the voltage relationship loaded for each sub-pixel in any column is sequentially expressed as: HN, LN, HP, LP, HN, LN, HP, LP . . . sequentially cycle; from a certain line, the voltage relationship loaded for each sub-pixel in any row is sequentially expressed as: HN, LN, HP, LP, HN, LN, HP, LP . . . sequentially cycle.

Embodiment 5

In a specific embodiment, in order to more clearly show the solution of the second embodiment of the present invention, the pixel matrix includes a plurality of sub-pixel areas, and each of the sub-pixel areas includes:

a first sub-pixel;

a second sub-pixel adjacent to the first sub-pixel along a scan line direction;

a third sub-pixel adjacent to the second sub-pixel along a scan line direction;

a fourth sub-pixel adjacent to the third sub-pixel along a scan line direction;

a fifth sub-pixel adjacent to the first sub-pixel along a data line direction;

a sixth sub-pixel adjacent to the second sub-pixel along a data line direction;

a seventh sub-pixel adjacent to the third sub-pixel along a data line direction;

an eighth sub-pixel adjacent to the fourth sub-pixel along a data line direction;

a first data line electrically connecting the first sub-pixel, the second sub-pixel, the fifth sub-pixel, and the sixth sub-pixel;

a second data line electrically connecting the third sub-pixel, the fourth sub-pixel, the seventh sub-pixel, and the eighth sub-pixel;

a first scan line electrically connecting the first sub-pixel and the third sub-pixel;

a second scan line electrically connecting the second sub-pixel and the fourth sub-pixel;

a third scan line electrically connecting the fifth sub-pixel and the seventh sub-pixel;

a fourth scan line electrically connecting the sixth sub-pixel and the eighth sub-pixel.

Figure 6B:
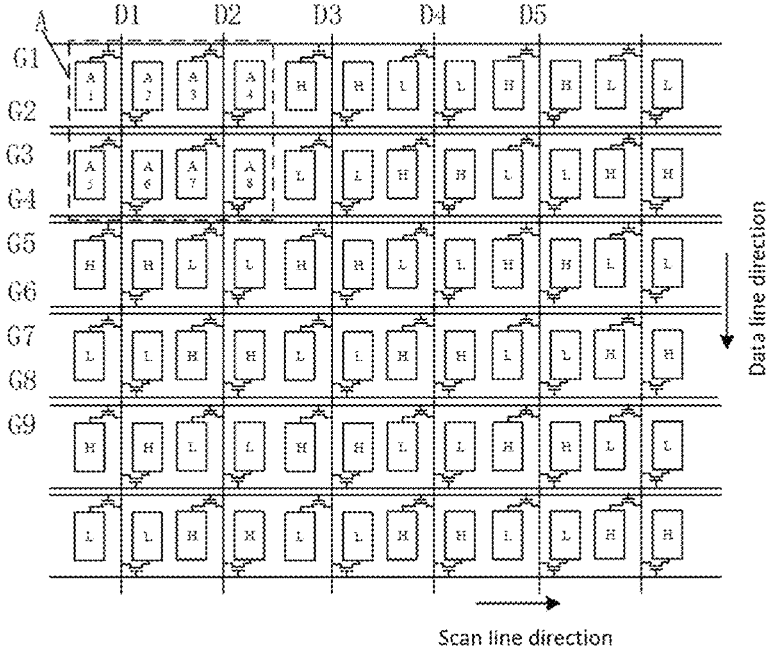
FIG. 6B is a schematic diagram of a sub-pixel area according to a fifth embodiment of the present invention.

Referring to FIG. 6B, FIG. 6B is a schematic diagram of another seed pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific embodiment, the voltages applied to the first pixel A1, the second pixel A2, the fifth pixel A5, and the sixth pixel A6 have the same polarity, and are opposite in polarity to the voltages applied to the third pixel A3, the fourth pixel A4, the seventh pixel A7, and the eighth pixel A8.

The voltage gray scales loaded onto the first pixel A1, the second pixel A2, the seventh pixel A7, and the eighth pixel A8 are different from the voltage gray scales loaded onto the third pixel A3, the fourth pixel A4, the fifth pixel A5, and the sixth pixel A6.

According to the above-mentioned cooperation relationship between the polarity of the voltage applied to the sub-pixel and the gray scale of the voltage, a specific embodiment is shown. Within one frame, loading a positive polarity high gray scale voltage to the first pixel A1, which can be expressed as HP; loading a positive polarity high gray scale voltage to the second pixel A2, which can be expressed as HP; loading a negative low gray scale voltage to the third pixel A3, which can be expressed as LN; loading a negative polarity gray scale voltage to the fourth pixel A4, which can be expressed as LN; loading a positive low-gray scale voltage to the fifth pixel A5, which can be expressed as LP; loading a positive low-gray scale voltage to the sixth pixel A6, which can be expressed as LP; loading a negative polarity high gray scale voltage to the seventh pixel A7, which can be expressed as HN; loading a negative polarity high gray scale voltage to the eighth pixel A8, which can be expressed as HN.

In order to more clearly describe the above voltage loading relationship, from a certain column, the voltage relationship loaded for each sub-pixel in any column is sequentially expressed as: HP, LP, HN, LN, HP, LP, HN, LN . . . sequentially cycle; from a certain line, the voltage relationship loaded for each sub-pixel in any row is sequentially expressed as: HP, HP, LN, LN, HP, HP, LN, LN . . . sequentially cycle.

Or, loading a negative polarity high gray scale voltage to the first pixel A1, which can be expressed as HN; loading a negative polarity high gray scale voltage to the second pixel A2, which can be expressed as HN; loading a positive low-gray scale voltage to the third pixel A3, which can be expressed as LP; loading a positive low-gray scale voltage to the fourth pixel A4, which can be expressed as LP; loading a negative low gray scale voltage to the fifth pixel A5, which can be expressed as LN; loading a negative polarity gray scale voltage to the sixth pixel A6, which can be expressed as LN; loading a positive polarity high gray scale voltage to the seventh pixel A7, which can be expressed as HP; loading a positive polarity high gray scale voltage to the eighth pixel A8, which can be expressed as HP.

In order to more clearly describe the above voltage loading relationship, from a certain column, the voltage relationship loaded for each sub-pixel in any column is sequentially expressed as: HN, LN, HP, LP, HN, LN, HP, LP . . . sequentially cycle; from a certain line, the voltage relationship loaded for each sub-pixel in any row is sequentially expressed as: HN, HN, LP, LP, HN, HN, LP, LP . . . sequentially cycle.

Embodiment 6

In a specific embodiment, in order to more clearly show the solution of the second embodiment of the present invention, the pixel matrix includes a plurality of sub-pixel areas, and each of the sub-pixel areas includes:

a first sub-pixel;

a second sub-pixel adjacent to the first sub-pixel along a scan line direction;

a third sub-pixel adjacent to the second sub-pixel along a scan line direction;

a fourth sub-pixel adjacent to the third sub-pixel along a scan line direction;

a fifth sub-pixel adjacent to the first sub-pixel along a data line direction;

a sixth sub-pixel adjacent to the second sub-pixel along a data line direction;

a seventh sub-pixel adjacent to the third sub-pixel along a data line direction;

an eighth sub-pixel adjacent to the fourth sub-pixel along a data line direction;

a first data line electrically connecting the first sub-pixel, the second sub-pixel, the fifth sub-pixel, and the sixth sub-pixel;

a second data line electrically connecting the third sub-pixel, the fourth sub-pixel, the seventh sub-pixel, and the eighth sub-pixel;

a first scan line electrically connecting the first sub-pixel and the fourth sub-pixel;

a second scan line electrically connecting the second sub-pixel and the third sub-pixel;

a third scan line electrically connecting the fifth sub-pixel and the eighth sub-pixel;

a fourth scan line electrically connecting the sixth sub-pixel and the seventh sub-pixel.

Figure 6C:
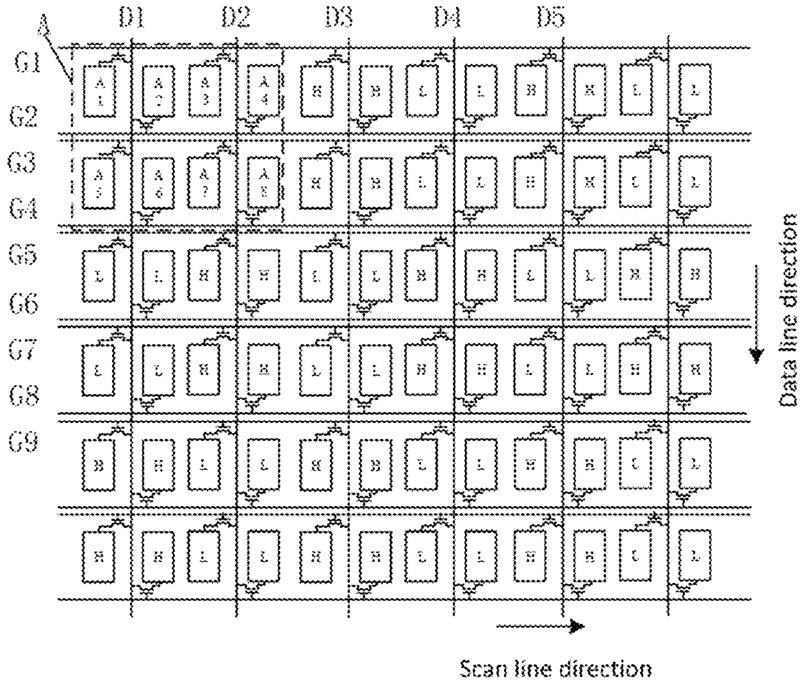
FIG. 6C is a schematic diagram of a sub-pixel area according to a sixth embodiment of the present invention.

Referring to FIG. 6C, FIG. 6C is a schematic diagram of still another sub-pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific embodiment, the voltages applied to the first pixel A1, the second pixel A2, the fifth pixel A5, and the sixth pixel A6 have the same polarity, and are opposite in polarity to the voltages applied to the third pixel A3, the fourth pixel A4, the seventh pixel A7, and the eighth pixel A8.

In a specific embodiment, the voltage gray scales loaded onto the first pixel A1, the second pixel A2, the fifth pixel A5, and the sixth pixel A6 are different from the voltage gray scales loaded onto the third pixel A3, the fourth pixel A4, the seventh pixel A7, and the eighth pixel A8.

According to the above-mentioned cooperation relationship between the polarity of the voltage applied to the sub-pixel and the gray scale of the voltage, a specific embodiment is shown. Within one frame, loading a positive polarity high gray scale voltage to the first pixel A1, which can be expressed as HP; loading a positive polarity high gray scale voltage to the second pixel A2, which can be expressed as HP; loading a negative low gray scale voltage to the third pixel A3, which can be expressed as LN; loading a negative polarity gray scale voltage to the fourth pixel A4, which can be expressed as LN; loading a positive polarity high gray scale voltage to the fifth pixel A5, which can be expressed as HP; loading a positive polarity high gray scale voltage to the sixth pixel A, which can be expressed as HP; loading a negative polarity gray scale voltage to the seventh pixel A7, which can be expressed as LN; loading a negative polarity gray scale voltage to the eighth pixel A8, which can be expressed as LN.

In order to more clearly describe the above voltage loading relationship, from a certain column, the voltage relationship loaded for each sub-pixel in any column is sequentially expressed as: HP, HP, LN, LN, HP, HP, LN, LN . . . sequentially cycle; from a certain line, the voltage relationship loaded for each sub-pixel in any row is sequentially expressed as: HP, HP, LN, LN, HP, HP, LN, LN . . . sequentially cycle.

Or, loading a negative polarity high gray scale voltage to the first pixel A1, which can be expressed as HN; loading a negative polarity high gray scale voltage to the second pixel A2, which can be expressed as HN; loading a positive low-gray scale voltage to the third pixel A3, which can be expressed as LP; loading a positive low-gray scale voltage to the fourth pixel A4, which can be expressed as LP; loading a negative polarity high gray scale voltage to the fifth pixel A5, which can be expressed as HN; loading a negative polarity high gray scale voltage to the sixth pixel A, which can be expressed as HN; loading a positive low-gray scale voltage to the seventh pixel A7, which can be expressed as LP; loading a positive low-gray scale voltage to the eighth pixel A8, which can be expressed as LP.

In order to more clearly describe the above voltage loading relationship, from a certain column, the voltage relationship loaded for each sub-pixel in any column is sequentially expressed as: HN, HN, LP, LP, HN, HN, LP, LP . . . sequentially cycle; from a certain line, the voltage relationship loaded for each sub-pixel in any row is sequentially expressed as: HN, HN, LP, LP, HN, HN, LP, LP . . . sequentially cycle.

Embodiment 7

Figure 6D:
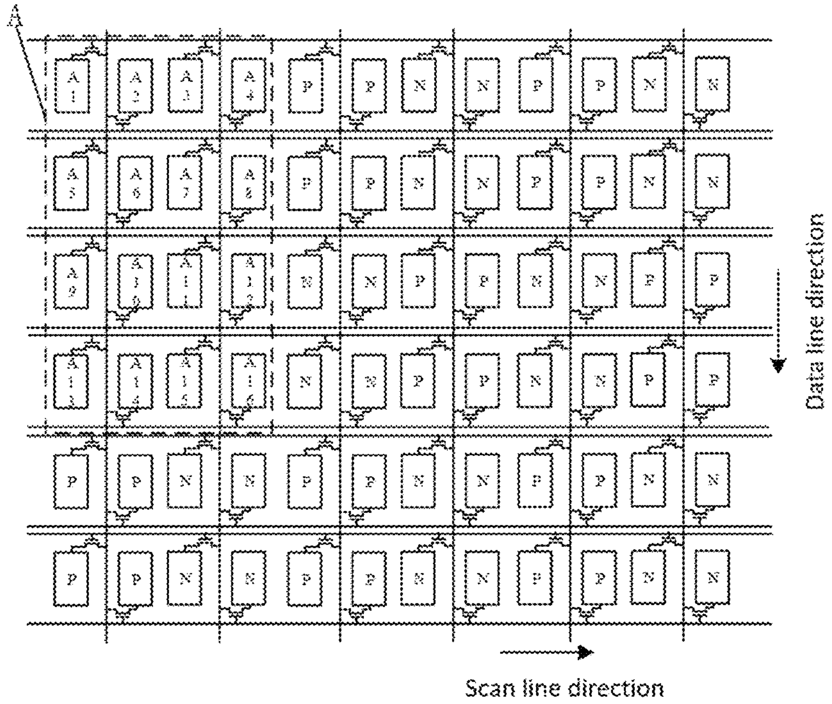
FIG. 6D is a schematic diagram of a pixel matrix driving manner according to a seventh embodiment of the present invention.
Figure 6E:
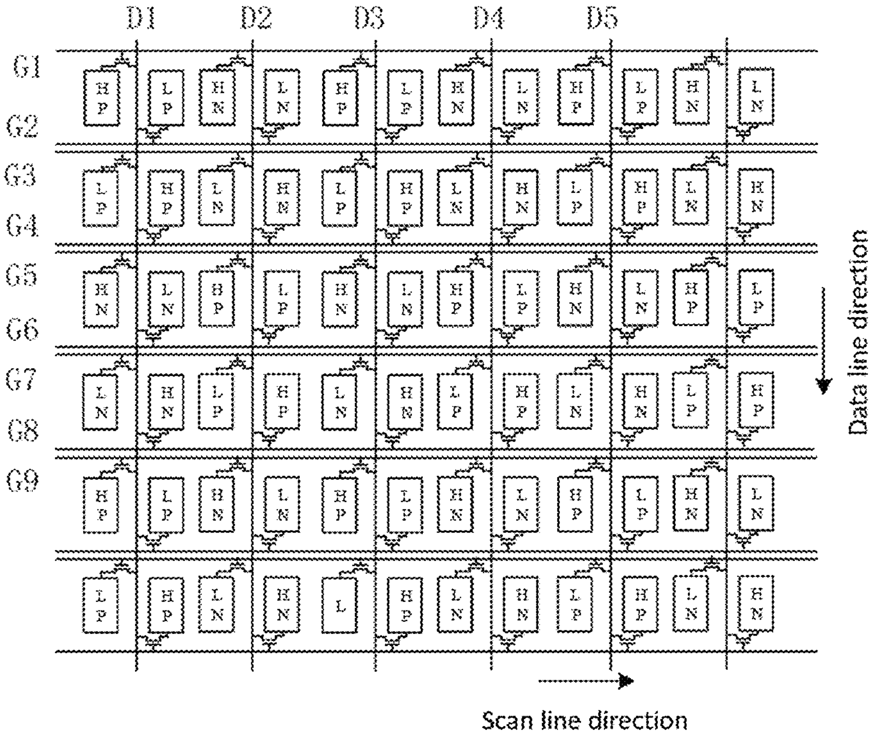
FIG. 6E is a schematic diagram of a specific implementation manner of the driving manner in FIG. 6D.

Referring to FIG. 6D and FIG. 6E, FIG. 6D is a schematic diagram of a driving manner of a pixel matrix according to an embodiment of the present invention; FIG. 6E is a schematic diagram of a specific implementation manner of the driving manner in FIG. 6D; in an optional 4×4 area, in this embodiment, the first pixel A1, the second pixel A2, the fifth pixel A5, the sixth pixel A6, the ninth pixel A9, the tenth pixel A10, the thirteenth pixel A13, and the fourteenth pixel A14 are connected to the first data line D1, the third pixel A3, the fourth pixel A4, the seventh pixel A7, the eighth pixel A8, the eleventh pixel A11, the twelfth pixel A12, the fifteenth pixel A15, the sixteenth pixel A16 are connected to the second data line D2;

at the first moment in a frame, loading a scan signal on the first row of scan lines G1, and loading the voltage corresponding to HP to the first pixel A1 on the first data line D1, loading the voltage corresponding to the HN on the second data line D2 to the third pixel A3, and so on;

at the next moment (the second moment), loading a scan signal on the second row of scan lines G2, and loading the voltage corresponding to the LP on the first data line D1 to the second pixel A2, loading the voltage corresponding to the LN on the second data line D2 to the fourth pixel A4, and so on;

at the next moment (the third moment), loading a scan signal on the third row of scan lines G3, and loading the voltage corresponding to the LP on the first data line D1 to the fifth pixel A5, and loading the voltage corresponding to the LN on the second data line D2 to the seventh pixel A7, and so on;

at the next moment (the fourth moment), loading a scan signal on the fourth row of scan lines G4, and loading the voltage corresponding to HP to the sixth pixel A6 on the first data line D1, loading the voltage corresponding to the HN on the second data line D2 to the eighth pixel A8, and so on;

at the next moment (the fifth moment), loading a scan signal on the fifth line of the scan line G5, and loading the voltage corresponding to the HN on the first data line D1 to the ninth pixel A9, and loading the voltage corresponding to the HP on the second data line D2 to the eleventh pixel A11, and so on;

at the next moment (the sixth moment), loading a scan signal on the sixth line scan line G6, and loading the voltage corresponding to LN on the first data line D1 to the tenth pixel A10, and loading the voltage corresponding to the LP on the third data line D2 to the twelfth pixel A12, and so on;

at the next moment (the seventh moment), loading a scan signal on the seventh row of scan lines G7, and loading the voltage corresponding to LN to the thirteenth pixel A13 on the first data line D1, and loading the voltage corresponding to the LP on the second data line D2 to the fifteenth pixel A15, and so on;

at the next moment (the eighth moment), loading a scan signal on the eighth line scan line G8, and loading the voltage corresponding to HN to the fourteenth pixel A14 on the first data line D1, and loading the voltage corresponding to HP on the second data line D2 to the sixteenth pixel A16, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 8

Figure 6F:
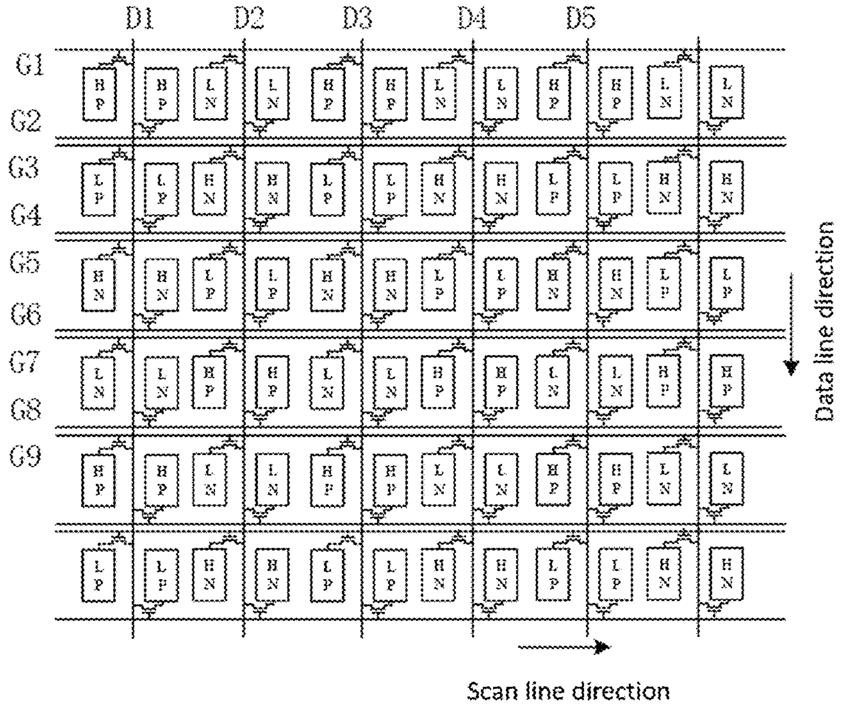
FIG. 6F is a schematic diagram of another specific embodiment of the driving method in FIG. 6D.

Please refer to FIG. 6D and FIG. 6F together. FIG. 6F is a schematic diagram of another specific implementation manner of the driving manner in FIG. 6D. In an optional 4×4 area, in this embodiment, the first pixel A1, the second pixel A2, the fifth pixel A5, the sixth pixel A6, the ninth pixel A9, the tenth pixel A10, the thirteenth pixel A13, and the fourteenth pixel A14 are connected to the first data line D1, the third pixel A3, the fourth pixel A4, the seventh pixel A7, the eighth pixel A8, the eleventh pixel A11, the twelfth pixel A12, the fifteenth pixel A15, the sixteenth pixel A16 are connected to the second data line D2;

at the first moment in a frame, loading a scan signal on the first row of scan lines G1, and loading the voltage corresponding to HP to the first pixel A1 on the first data line D1, loading the voltage corresponding to LN on the second data line D2 to the third pixel A3, and so on;

at the next moment (the second moment), loading a scan signal on the second row of scan lines G2, and loading the voltage corresponding to HP to the second pixel A2 on the first data line D1, loading the voltage corresponding to LN on the second data line D2 to the fourth pixel A4, and so on;

at the next moment (the third moment), loading a scan signal on the third row of scan lines G3, and loading the voltage corresponding to the LP on the first data line D1 to the fifth pixel A5, and loading the voltage corresponding to the HN on the second data line D2 to the seventh pixel A7, and so on;

at the next moment (the third moment), loading a scan signal on the fourth row of scan lines G4, and loading the voltage corresponding to the LP on the first data line D1 to the sixth pixel A6, and loading the voltage corresponding to the HN on the second data line D2 to the eighth pixel A8, and so on;

at the next moment (the fifth moment), loading a scan signal on the fifth line scan line G5, and loading the voltage corresponding to HN on the first data line D1 to the ninth pixel A9, and loading the voltage corresponding to the LP on the second data line D2 to the eleventh pixel A11, and so on;

at the next moment (the sixth moment), loading a scan signal on the sixth line scan line G6, and loading the voltage corresponding to HN on the first data line D1 to the tenth pixel A10, and loading the voltage corresponding to the LP on the third data line D2 to the twelfth pixel A12, and so on;

at the next moment (the seventh moment), loading a scan signal on the seventh row of scan lines G7, and loading the voltage corresponding to LN to the thirteenth pixel A13 on the first data line D1, and loading the voltage corresponding to HP to the fifteenth pixel A15 on the second data line D2, and so on;

at the next moment (the eighth moment), loading a scan signal on the eighth row of scan lines G8, and loading the voltage corresponding to LN to the fourteenth pixel A14 on the first data line D1, and loading the voltage corresponding to HP to the sixteenth pixel A16 on the second data line D2, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 9

Figure 6G:
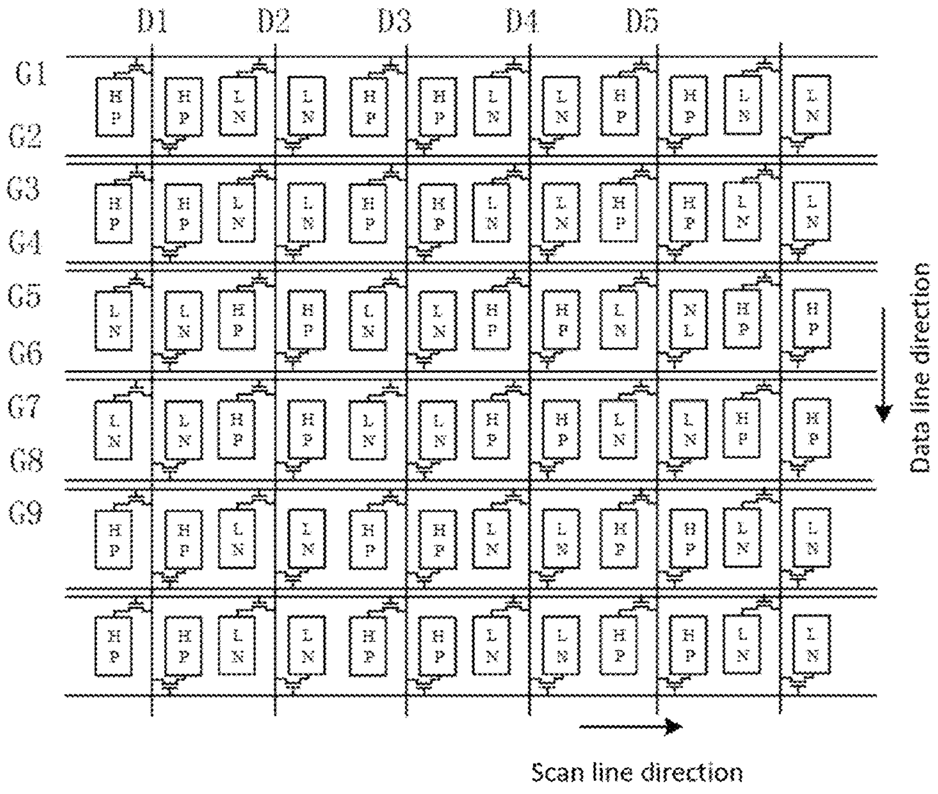
FIG. 6G is a schematic diagram of still another embodiment of the driving method in FIG. 6D.

Please refer to FIG. 6D and FIG. 6G together. FIG. 6G is a schematic diagram of still another specific implementation manner of the driving manner in FIG. 6D. In an optional 4×4 area, in this embodiment, the first pixel A1, the second pixel A2, the fifth pixel A5, the sixth pixel A6, the ninth pixel A9, the tenth pixel A10, the thirteenth pixel A13, and the fourteenth pixel A14 are connected to the first data line D1, the third pixel A3, the fourth pixel A4, the seventh pixel A7, the eighth pixel A8, the eleventh pixel A11, the twelfth pixel A12, the fifteenth pixel A15, the sixteenth pixel A16 are connected to the second data line D2;

at the first moment in a frame, loading a scan signal on the first row of scan lines G1, and loading the voltage corresponding to HP to the first pixel A1 on the first data line D1, loading the voltage corresponding to LN on the second data line D2 to the third pixel A3, and so on;

at the next moment (the second moment), loading a scan signal on the second row of scan lines G2, and loading the voltage corresponding to HP to the second pixel A2 on the first data line D1, loading the voltage corresponding to LN on the second data line D2 to the fourth pixel A4, and so on;

at the next moment (the third moment), loading a scan signal on the third row of scan lines G3, and loading the voltage corresponding to HP to the fifth pixel A5 on the first data line D1, loading the voltage corresponding to LN on the second data line D2 to the seventh pixel A7, and so on;

at the next moment (the fourth moment), loading a scan signal on the fourth row of scan lines G4, and loading the voltage corresponding to HP to the sixth pixel A6 on the first data line D1, loading the voltage corresponding to the LN on the second data line D2 to the eighth pixel A8, and so on;

at the next moment (the fifth moment), loading a scan signal on the fifth line scan line G5, and loading the voltage corresponding to LN on the first data line D1 to the ninth pixel A9, and loading the voltage corresponding to HP on the second data line D2 to the eleventh pixel A11, and so on;

at the next moment (the sixth moment), loading a scan signal on the sixth line scan line G6, and loading the voltage corresponding to LN on the first data line D1 to the tenth pixel A10, and loading the voltage corresponding to HP on the third data line D2 to the twelfth pixel A12, and so on;

at the next moment (the seventh moment), loading a scan signal on the seventh row of scan lines G7, and loading the voltage corresponding to LN to the thirteenth pixel A13 on the first data line D1, and loading the voltage corresponding to HP to the fifteenth pixel A15 on the second data line D2, and so on;

at the next moment (the eighth moment), loading a scan signal on the eighth row of scan lines G8, and loading the voltage corresponding to LN to the fourteenth pixel A14 on the first data line D1, and loading the voltage corresponding to HP to the sixteenth pixel A16 on the second data line D2, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 10

Referring to FIG. 3 again, the method for driving the pixel matrix of the present embodiment is applicable to a display having a pixel array, such as an LCD display, an LED display, an OLED display, or the like.

Further, the pixel matrix includes a plurality of sub-pixels arranged in a matrix, and a voltage applied along the data line changes a polarity once every two sub-pixels, and any one of the data lines controls a voltage input of one sub-pixel on both sides thereof. In the direction of the data line, the voltage applied to the sub-pixel is changed once every two sub-pixels, and the voltage applied to the sub-pixels in the direction of the scan line is changed once every two sub-pixels. Specifically, for the sub-pixel polarity, both the scan line direction and the data line direction are 2N inverted, and the data line polarity inversion mode is 4N.

Specifically, the method may include the following steps:

Step 1, receiving an image data, and acquiring original pixel data according to the image data;

Step 2, obtaining a first gray scale data and a second gray scale data according to the original pixel data;

Step 3, generating the first driving voltage corresponding to the first gray scale data and the second driving voltage corresponding to the second gray scale data according to the first gray scale data and the second gray scale data;

Step 4, loading the first driving voltage or the second driving voltage into the pixel matrix along a data line direction in one frame.

Wherein, the image data refers to a digital signal input to the timing controller TCON, and the image data is input frame by frame, and the original pixel data is parsed by the image data. In one of the prior arts, the original pixel data, that is, a specific gray scale value corresponding to each sub-pixel in the pixel matrix corresponding to the display, the gray scale value input to each sub-pixel is directly determined by the image data input into the TCON, and the original pixel data is not processed. Such methods are affected by the polarity of the sub-pixels, which causes the sub-pixel polarity to easily cause crosstalk, bright and dark lines and other negative effects.

In this embodiment, by processing the original pixel data, further first gray scale data and second gray scale data are obtained, and the gray scales of the first gray scale data and the second gray scale data are different. Furthermore, the image is loaded into the corresponding sub-pixels at different intervals between different pixels or between different frames. The solution in this embodiment can generate two sets of different gray scales, respectively corresponding to different sub-pixels. In this way, it is possible to prevent the voltage applied to the sub-pixel from being affected by the polarity inversion, thereby avoiding the occurrence of crosstalk and bright and dark lines.

In a specific example, the first gray scale data is considered to be high gray scale data, and the second gray scale data is considered to be low gray scale data. Correspondingly, the magnitude of the voltage input to the sub-pixel is determined by the gray scale, the high gray scale voltage generated corresponding to the high gray scale data, that is, the first driving voltage; and the low gray scale voltage generated corresponding to the low gray scale data, that is, the second driving voltage. It is worth mentioning that the above-mentioned high gray scale and low gray scale represent the relative values of the gray scale sizes of the two groups, and the magnitude of the values is not separately limited.

Figure 7A:
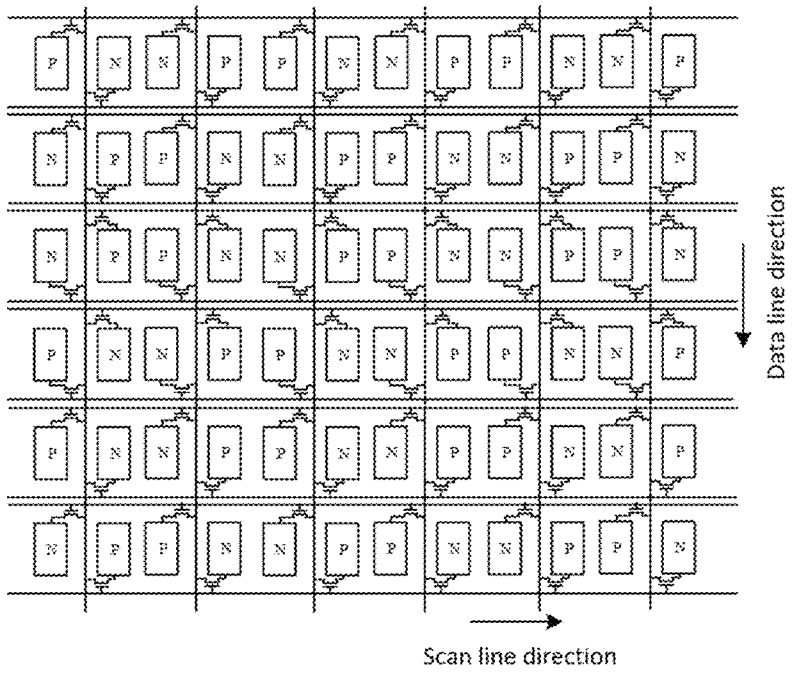
FIG. 7A is a schematic diagram of polarity loading of a pixel matrix according to a tenth embodiment of the present invention.

Referring to FIG. 7A, FIG. 7A is a schematic diagram of polarity loading of a pixel matrix according to an embodiment of the present invention. From a certain line, the two consecutive sub-pixels have the same polarity, and the next two consecutive sub-pixels have opposite polarities to the last two polarities, from a column, the two consecutive sub-pixels have the same polarity, and the next two sub-pixel polarities are opposite to the last two polarities, and so on. Overall, the voltage applied to the sub-pixels is inverted once every two sub-pixels in the direction of the scan line, the voltage applied to the sub-pixels is inverted once every two sub-pixels in the direction of the data line, and the polarity of the data lines is also inverted once every two sub-pixels, the voltages applied to adjacent data lines at the same time have different polarities. In FIG. 7A, P represents a positive voltage and N represents a negative voltage. From a certain column, the polarity transformation can be expressed as PPNN . . . PPNN or NNPP . . . NNPP. From a certain line, the polarity transformation can be expressed as PPNN . . . PPNN or NNPP . . . NNPP.

In a specific embodiment, the step of obtaining a first gray scale data and a second gray scale data according to the original pixel data includes: obtaining an original gray scale value of each pixel position according to the original pixel data, and converting the original gray scale value of each pixel position into the first gray scale data or the second gray scale data according to a predetermined conversion manner.

After determining the gray scale corresponding to each pixel position according to the rule of the present invention, the timing controller adjusts the original gray scale correspondence of the pixel position to a high gray scale or a low gray scale, and transmits the adjusted gray scale value to the data driving unit, and the number driving unit outputs the corresponding voltage according to the gray scale value.

For example, the original gray scale value of the A position is 128 gray scale. If the above rule according to the present invention, the A position should output a high gray scale, that is, H, after calculation, in this example, 128 gray scale corresponding H=138 gray scale value, then output 138 gray scale to the A position, the data driving unit receives 138 gray scale, according to the established conversion rule, the voltage corresponding to 138 gray scale is 10V, and finally the voltage signal of 10V is output to the A position. Generally, the adjustment range of the high and low gray scales is determined by the difference of materials such as liquid crystal.

For another example, the original gray scale value of the B position is 128 gray scale. If the above rule is used according to the present invention, the B position should output a low gray scale, that is, L, after calculation, in this example, the 128 gray scale corresponds to the L=118 gray scale value, then the output is 118 gray scale to the B position, and the data driving unit receives the 118 gray scale, according to the established conversion rules, the voltage corresponding to the gray scale of 118 is 8V, and finally the voltage signal of 8V is output to the B position.

In a specific embodiment, the step of loading the first driving voltage or the second driving voltage to the pixel matrix along the data lines includes:

loading the first driving voltage or the second driving voltage to adjacent pixel sub-pixels to the pixel matrix in a data line direction; and loading the first driving voltage or the second driving voltage alternately to the adjacent pixel in the scan line direction to the pixel matrix. The first driving voltage and the second driving voltage are alternately loaded for every two sub-pixels along the data line, and the gray scales on adjacent sub-pixels on both sides of the data line are different. The gray scale on the adjacent sub-pixels on both sides of the data line is different, that is, when the adjacent sub-pixel on the left side of the data line is H, the adjacent sub-pixel on the right side of the data line is L, and vice versa.

The pixel matrix is physically divided into a plurality of small blocks arranged in a matrix by a plurality of interleaved data lines and scan lines, and each small block is one sub-pixel.

Figure 7B:
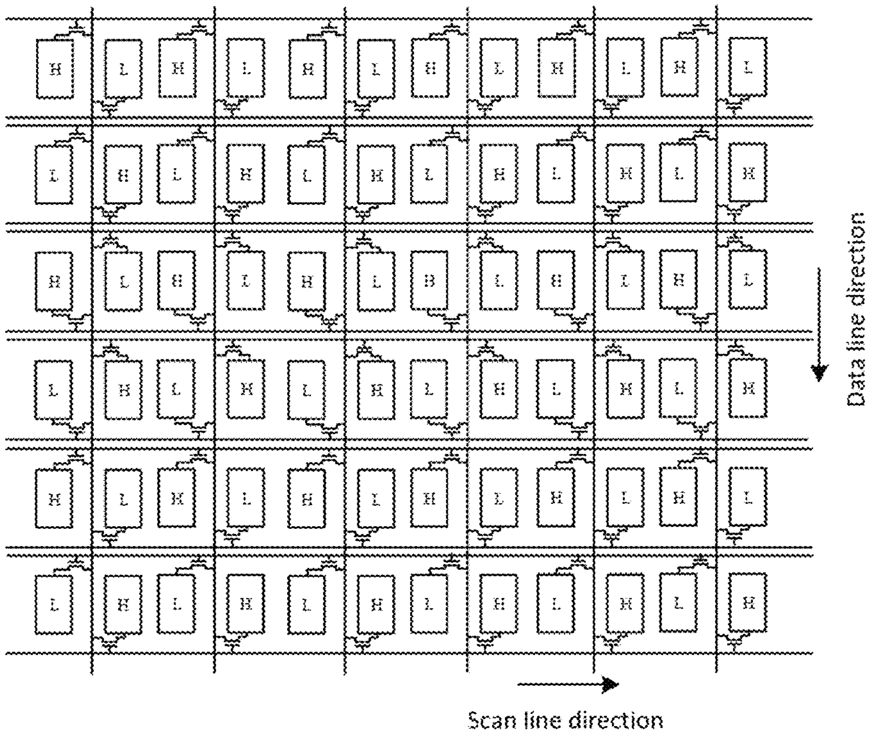
FIG. 7B is a schematic diagram of a gray matrix loading of a pixel matrix according to a tenth embodiment of the present invention.

For example, refer to FIG. 7B, which is a schematic diagram of a gray matrix loading of a pixel matrix according to an embodiment of the present invention. From a certain line, the gray-scale voltages loaded into the sub-pixels are alternately transformed. From a certain column, the gray-scale voltages loaded into the sub-pixels are alternately transformed, and so on. In FIG. 7B, H represents a high gray scale voltage, and L represents a low gray scale voltage. From a certain column, the gray scale voltage transformation can be expressed as HLHL . . . HLHL or LHLH . . . LHLH. From a certain line, the gray scale voltage transformation can be expressed as HLHL . . . HLHL or LHLH . . . LHLH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Embodiment 11

Figure 7C:
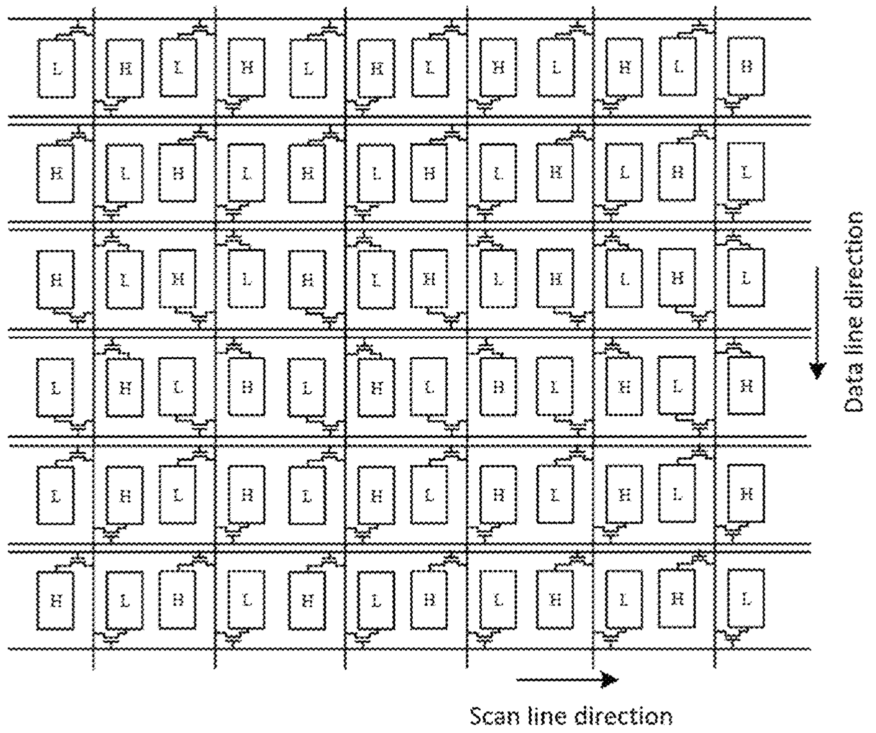
FIG. 7C is a schematic diagram of a gray matrix loading of a pixel matrix according to an eleventh embodiment of the present invention.

For example, refer to FIG. 7C, which is a schematic diagram of another gray matrix loading of a pixel matrix according to an embodiment of the present invention. The step of loading the first driving voltage or the second driving voltage into the pixel matrix along a data line direction includes:

loading the first driving voltage and the second driving voltage alternately as per every two sub-pixels along a data line direction; and loading the first driving voltage and the second driving voltage alternately to adjacent sub-pixels along the scan line direction.

From a certain column, the gray scale voltages applied to two consecutive sub-pixels are the same, and the gray scale voltages of two consecutive sub-pixels loaded are different from the previous two, from a certain line, the gray-scale voltages loaded into the sub-pixels alternately change, and so on. In FIG. 7C, H represents a high gray scale voltage, L represents a low gray scale voltage, and the gray scale arrangement is 1+2N mode. From a certain column, the gray scale voltage transformation can be expressed as HLLH . . . HLLH or LHHL . . . LHHL. From a certain line, the gray scale voltage transformation can be expressed as HLHL . . . HLHL or LHLH . . . LHLH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Figure 7D:
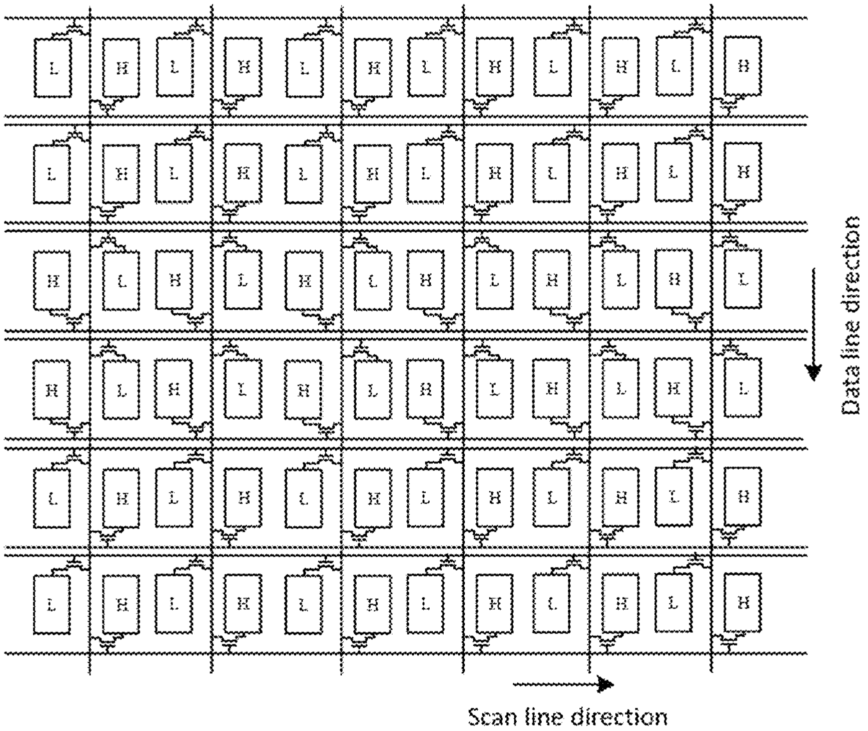
FIG. 7D is a schematic diagram of another gray matrix loading of a pixel matrix according to an eleventh embodiment of the present invention.

For example, refer to FIG. 7D, which is a schematic diagram of another gray matrix loading of a pixel matrix according to an embodiment of the present invention. In FIG. 7D, H represents a high gray scale voltage, L represents a low gray scale voltage, and the gray scale arrangement is a 2N mode. From a certain column, the gray scale voltage transformation can be expressed as HHLL . . . HHLL or LLHH . . . LLHH. From a certain line, the gray scale voltage transformation can be expressed as HLHL . . . HLHL or LHLH . . . LHLH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Embodiment 12

Referring to FIG. 5 again, in the method for driving the pixel matrix of the embodiment, the pixel matrix includes a plurality of sub-pixels arranged in a matrix, the voltages applied to the sub-pixel are inverted once every two sub-pixels in the data line direction, and the voltages applied to the sub-pixel are inverted once every two sub-pixels in the scan line direction.

Specifically, the method includes:

Step 1, receiving an image data, and acquiring original pixel data according to the image data;

Step 2, obtaining original data driving signals for each pixel positions according to the original pixel data;

Step 3, converting the original data driving signals into the first driving voltage or the second driving voltage according to a preset conversion rule;

Step 4, loading the first driving voltage or the second driving voltage into the pixel matrix along a data line direction in one frame.

Loading the first driving voltage or the second driving voltage to adjacent pixel sub-pixels to the pixel matrix in a data line direction; and loading the first driving voltage or the second driving voltage alternately to the adjacent pixel in the scan line direction to the pixel matrix.

Or, within one frame, loading the first driving voltage and the second driving voltage alternately into every two sub-pixels in a data line direction; and loading the first driving voltage and the second driving voltage to adjacent sub-pixels in a scan line direction.

In the method, the original pixel data of the embodiment corresponds to a set of gray scale values. In the data driving circuit, the original data driving signal corresponding to the gray scale value is generated, and the original data driving signal is adjusted to two different driving voltages. That is, the first driving voltage or the second driving voltage is output correspondingly, in this embodiment, by using two sets of different gammas to generate driving signals for driving sub-pixels, a set of original data driving signals are generated under different gamma to generate two sets of driving voltages, and then the driving control of the present invention is implemented. In a specific implementation of the solution of the embodiment, the TCON outputs a set of gray scales, and the data driving circuit generates two sets of gammas, and each group respectively drives different sub-pixels, thereby achieving the same technical effect as the first embodiment.

In a specific embodiment, the step of obtaining original data driving signals for each pixel positions according to the original pixel data includes:

obtaining an original gray scale value of each pixel position according to the original pixel data, and obtaining the original data driving signals according to the original gray scale value.

The timing controller of the present invention analyzes the original image, analyzes the original gray scale value of each pixel position, and determines a conversion rule corresponding to the position, and the conversion rule adjusts the original gray scale value to a high gray scale H or a low gray scale L. The method of the present invention does not directly perform gray scale conversion in the timing controller, and sends the original gray scale value and the corresponding H or L conversion rule to the data driving unit, the data driving unit directly outputs the corresponding driving voltage according to the original gray scale value and the corresponding H or L according to the rule.

For example, in one embodiment, the original gray scale value of the A position is 128 gray scales, and 128 gray scales are output for the A position. According to the conversion rule, the position of A should be H. After the driver circuit receives 128 gray scales, find the corresponding voltage 10V in the gray-scale corresponding voltage conversion table of H, and finally output the driving voltage signal of 10V to the A position.

For example, the original gray scale value of the B position is 128 gray scale, for the B position output 128 gray scale according to the conversion rule B position should be L drive circuit after receiving 128 gray scale, find the corresponding voltage 8V in the gray scale corresponding pressure conversion table of L, and finally output 8V data signal to the A position.

In this embodiment, the reasonable high gray scale voltage is matched with the low gray scale voltage, so that the pixels in the pixel matrix are not affected by the polarity, and the problems such as crosstalk, bright and dark lines are avoided, and the display effect is improved.

Embodiment 13

In a specific embodiment, in order to more clearly show the solution of the tenth embodiment of the present invention, the pixel matrix includes a plurality of sub-pixel areas, and each of the sub-pixel areas includes:

a first sub-pixel;

a second sub-pixel adjacent to the first sub-pixel along a scan line direction;

a third sub-pixel adjacent to the second sub-pixel along a scan line direction;

a fourth sub-pixel adjacent to the third sub-pixel along a scan line direction;

a fifth sub-pixel adjacent to the first sub-pixel along a data line direction;

a sixth sub-pixel adjacent to the second sub-pixel along a data line direction;

a seventh sub-pixel adjacent to the third sub-pixel along a data line direction;

an eighth sub-pixel adjacent to the fourth sub-pixel along a data line direction;

a first data line electrically connecting the first sub-pixel, the second sub-pixel, the fifth sub-pixel, and the sixth sub-pixel;

a second data line electrically connecting the third sub-pixel, the fourth sub-pixel, the seventh sub-pixel, and the eighth sub-pixel;

a first scan line electrically connecting the first sub-pixel and the third sub-pixel;

a second scan line electrically connecting the second sub-pixel and the fourth sub-pixel;

a third scan line electrically connecting the fifth sub-pixel and the seventh sub-pixel;

a fourth scan line electrically connecting the sixth sub-pixel and the eighth sub-pixel.

Figure 8A:
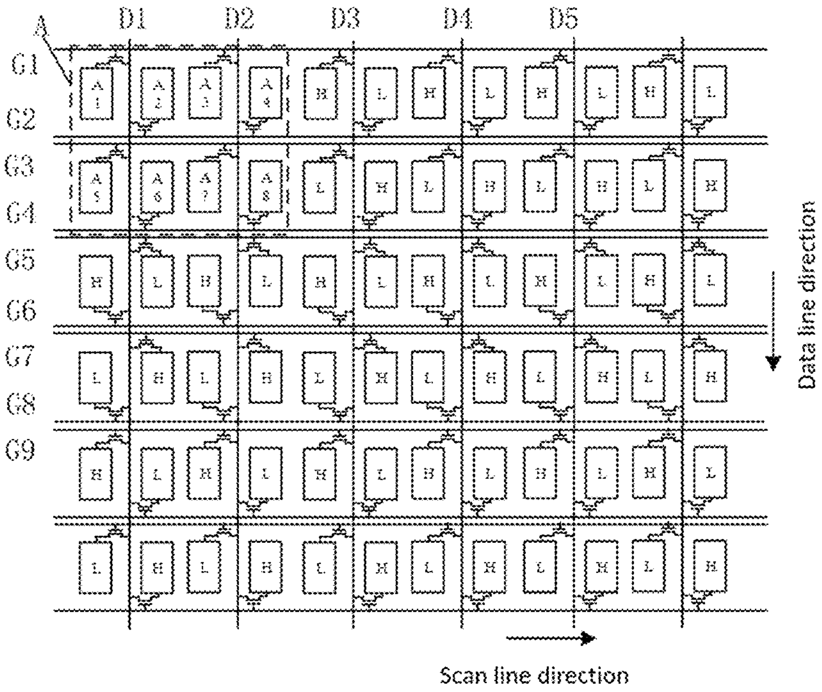
FIG. 8A is a schematic diagram of a sub-pixel area according to a thirteenth embodiment of the present invention.

Referring to FIG. 8A, FIG. 8A is a schematic diagram of a sub-pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific embodiment, the voltages applied to the first pixel A1, the fourth pixel A4, the sixth pixel A6, and the seventh pixel A7 have the same polarity and are opposite in polarity to the voltages applied to the second pixel A2, the third pixel A3, the fifth pixel A5, and the eighth pixel A8.

The voltage gray scales loaded onto the first pixel A1, the third pixel A3, the sixth pixel A6, and the eighth pixel A8 are different from the voltage gray scales loaded onto the second pixel A2, the fourth pixel A4, the fifth pixel A5, and the seventh pixel A7.

According to the above-mentioned cooperation relationship between the polarity of the voltage applied to the sub-pixel and the gray scale of the voltage, a specific embodiment is shown. Within one frame, loading a positive polarity high gray scale voltage to the first pixel A1, which can be expressed as HP; loading a negative polarity gray scale voltage to the second pixel A2, which can be expressed as LN; loading a negative polarity high gray scale voltage to the third pixel A3, which can be expressed as HN; loading a positive low-gray scale voltage to the fourth pixel A4, which can be expressed as LP; loading a negative low gray scale voltage to the fifth pixel A5, which can be expressed as LN; loading a positive polarity high gray scale voltage to the sixth pixel A6, which can be expressed as HP; loading a positive low-gray scale voltage to the seventh pixel A7, which can be expressed as LP; loading a negative polarity high gray scale voltage to the eighth pixel A8, which can be expressed as HN.

In order to more clearly describe the above voltage loading relationship, from a certain column, the voltage relationship loaded for each sub-pixel in any column is sequentially expressed as: HP, LN, HN, LP, HP, LN, HN, LP . . . sequentially cycle; from a certain line, the voltage relationship loaded for each sub-pixel in any row is sequentially expressed as: HP, LN, HN, LP, HP, LN, HN, LP . . . sequentially cycle.

Or, loading a negative polarity high gray scale voltage to the first pixel A1, which can be expressed as HN; loading a positive low-gray scale voltage to the second pixel A2, which can be expressed as LP; loading a positive polarity high gray scale voltage to the third pixel A3, which can be expressed as HP; loading a negative polarity gray scale voltage to the fourth pixel A4, which can be expressed as LN; loading a positive low-gray scale voltage to the fifth pixel A5, which can be expressed as LP; loading a negative polarity high gray scale voltage to the sixth pixel A6, which can be expressed as HN; loading a negative polarity gray scale voltage to the seventh pixel A7, which can be expressed as LN; loading a positive polarity high gray scale voltage to the eighth pixel A8, which can be expressed as HP.

In order to more clearly describe the above voltage loading relationship, from a certain column, the voltage relationship loaded for each sub-pixel in any column is sequentially expressed as: HN, LP, HP, LN, HN, LP, HP, LN . . . sequentially cycle; from a certain line, the voltage relationship loaded for each sub-pixel in any row is sequentially expressed as: HN, LP, HP, LN, HN, LP, HP, LN . . . sequentially cycle.

Embodiment 14

In a specific embodiment, in order to more clearly show the solution of the eleventh embodiment of the present invention, the pixel matrix includes a plurality of sub-pixel areas, and each of the sub-pixel areas includes:

a first sub-pixel;

a second sub-pixel adjacent to the first sub-pixel along a scan line direction;

a third sub-pixel adjacent to the second sub-pixel along a scan line direction;

a fourth sub-pixel adjacent to the third sub-pixel along a scan line direction;

a fifth sub-pixel adjacent to the first sub-pixel along a data line direction;

a sixth sub-pixel adjacent to the second sub-pixel along a data line direction;

a seventh sub-pixel adjacent to the third sub-pixel along a data line direction;

an eighth sub-pixel adjacent to the fourth sub-pixel along a data line direction;

a first data line electrically connecting the first sub-pixel, the second sub-pixel, the fifth sub-pixel, and the sixth sub-pixel;

a second data line electrically connecting the third sub-pixel, the fourth sub-pixel, the seventh sub-pixel, and the eighth sub-pixel;

a first scan line electrically connecting the first sub-pixel and the third sub-pixel;

a second scan line electrically connecting the second sub-pixel and the fourth sub-pixel;

a third scan line electrically connecting the fifth sub-pixel and the seventh sub-pixel;

a fourth scan line electrically connecting the sixth sub-pixel and the eighth sub-pixel.

Figure 8B:
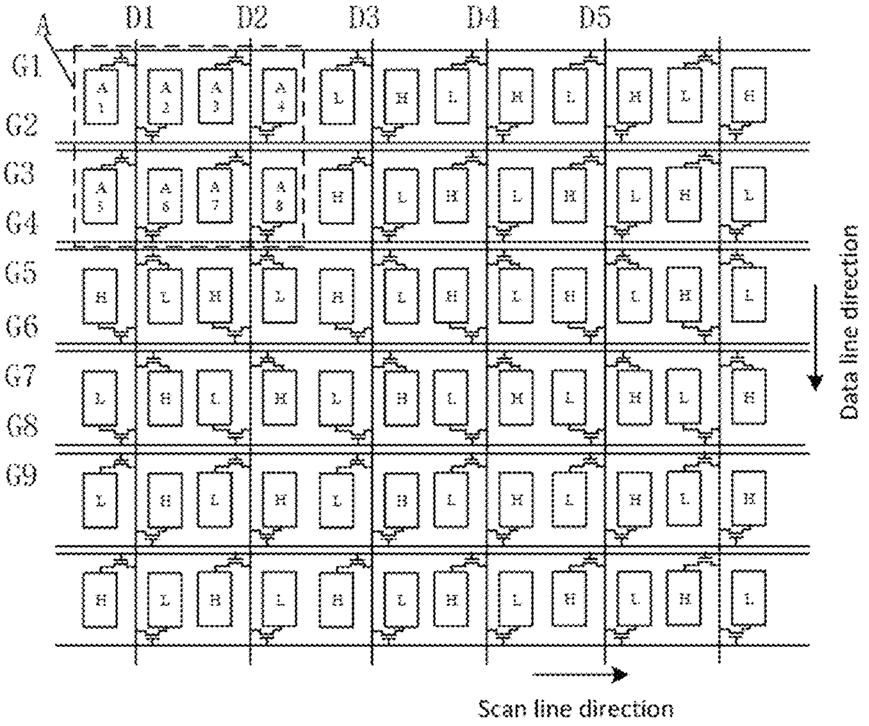
FIG. 8B is a schematic diagram of another seed pixel area according to a fourteenth embodiment of the present invention.

Referring to FIG. 8B, FIG. 8B is a schematic diagram of another seed pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific embodiment, the voltages applied to the first pixel A1, the fourth pixel A4, the sixth pixel A6, and the seventh pixel A7 have the same polarity and are opposite in polarity to the voltages applied to the second pixel A2, the third pixel A3, the fifth pixel A5, and the eighth pixel A8.

The voltage gray scales loaded onto the first pixel A1, the third pixel A3, the fifth pixel A5, and the seventh pixel A7 are different from the voltage gray scales loaded onto the second pixel A2, the fourth pixel A4, the sixth pixel A6, and the eighth pixel A8. Or the voltage gray scale loaded onto the first pixel A1, the third pixel A3, the sixth pixel A6, and the eighth pixel A8 is different from the voltage gray scale loaded onto the second pixel A2, the fourth pixel A4, the fifth pixel A5, and the seventh pixel A7.

According to the above-mentioned cooperation relationship between the polarity of the voltage applied to the sub-pixel and the gray scale of the voltage, a specific embodiment is shown. Within one frame, loading a positive low-gray scale voltage to the first pixel A1, which can be expressed as LP; loading a negative polarity high gray scale voltage to the second pixel A2, which can be expressed as HN; loading a negative low gray scale voltage to the third pixel A3, which can be expressed as LN; loading a positive polarity high gray scale voltage to the fourth pixel A4, which can be expressed as HP; loading a negative polarity high gray scale voltage to the fifth pixel A5, which can be expressed as HN; loading a positive low-gray scale voltage to the sixth pixel A6, which can be expressed as LP; loading a positive polarity high gray scale voltage to the seventh pixel A7, which can be expressed as HP; loading the negative polarity gray scale voltage to the eighth pixel A8, which can be expressed as LN.

In order to more clearly describe the above voltage loading relationship, from a certain column, the voltage relationship loaded for each sub-pixel in any column is sequentially expressed as: LP, HN, HN, LP, LP, HN, HN, LP . . . sequentially cycle; from a certain line, the voltage relationship loaded for each sub-pixel in any row is sequentially expressed as: LP, HN, LN, HP, LP, HN, LN, HP . . . sequentially cycle.

Or, loading a negative polarity gray scale voltage to the first pixel A1, which can be expressed as LN; loading a positive polarity high gray scale voltage to the second pixel A2, which can be expressed as HP; loading a positive low-gray scale voltage to the third pixel A3, which can be expressed as LP; loading a negative polarity high gray scale voltage to the fourth pixel A4, which can be expressed as HN; loading a positive polarity high gray scale voltage to the fifth pixel A5, which can be expressed as HP; loading a negative polarity gray scale voltage to the sixth pixel A6, which can be expressed as LN; loading a negative polarity high gray scale voltage to the seventh pixel A7, which can be expressed as HN; loading a positive low-gray scale voltage to the eighth pixel A8, which can be expressed as LP.

In order to more clearly describe the above voltage loading relationship, from a certain column, the voltage relationship loaded for each sub-pixel in any column is sequentially expressed as: LN, HP, HP, LN, LN, HP, HP, LN . . . sequentially cycle; from a certain line, the voltage relationship loaded for each sub-pixel in any row is sequentially expressed as: LN, HP, LP, HN, LN, HP, LP, HN . . . sequentially cycle.

Embodiment 15

In a specific embodiment, in order to more clearly show the solution of the eleventh embodiment of the present invention, the pixel matrix includes a plurality of sub-pixel areas, and each of the sub-pixel areas includes:

a first sub-pixel;

a second sub-pixel adjacent to the first sub-pixel along a scan line direction;

a third sub-pixel adjacent to the second sub-pixel along a scan line direction;

a fourth sub-pixel adjacent to the third sub-pixel along a scan line direction;

a fifth sub-pixel adjacent to the first sub-pixel along a data line direction;

a sixth sub-pixel adjacent to the second sub-pixel along a data line direction;

a seventh sub-pixel adjacent to the third sub-pixel along a data line direction;

an eighth sub-pixel adjacent to the fourth sub-pixel along a data line direction;

a first data line electrically connecting the first sub-pixel, the second sub-pixel, the fifth sub-pixel, and the sixth sub-pixel;

a second data line electrically connecting the third sub-pixel, the fourth sub-pixel, the seventh sub-pixel, and the eighth sub-pixel;

a first scan line electrically connecting the first sub-pixel and the fourth sub-pixel;

a second scan line electrically connecting the second sub-pixel and the third sub-pixel;

a third scan line electrically connecting the fifth sub-pixel and the eighth sub-pixel;

a fourth scan line electrically connecting the sixth sub-pixel and the seventh sub-pixel.

Figure 8C:
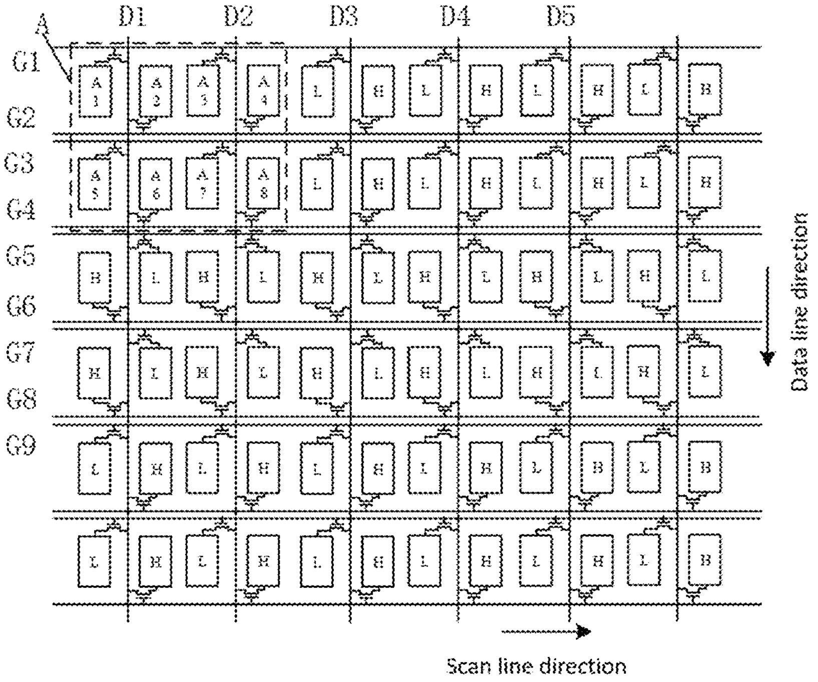
FIG. 8C is a schematic diagram of still another sub-pixel area according to the fifteenth embodiment of the present invention.

Referring to FIG. 8C, FIG. 8C is a schematic diagram of still another sub-pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific embodiment, the voltages applied to the first pixel A1, the third pixel A3, the sixth pixel A6, and the eighth pixel A8 have the same polarity and are opposite in polarity to the voltages applied to the second pixel A2, the fourth pixel A4, the fifth pixel A5, and the seventh pixel A7.

The voltage gray scales loaded onto the first pixel A1, the third pixel A3, the fifth pixel A5, and the seventh pixel A7 are different from the voltage gray scales loaded onto the second pixel A2, the fourth pixel A4, the sixth pixel A6, and the eighth pixel A8. Or the voltage gray scale loaded onto the first pixel A1, the third pixel A3, the sixth pixel A6, and the eighth pixel A8 is different from the voltage gray scale loaded onto the second pixel A2, the fourth pixel A4, the fifth pixel A5, and the seventh pixel A7.

According to the above-mentioned cooperation relationship between the polarity of the voltage applied to the sub-pixel and the gray scale of the voltage, a specific embodiment is shown. Within one frame, loading a positive low-gray scale voltage to the first pixel A1, which can be expressed as LP; loading a negative polarity high gray scale voltage to the second pixel A2, which can be expressed as HN; loading a negative low gray scale voltage to the third pixel A3, which can be expressed as LN; loading a positive polarity high gray scale voltage to the fourth pixel A4, which can be expressed as HP; loading a negative low gray scale voltage to the fifth pixel A5, which can be expressed as LN; loading a positive polarity high gray scale voltage to the sixth pixel A6, which can be expressed as HP; loading a positive low-gray scale voltage to the seventh pixel A7, which can be expressed as LP; loading a negative polarity high gray scale voltage to the eighth pixel A8, which can be expressed as HN.

In order to more clearly describe the above voltage loading relationship, from a certain column, the voltage relationship loaded for each sub-pixel in any column is sequentially expressed as: LP, LN, HN, HP, LP, LN, HN, HP . . . sequentially cycle; from a certain line, the voltage relationship loaded for each sub-pixel in any row is sequentially expressed as: LP, HN, LN, HP, LP, HN, LN, HP . . . sequentially cycle.

Or, loading a negative polarity gray scale voltage to the first pixel A1, which can be expressed as LN; loading a positive polarity high gray scale voltage to the second pixel A2, which can be expressed as HP; loading a positive low-gray scale voltage to the third pixel A3, which can be expressed as LP; loading a negative polarity high gray scale voltage to the fourth pixel A4, which can be expressed as HN; loading a positive low-gray scale voltage to the fifth pixel A5, which can be expressed as LP; loading a negative polarity high gray scale voltage to the sixth pixel A6, which can be expressed as HN; loading a negative polarity gray scale voltage to the seventh pixel A7, which can be expressed as LN; loading a positive polarity high gray scale voltage to the eighth pixel A8, which can be expressed as HP.

In order to more clearly describe the above voltage loading relationship, from a certain column, the voltage relationship loaded for each sub-pixel in any column is sequentially expressed as: LN, LP, HP, HN, LN, LP, HP, HN . . . sequentially cycle; from a certain line, the voltage relationship loaded for each sub-pixel in any row is sequentially expressed as: LN, HP, LP, HN, LN, HP, LP, HN . . . sequentially cycle.

Embodiment 16

Figure 8D:
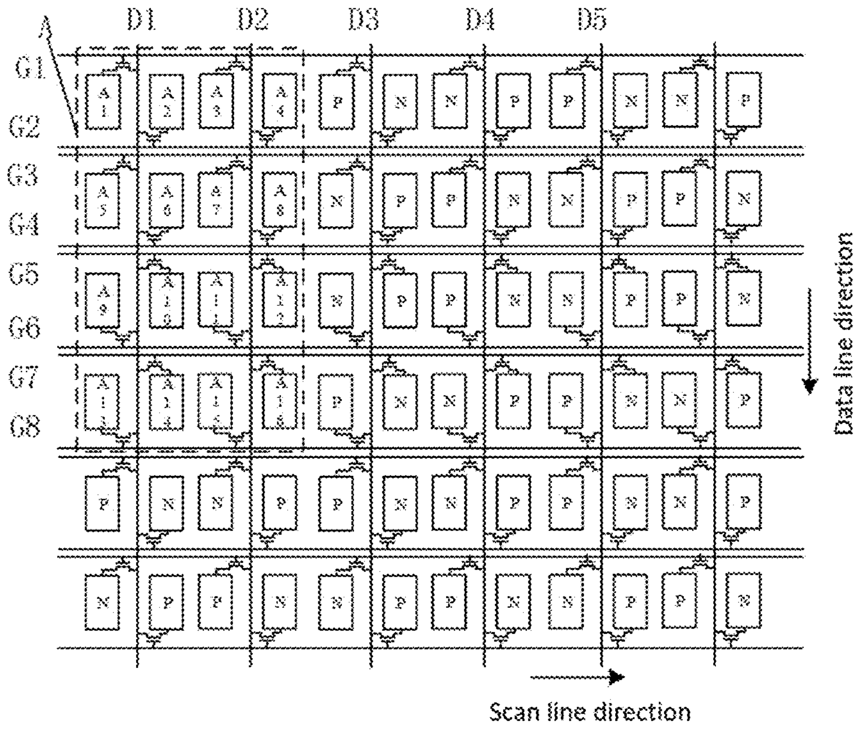
FIG. 8D is a schematic diagram of a pixel matrix driving manner according to a sixteenth embodiment of the present invention.
Figure 8E:
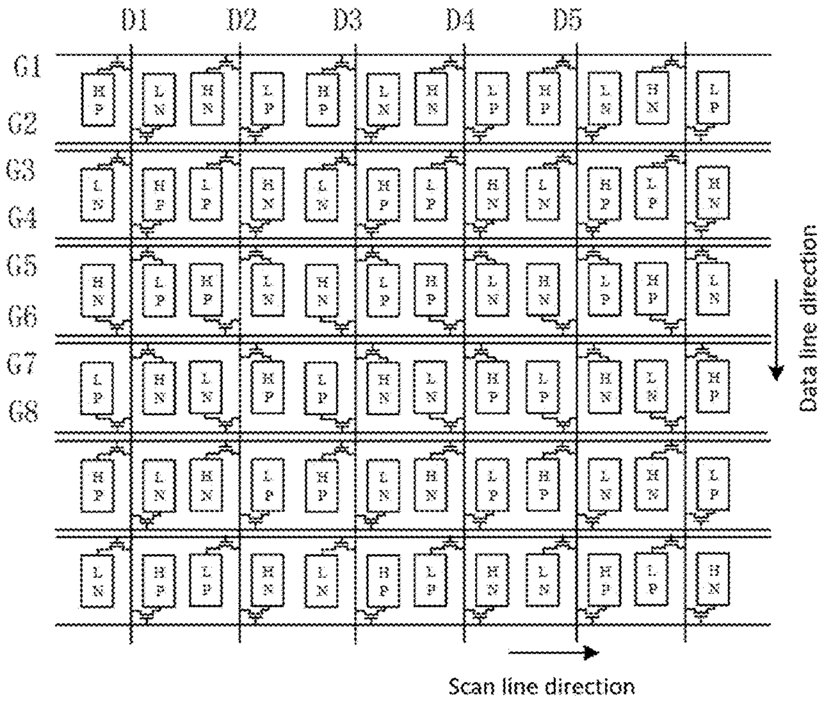
FIG. 8E is a schematic diagram of a specific implementation manner of the driving manner in FIG. 8D.

Please refer to FIG. 8D and FIG. 8E together, FIG. 8D is a schematic diagram of a pixel matrix driving manner according to an embodiment of the present invention; FIG. 8E is a schematic diagram of a specific implementation manner of the driving manner in FIG. 8D. In an optional 4×4 area, in this embodiment, the first pixel A1, the second pixel A2, the fifth pixel A5, the sixth pixel A6, the ninth pixel A9, the tenth pixel A10, the thirteenth pixel A13, and the fourteenth pixel A14 are connected to the first data line D1, the third pixel A3, the fourth pixel A4, the seventh pixel A7, the eighth pixel A8, the eleventh pixel A11, the twelfth pixel A12, the fifteenth pixel A15, the sixteenth pixel A16 are connected to the second data line D2;

- at the first moment in a frame, loading a scan signal on the first row of scan lines G1, and loading the voltage corresponding to HP to the first pixel A1 on the first data line D1, loading the voltage corresponding to the HN on the second data line D2 to the third pixel A3, and so on;
- at the next moment (the second moment), loading a scan signal on the second row of scan lines G2, and loading the voltage corresponding to LN on the first data line D1 to the second pixel A2, and loading the voltage corresponding to the LP on the second data line D2 to the fourth pixel A4, and so on;
- at the next moment (the third moment), loading a scan signal on the third row of scan lines G3, and loading the voltage corresponding to LN on the first data line D1 to the fifth pixel A5, and loading the voltage of the LP on the second data line D2 to the seventh pixel A7, and so on;
- at the next moment (the fourth moment), loading a scan signal on the fourth row of scan lines G4, and loading the voltage corresponding to HP to the sixth pixel A6 on the first data line D1, loading the voltage corresponding to the HN on the second data line D2 to the eighth pixel A8, and so on;
- at the next moment (the fifth moment), loading a scan signal on the fifth line scan line G5, and loading the voltage corresponding to the LP on the first data line D1 to the tenth pixel A10, and loading the voltage corresponding to the LN on the second data line D2 to the twelfth pixel A12, and so on;
- at the next moment (the sixth moment), loading a scan signal on the sixth line scan line G6, and loading the voltage corresponding to HN on the first data line D1 to the ninth pixel A9, and loading the voltage corresponding to HP on the third data line D2 to the eleventh pixel A11, and so on;
- at the next moment (the seventh moment), loading a scan signal on the seventh row of scan lines G7, and loading the voltage corresponding to HN to the fourteenth pixel A14 on the first data line D1, and loading the voltage corresponding to HP to the sixteenth pixel A16 on the second data line D2, and so on;

at the next moment (the eighth moment), loading a scan signal on the eighth line scan line G8, and loading the voltage corresponding to the LP on the first data line D1 to the thirteenth pixel A13, and loading the voltage corresponding to the LN on the second data line D2 to the fifteenth pixel A15, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 17

Figure 8F:
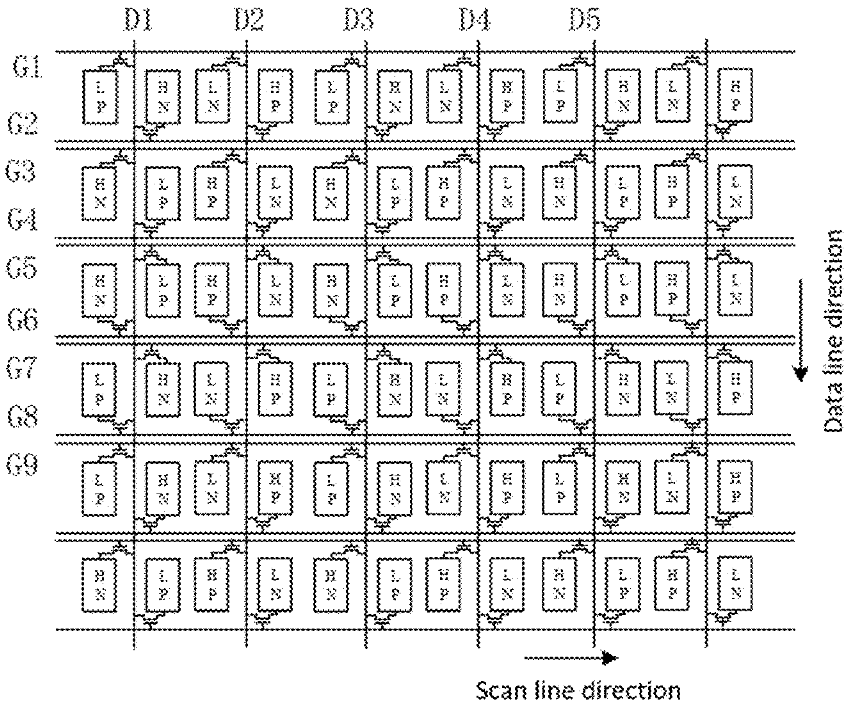
FIG. 8F is a schematic diagram of another specific embodiment of the driving method in FIG. 8D.

Please refer to FIG. 8D and FIG. 8F together. FIG. 8F is a schematic diagram of another specific implementation manner of the driving manner in FIG. 8D. In an optional 4×4 area, in this embodiment, the first pixel A1, the second pixel A2, the fifth pixel A5, the sixth pixel A6, the ninth pixel A9, the tenth pixel A10, the thirteenth pixel A13, and the fourteenth pixel A14 are connected to the first data line D1, the third pixel A3, the fourth pixel A4, the seventh pixel A7, the eighth pixel A8, the eleventh pixel A11, the twelfth pixel A12, the fifteenth pixel A15, the sixteenth pixel A16 are connected to the second data line D2;

at the first moment in a frame, loading a scan signal on the first row of scan lines G1, and loading the voltage corresponding to the LP on the first data line D1 to the first pixel A1, and loading the voltage corresponding to the LN on the second data line D2 to the third pixel A3, and so on;

at the next moment (the second moment), loading a scan signal on the second row of scan lines G2, and loading the voltage corresponding to HN on the first data line D1 to the second pixel A2, loading the voltage corresponding to HP on the second data line D2 to the fourth pixel A4, and so on;

at the next moment (the third moment), loading a scan signal on the third row of scan lines G3, and loading the voltage corresponding to HN on the first data line D1 to the fifth pixel A5, and loading the voltage corresponding to HP on the second data line D2 to the seventh pixel A7, and so on;

at the next moment (the fourth moment), loading a scan signal on the fourth row of scan lines G4, and loading the voltage corresponding to the LP on the first data line D1 to the sixth pixel A6, and loading the voltage corresponding to the LN on the second data line D2 to the eighth pixel A8, and so on;

at the next moment (the fifth moment), loading a scan signal on the fifth line scan line G5, and loading the voltage corresponding to the LP on the first data line D1 to the tenth pixel A10, and loading the voltage corresponding to the LN on the second data line D2 to the twelfth pixel A12, and so on;

at the next moment (the sixth moment), loading a scan signal on the sixth line scan line G6, and loading the voltage corresponding to HN on the first data line D1 to the ninth pixel A9, and loading the voltage corresponding to HP on the third data line D2 to the eleventh pixel A11, and so on;

at the next moment (the seventh moment), loading a scan signal on the seventh row of scan lines G7, and loading the voltage corresponding to HN to the fourteenth pixel A14 on the first data line D1, and loading the voltage corresponding to HP to the sixteenth pixel A16 on the second data line D2, and so on;

at the next moment (the eighth moment), loading a scan signal on the eighth line scan line G8, and loading the voltage corresponding to the LP on the first data line D1 to the thirteenth pixel A13, and loading the voltage corresponding to the LN on the second data line D2 to the fifteenth pixel A15, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 18

Figure 8G:
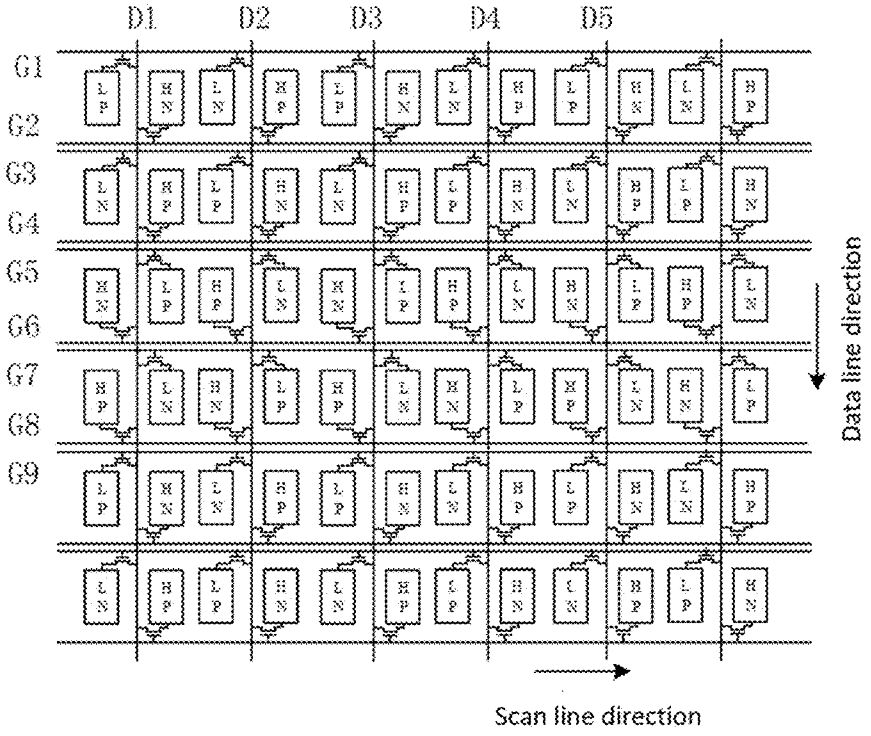
FIG. 8G is a schematic diagram of still another specific embodiment of the driving method in FIG. 8D.

Please refer to FIG. 8D and FIG. 8G together. FIG. 8G is a schematic diagram of still another specific implementation manner of the driving manner in FIG. 8D. In an optional 4×4 area, in this embodiment, the first pixel A1, the second pixel A2, the fifth pixel A5, the sixth pixel A6, the ninth pixel A9, the tenth pixel A10, the thirteenth pixel A13, and the fourteenth pixel A14 are connected to the first data line D1, the third pixel A3, the fourth pixel A4, the seventh pixel A7, the eighth pixel A8, the eleventh pixel A11, the twelfth pixel A12, the fifteenth pixel A15, the sixteenth pixel A16 are connected to the second data line D2;

at the first moment in a frame, loading a scan signal on the first row of scan lines G1, and loading the voltage corresponding to the LP on the first data line D1 to the first pixel A1, and loading the voltage corresponding to the LN on the second data line D2 to the third pixel A3, and so on;

at the next moment (the second moment), loading a scan signal on the second row of scan lines G2, and loading the voltage corresponding to HN on the first data line D1 to the second pixel A2, loading the voltage corresponding to HP on the second data line D2 to the fourth pixel A4, and so on;

at the next moment (the third moment), loading a scan signal on the third row of scan lines G3, and loading the voltage corresponding to LN on the first data line D1 to the fifth pixel A5, and loading the voltage corresponding to the LP on the second data line D2 to the seventh pixel A7, and so on;

at the next moment (the fourth moment), loading a scan signal on the fourth row of scan lines G4, and loading the voltage corresponding to HP to the sixth pixel A6 on the first data line D1, loading the voltage corresponding to the HN on the second data line D2 to the eighth pixel A8, and so on;

at the next moment (the fifth moment), loading a scan signal on the fifth line scan line G5, and loading the voltage corresponding to the LP on the first data line D1 to the tenth pixel A10, and loading the voltage corresponding to the LN on the second data line D2 to the twelfth pixel A12, and so on;

at the next moment (the sixth moment), loading a scan signal on the sixth line scan line G6, and loading the voltage corresponding to HN on the first data line D1 to the ninth pixel A9, and loading the voltage corresponding to HP on the third data line D2 to the eleventh pixel A11, and so on;

at the next moment (the seventh moment), loading a scan signal on the seventh row of scan lines G7, and loading the voltage corresponding to LN to the fourteenth pixel A14 on the first data line D1, and loading the voltage corresponding to the LP on the second data line D2 to the sixteenth pixel A16, and so on;

at the next moment (the eighth moment), loading a scan signal on the eighth row of scan lines G8, and loading the voltage corresponding to HP to the thirteenth pixel A13 on the first data line D1, and loading the voltage corresponding to the HN to the fifteenth pixel A15 on the second data line D2, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 19

Referring to FIG. 3 again, the method for driving the pixel matrix of the present embodiment is applicable to a display having a pixel array, such as an LCD display, an LED display, an OLED display, or the like.

Further, the pixel matrix includes a plurality of sub-pixels arranged in a matrix, and a voltage applied along the data line changes a polarity once every two sub-pixels, and any one of the data lines controls a voltage input of one sub-pixel on both sides thereof. Specifically, for the sub-pixel polarity, the polarity inversion manner in the scan line direction is 1+2N, the single-point inversion in the data line direction, and the data line polarity inversion mode is 1+2N.

Specifically, the method may include the following steps:

Step 1, receiving an image data, and acquiring original pixel data according to the image data;

Step 2, obtaining a first gray scale data and a second gray scale data according to the original pixel data;

Step 3, generating the first driving voltage corresponding to the first gray scale data and the second driving voltage corresponding to the second gray scale data according to the first gray scale data and the second gray scale data;

Step 4, loading the first driving voltage or the second driving voltage into the pixel matrix along a data line direction in one frame.

Wherein, the image data refers to a digital signal input to the timing controller TCON, and the image data is input frame by frame, and the original pixel data is parsed by the image data. In one of the prior arts, the original pixel data, that is, a specific gray scale value corresponding to each sub-pixel in each pixel of the pixel matrix, the gray scale value input to each sub-pixel is directly determined by the image data input into the TCON, and the original pixel data is not processed. Such methods are affected by the polarity of the sub-pixels, which causes the sub-pixel polarity to easily cause crosstalk, bright and dark lines and other negative effects.

In this embodiment, by processing the original pixel data, further first gray scale data and second gray scale data are obtained, and the gray scales of the first gray scale data and the second gray scale data are different. Furthermore, the image is loaded into the corresponding sub-pixels at different intervals between different pixels or between different frames. The solution in this embodiment can generate two sets of different gray scales, respectively corresponding to different sub-pixels. In this way, it is possible to prevent the voltage applied to the sub-pixel from being affected by the polarity inversion, thereby avoiding the occurrence of crosstalk and bright and dark lines.

In a specific example, the first gray scale data is considered to be high gray scale data, and the second gray scale data is considered to be low gray scale data. Correspondingly, the magnitude of the voltage input to the sub-pixel is determined by the gray scale, the high gray scale voltage generated corresponding to the high gray scale data, that is, the first driving voltage; and the low gray scale voltage generated corresponding to the low gray scale data, that is, the second driving voltage. It is worth mentioning that the above-mentioned high gray scale and low gray scale represent the relative values of the gray scale sizes of the two groups, and the magnitude of the values is not separately limited.

Figure 9A:
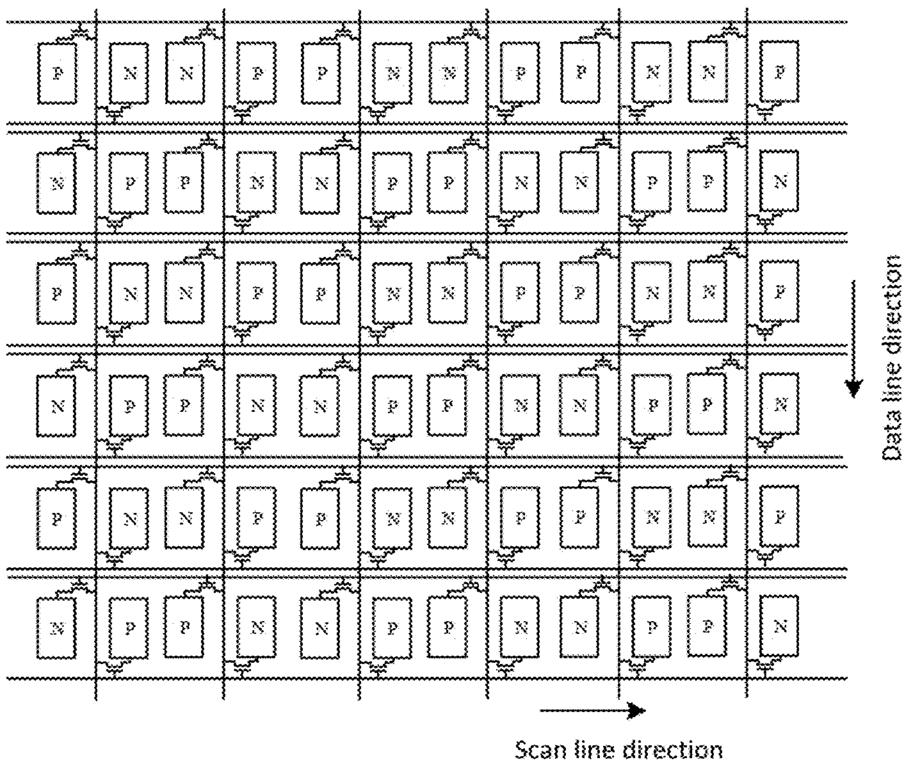
FIG. 9A is a schematic diagram of polarity loading of a pixel matrix according to a nineteenth embodiment of the present invention.

Referring to FIG. 9A, FIG. 9A is a schematic diagram of polarity loading of a pixel matrix according to an embodiment of the present invention. From a certain line, the two consecutive sub-pixels have the same polarity, and the next two consecutive sub-pixels have opposite polarities to the last two polarities, from a certain column, the sub-pixel polarity is alternately reversed, and so on. Overall, the voltage applied to the sub-pixels is inverted once every two sub-pixels in the scan line direction, and the voltage applied to the sub-pixels is inverted once every sub-pixel polarity in the data line direction. In FIG. 9A, P represents a positive voltage and N represents a negative voltage. From a certain column, the polarity transformation can be expressed as PNPN . . . PNPN or NPNP . . . NPNP. From a certain line, the polarity transformation can be expressed as PNNP . . . PNNP or NPPN . . . NPPN.

Figure 9B:
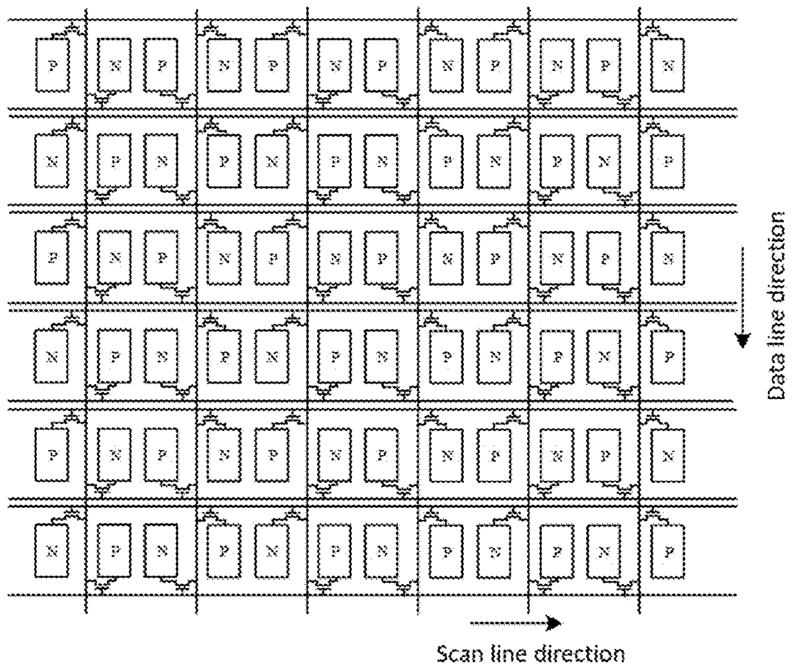
FIG. 9B is another schematic diagram of polarity loading of a pixel matrix according to a nineteenth embodiment of the present invention.

Referring to FIG. 9B, FIG. 9B is a schematic diagram of another pixel matrix polarity loading according to an embodiment of the present invention. Any data line controls the voltage input of one sub-pixel on both sides. From a certain line, the sub-pixel polarity is alternately reversed. From a certain column, the sub-pixel polarity is alternately reversed, and so on. Overall, the voltage applied to the sub-pixels is inverted once in the polarity of each sub-pixel along the scan line direction, and the voltage applied to the sub-pixels is inverted once every sub-pixel polarity in the direction of the data line. Specifically, for the sub-pixel polarity, it is single-point inversion along the scan line direction and along the data line direction, and the data line polarity inversion mode is 1+2N. In FIG. 9B, P represents a positive voltage and N represents a negative voltage. From a certain column, the polarity transformation can be expressed as PNPN . . . PNPN or NPNP . . . NPNP, from a certain line, the polarity transformation can be expressed as PNPN . . . PNPN or NPNP . . . NPNP.

In a specific embodiment, the step of obtaining a first gray scale data and a second gray scale data according to the original pixel data includes: obtaining an original gray scale value of each pixel position according to the original pixel data, and converting the original gray scale value of each pixel position into the first gray scale data or the second gray scale data according to a predetermined conversion manner.

After determining the gray scale corresponding to each pixel position according to the rule of the present invention, the timing controller adjusts the original gray scale correspondence of the pixel position to a high gray scale or a low gray scale, and transmits the adjusted gray scale value to the data driving unit, and the number driving unit outputs the corresponding voltage according to the gray scale value.

For example, the original gray scale value of the A position is 128 gray scale. If the above rule according to the present invention, the A position should output a high gray scale, that is, H, after calculation, in this example, 128 gray scale corresponding H=138 gray scale value, then output 138 gray scale to the A position, the data driving unit receives 138 gray scale, according to the established conversion rule, the voltage corresponding to 138 gray scale is 10V, and finally the voltage signal of 10V is output to the A position. Generally, the adjustment range of the high and low gray scales is determined by the difference of materials such as liquid crystal.

For another example, the original gray scale value of the B position is 128 gray scale. If the above rule is used according to the present invention, the B position should output a low gray scale, that is, L, after calculation, in this example, the 128 gray scale corresponds to the L=118 gray scale value, then the output is 118 gray scale to the B position, and the data driving unit receives the 118 gray scale, according to the established conversion rules, the voltage corresponding to the gray scale of 118 is 8V, and finally the voltage signal of 8V is output to the B position.

In a specific embodiment, the step of loading the first driving voltage or the second driving voltage to the pixel matrix along the data lines includes:

loading the first driving voltage or the second driving voltage to adjacent pixel sub-pixels to the pixel matrix in a data line direction; and loading the first driving voltage or the second driving voltage alternately to the adjacent pixel in the scan line direction to the pixel matrix.

The pixel matrix is physically divided into a plurality of small blocks arranged in a matrix by a plurality of interleaved data lines and scan lines, and each small block is one sub-pixel.

Figure 9C:
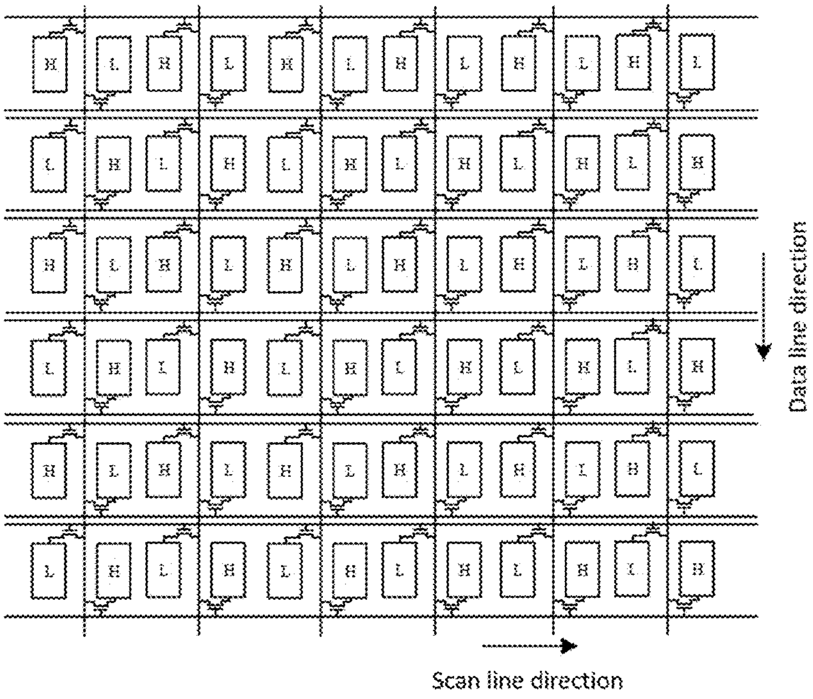
FIG. 9C is a schematic diagram of a gray matrix loading of a pixel matrix according to a nineteenth embodiment of the present invention.

For example, refer to FIG. 9C, which is a schematic diagram of a gray matrix loading of a pixel matrix according to an embodiment of the present invention. From a certain line, the gray-scale voltages loaded into the sub-pixels are alternately transformed, from a certain column, the gray-scale voltages loaded into the sub-pixels are alternately transformed, and so on. In FIG. 9C, H represents a high gray scale voltage, and L represents a low gray scale voltage. From a certain column, the gray scale voltage can be expressed as HLHL . . . HLHL or LHLH . . . LHLH. From a certain line, the gray scale voltage can be expressed as HLHL . . . HLHL or LHLH . . . LHLH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Embodiment 20

Figure 9D:
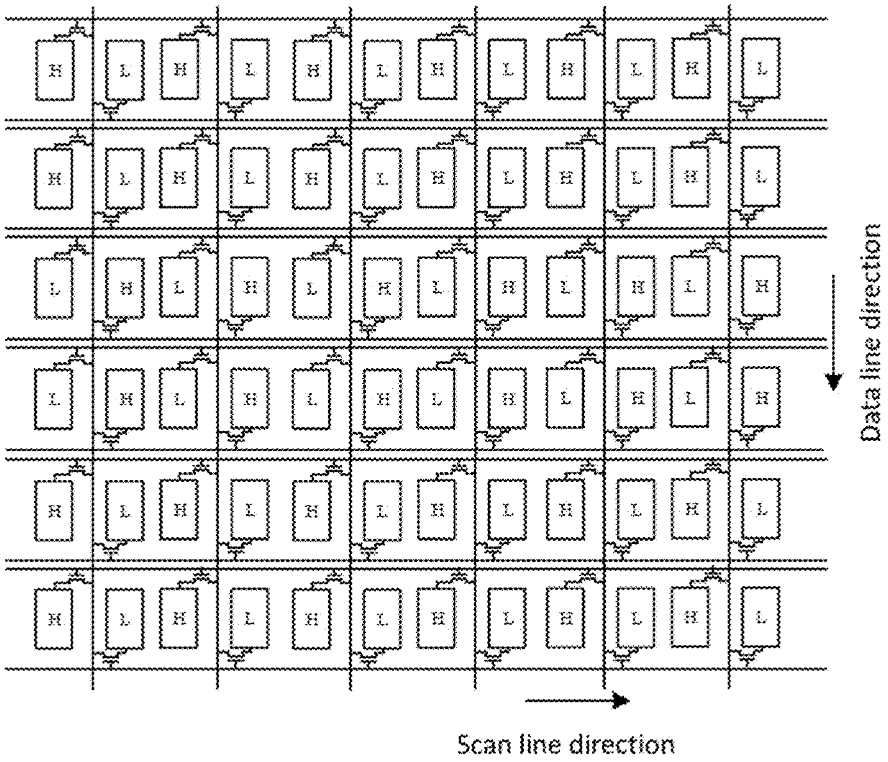
FIG. 9D is a schematic diagram of a gray matrix loading of a pixel matrix according to a twentieth embodiment of the present invention.

For example, refer to FIG. 9D, which is another schematic diagram of gray matrix loading of a pixel matrix according to an embodiment of the present invention. The step of loading the first driving voltage or the second driving voltage into the pixel matrix along a data line direction includes:

loading the first driving voltage or the second driving voltage alternately to every two sub-pixels along a data line direction, and gray scales on adjacent sub-pixels on both sides of the data line are different; and loading the first driving voltage or the second driving voltage to adjacent sub-pixels in a scan line direction.

The gray scale on the adjacent sub-pixels on both sides of the data line is different, that is, when the adjacent sub-pixel on the left side of the data line is H, the adjacent sub-pixel on the right side of the data line is L, and vice versa.

From a certain column, the gray scale voltages applied to two consecutive sub-pixels are the same, and the gray scale voltages of two consecutive sub-pixels loaded are different from the previous two, from a certain line, the gray-scale voltages loaded into the sub-pixels alternately change, and so on. In FIG. 9D, H represents a high gray scale voltage, and L represents a low gray scale voltage. From a certain column, the gray scale voltage can be expressed as HHLL . . . HHLL or LLHH . . . LLHH. From a certain line, the gray scale voltage can be expressed as HLHL . . . HLHL or LHLH . . . LHLH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Figure 9E:
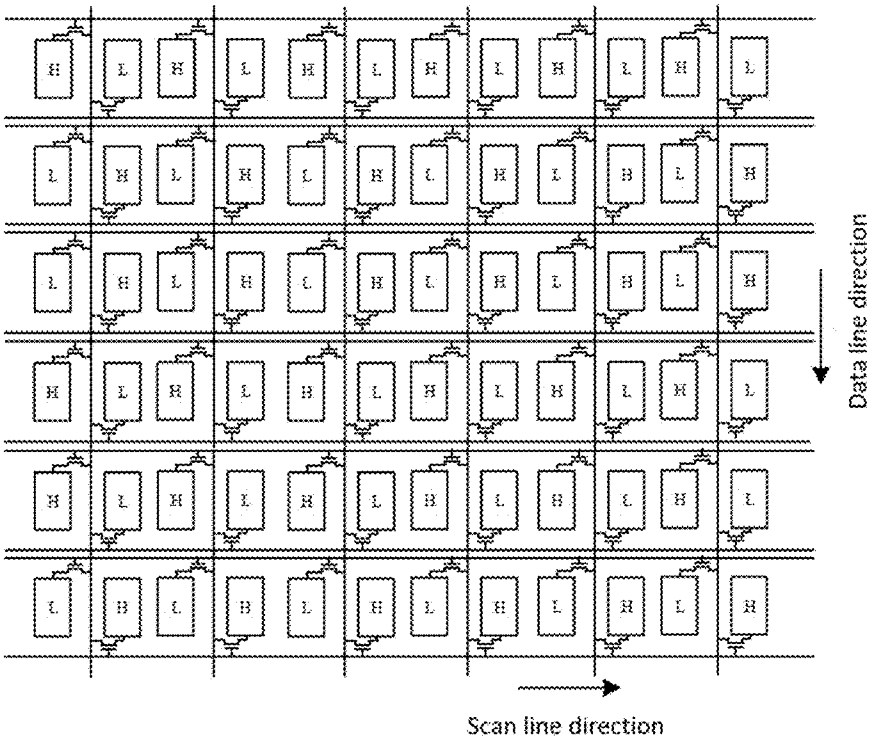
FIG. 9E is a schematic diagram of another gray matrix loading of a pixel matrix according to a twentieth embodiment of the present invention.

For example, refer to FIG. 9E, which is a schematic diagram of another gray matrix loading of a pixel matrix according to an embodiment of the present invention. The step of loading the first driving voltage or the second driving voltage to the pixel matrix along the data lines includes:

loading the first driving voltage and the second driving voltage alternately to each adjacent sub-pixel along a data line direction, and gray scales on adjacent sub-pixels on both sides of the data line are different; and loading the first driving voltage and the second driving voltage alternately as per every two sub-pixels along the scan line direction.

The gray scale on the adjacent sub-pixels on both sides of the data line is different, that is, when the adjacent sub-pixel on the left side of the data line is H, the adjacent sub-pixel on the right side of the data line is L, and vice versa.

From a certain line, the gray scale voltages of two consecutive sub-pixels are the same, and the gray scale voltages of two consecutive sub-pixels loaded are different from the previous two. From a certain column, the gray-scale voltages loaded into the sub-pixels are alternately transformed, and so on. In FIG. 9E, H represents a high gray scale voltage, and L represents a low gray scale voltage. From a certain column, the gray scale voltage can be expressed as HLHL . . . HLHL or LHLH . . . LHLH. From a certain line, the gray scale voltage can be expressed as HHLL . . . HHLL or LLHH . . . LLHH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Figure 9F:
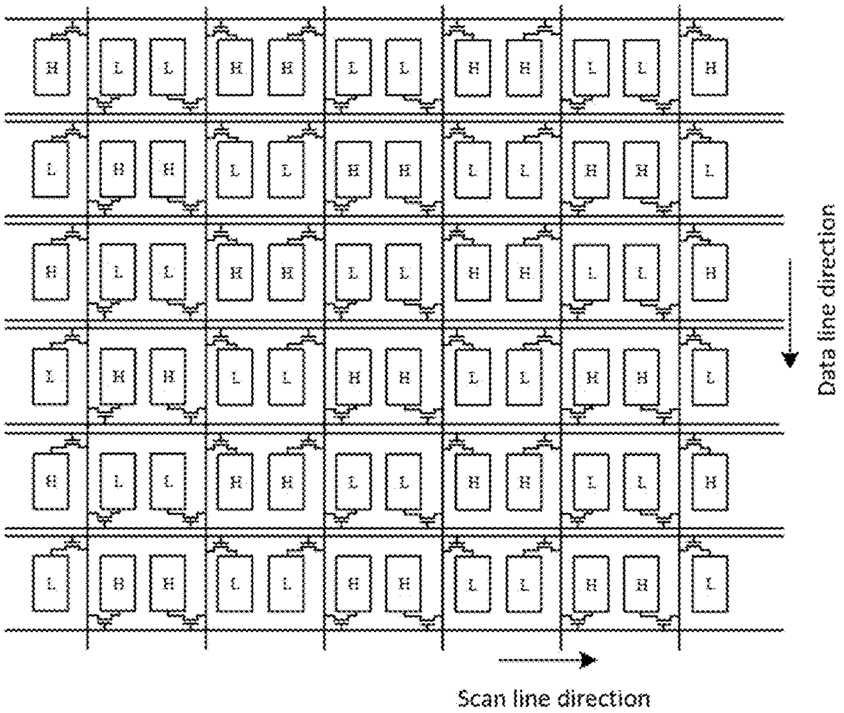
FIG. 9F is a schematic diagram of another gray matrix loading of a pixel matrix according to a twentieth embodiment of the present invention.

In another driving architecture, reference may be made to FIG. 9F, which is a schematic diagram of another gray matrix loading of a pixel matrix according to an embodiment of the present invention. From a certain line, the gray scale voltages of two consecutive sub-pixels are the same, and the gray scale voltages of two consecutive sub-pixels loaded are different from the previous two. From a certain line, the gray-scale voltages loaded into the sub-pixels alternately change, and so on. In FIG. 9F, H represents a high gray scale voltage, and L represents a low gray scale voltage. From a certain column, the gray scale voltage can be expressed as HLHL . . . HLHL or LHLH . . . LHLH. From a certain line, the gray scale voltage can be expressed as HHLL . . . HHLL or LLHH . . . LLHH.

Embodiment 21

Referring to FIG. 5 again, in the method for driving the pixel matrix of the embodiment, the pixel matrix includes a plurality of sub-pixels arranged in a matrix, the voltages applied to the sub-pixels are inverted once every two sub-pixels in the direction of the data line, and the voltages applied to the sub-pixels are inverted once per sub-pixel polarity in the scan line direction.

Specifically, the method includes:

Step 1, receiving an image data, and acquiring original pixel data according to the image data;

Step 2, obtaining original data driving signals for each pixel positions according to the original pixel data;

Step 3, converting the original data driving signals into the first driving voltage or the second driving voltage according to a preset conversion rule;

Step 4, loading the first driving voltage or the second driving voltage into the pixel matrix along a data line direction in one frame.

Loading the first driving voltage or the second driving voltage to adjacent pixel sub-pixels to the pixel matrix in a data line direction; and loading the first driving voltage or the second driving voltage alternately to the adjacent pixel in the scan line direction to the pixel matrix.

Or in a frame, along the data line direction, loading the first driving voltage and the second driving voltage alternately to adjacent sub-pixels, and gray scales on adjacent sub-pixels on both sides of the data line are different; and loading the first driving voltage and the second driving voltage alternately as per every two sub-pixels along the scan line direction.

Or in a frame, along the data line direction, loading the second driving voltage of the first driving voltage alternately to adjacent sub-pixels, and gray scales on adjacent sub-pixels on both sides of the data line are the same; and loading the second driving voltage of the first driving voltage alternately to every two sub-pixels along the scan line direction.

In the method, the original pixel data of the embodiment corresponds to a set of gray scale values. In the data driving circuit, the original data driving signal corresponding to the gray scale value is generated, and the original data driving signal is adjusted to two different driving voltages. That is, the first driving voltage or the second driving voltage is output correspondingly, in this embodiment, by using two sets of different gammas to generate driving signals for driving sub-pixels, a set of original data driving signals are generated under different gamma to generate two sets of driving voltages, and then the driving control of the present invention is implemented. In a specific implementation of the solution of the embodiment, the TCON outputs a set of gray scales, and the data driving circuit generates two sets of gammas, and each group respectively drives different sub-pixels, thereby achieving the same technical effect as the first embodiment.

In a specific embodiment, the step of obtaining original data driving signals for each pixel positions according to the original pixel data includes: obtaining an original gray scale value of each pixel position according to the original pixel data, and obtaining the original data driving signals according to the original gray scale value.

The timing controller of the present invention analyzes the original image, analyzes the original gray scale value of each pixel position, and determines a conversion rule corresponding to the position, and the conversion rule adjusts the original gray scale value to a high gray scale H or a low gray scale L. The method of the present invention does not directly perform gray scale conversion in the timing controller, and sends the original gray scale value and the corresponding H or L conversion rule to the data driving unit, the data driving unit directly outputs the corresponding driving voltage according to the original gray scale value and the corresponding H or L according to the rule.

For example, in one embodiment, the original gray scale value of the A position is 128 gray scales, and 128 gray scales are output for the A position. According to the conversion rule, the position of A should be H. After the driver circuit receives 128 gray scales, find the corresponding voltage 10V in the gray-scale corresponding voltage conversion table of H, and finally output the driving voltage signal of 10V to the A position.

For example, the original gray scale value of the B position is 128 gray scale, for the B position output 128 gray scale according to the conversion rule B position should be L drive circuit after receiving 128 gray scale, find the corresponding voltage 8V in the gray scale corresponding pressure conversion table of L, and finally output 8V data signal to the A position.

In this embodiment, the reasonable high gray scale voltage is matched with the low gray scale voltage, so that the pixels in the pixel matrix are not affected by the polarity, and the problems such as crosstalk, bright and dark lines are avoided, and the display effect is improved.

Embodiment 22

In a specific embodiment, in order to more clearly show the solution of the nineteenth embodiment of the present invention, the pixel matrix includes a plurality of sub-pixel areas, and each of the sub-pixel areas includes:

a first sub-pixel;

a second sub-pixel adjacent to the first sub-pixel along a scan line direction;

a third sub-pixel adjacent to the second sub-pixel along a scan line direction;

a fourth sub-pixel adjacent to the third sub-pixel along a scan line direction;

a fifth sub-pixel adjacent to the first sub-pixel along a data line direction;

a sixth sub-pixel adjacent to the second sub-pixel along a data line direction;

a seventh sub-pixel adjacent to the third sub-pixel along a data line direction;

an eighth sub-pixel adjacent to the fourth sub-pixel along a data line direction;

a first data line electrically connecting the first sub-pixel, the second sub-pixel, the fifth sub-pixel, and the sixth sub-pixel;

a second data line electrically connecting the third sub-pixel, the fourth sub-pixel, the seventh sub-pixel, and the eighth sub-pixel;

a first scan line electrically connecting the first sub-pixel and the third sub-pixel;

a second scan line electrically connecting the second sub-pixel and the fourth sub-pixel;

a third scan line electrically connecting the fifth sub-pixel and the seventh sub-pixel;

a fourth scan line electrically connecting the sixth sub-pixel and the eighth sub-pixel.

Figure 10A:
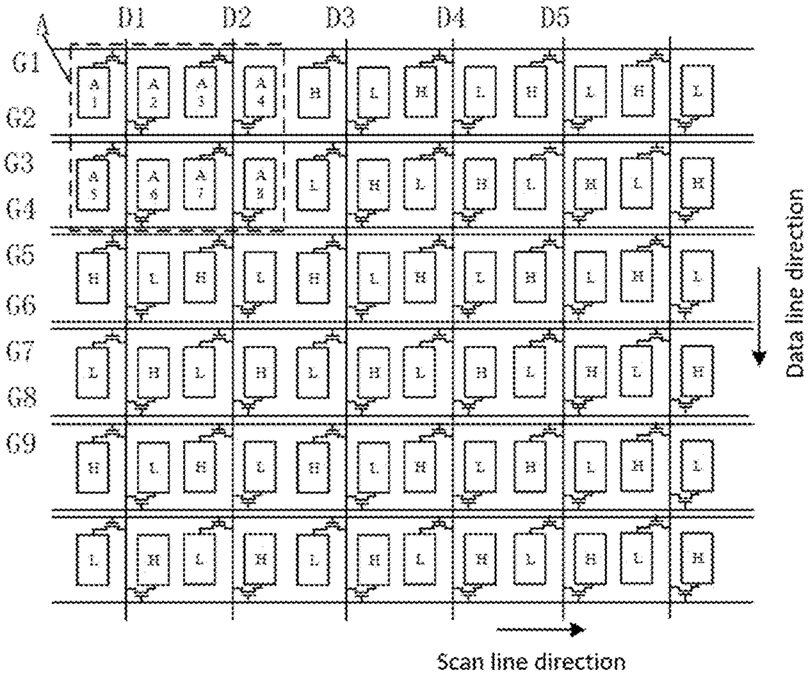
FIG. 10A is a schematic diagram of a sub-pixel area according to a twenty-second embodiment of the present invention.

Referring to FIG. 10A, FIG. 10A is a schematic diagram of a sub-pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific embodiment, the voltages applied to the first pixel A1, the fourth pixel A4, the sixth pixel A6, and the seventh pixel A7 have the same polarity and are opposite in polarity to the voltages applied to the second pixel A2, the third pixel A3, the fifth pixel A5, and the eighth pixel A8.

The voltage gray scales loaded onto the first pixel A1, the third pixel A3, the sixth pixel A6, and the eighth pixel A8 are different from the voltage gray scales loaded onto the second pixel A2, the fourth pixel A4, the fifth pixel A5, and the seventh pixel A7.

According to the above-mentioned cooperation relationship between the polarity of the voltage applied to the sub-pixel and the gray scale of the voltage, a specific embodiment is shown. Within one frame, loading a positive polarity high gray scale voltage to the first pixel A1, which can be expressed as HP; loading a negative polarity gray scale voltage to the second pixel A2, which can be expressed as LN; loading a negative low gray scale voltage to the third pixel A3, which can be expressed as LN; loading a positive low-gray scale voltage to the fourth pixel A4, which can be expressed as LP; loading a negative low gray scale voltage to the fifth pixel A5, which can be expressed as LN; loading a positive polarity high gray scale voltage to the sixth pixel A6, which can be expressed as HP; loading a positive low-gray scale voltage to the seventh pixel A7, which can be expressed as LP; loading a negative polarity high gray scale voltage to the eighth pixel A8, which can be expressed as HN.

In order to more clearly describe the above voltage loading relationship, from a certain column, the voltage relationship loaded for each sub-pixel in any column is sequentially expressed as: HP, LN, HP, LN, HP, LN, HP, LN . . . sequentially cycle; from a certain line, the voltage relationship loaded for each sub-pixel in any row is sequentially expressed as: HP, LN, HN, LP, HP, LN, HN, LP . . . sequentially cycle.

Or, loading a negative polarity high gray scale voltage to the first pixel A1, which can be expressed as HN; loading a positive low-gray scale voltage to the second pixel A2, which can be expressed as LP; loading a positive low-gray scale voltage to the third pixel A3, which can be expressed as LP; loading a negative polarity gray scale voltage to the fourth pixel A4, which can be expressed as LN; loading a positive low-gray scale voltage to the fifth pixel A5, which can be expressed as LP; loading a negative polarity high gray scale voltage to the sixth pixel A6, which can be expressed as HN; loading a negative polarity gray scale voltage to the seventh pixel A7, which can be expressed as LN; loading a positive polarity high gray scale voltage to the eighth pixel A8, which can be expressed as HP.

In order to more clearly describe the above voltage loading relationship, from a certain column, the voltage relationship loaded for each sub-pixel in any column is sequentially expressed as: HN, LP, HN, LP, HN, LP, HN, LP . . . sequentially cycle; from a certain line, the voltage relationship loaded for each sub-pixel in any row is sequentially expressed as: HN, LP, HP, LN, HN, LP, HP, LN . . . sequentially cycle.

Embodiment 23

In a specific embodiment, in order to more clearly show the solution of the twentieth embodiment of the present invention, the pixel matrix includes a plurality of sub-pixel areas, and each of the sub-pixel areas includes:

a first sub-pixel;

a second sub-pixel adjacent to the first sub-pixel along a scan line direction;

a third sub-pixel adjacent to the second sub-pixel along a scan line direction;

a fourth sub-pixel adjacent to the third sub-pixel along a scan line direction;

a fifth sub-pixel adjacent to the first sub-pixel along a data line direction;

a sixth sub-pixel adjacent to the second sub-pixel along a data line direction;

a seventh sub-pixel adjacent to the third sub-pixel along a data line direction;

an eighth sub-pixel adjacent to the fourth sub-pixel along a data line direction;

a first data line electrically connecting the first sub-pixel, the second sub-pixel, the fifth sub-pixel, and the sixth sub-pixel;

a second data line electrically connecting the third sub-pixel, the fourth sub-pixel, the seventh sub-pixel, and the eighth sub-pixel;

a first scan line electrically connecting the first sub-pixel and the third sub-pixel;

a second scan line electrically connecting the second sub-pixel and the fourth sub-pixel;

a third scan line electrically connecting the fifth sub-pixel and the seventh sub-pixel;

a fourth scan line electrically connecting the sixth sub-pixel and the eighth sub-pixel.

Figure 10B:
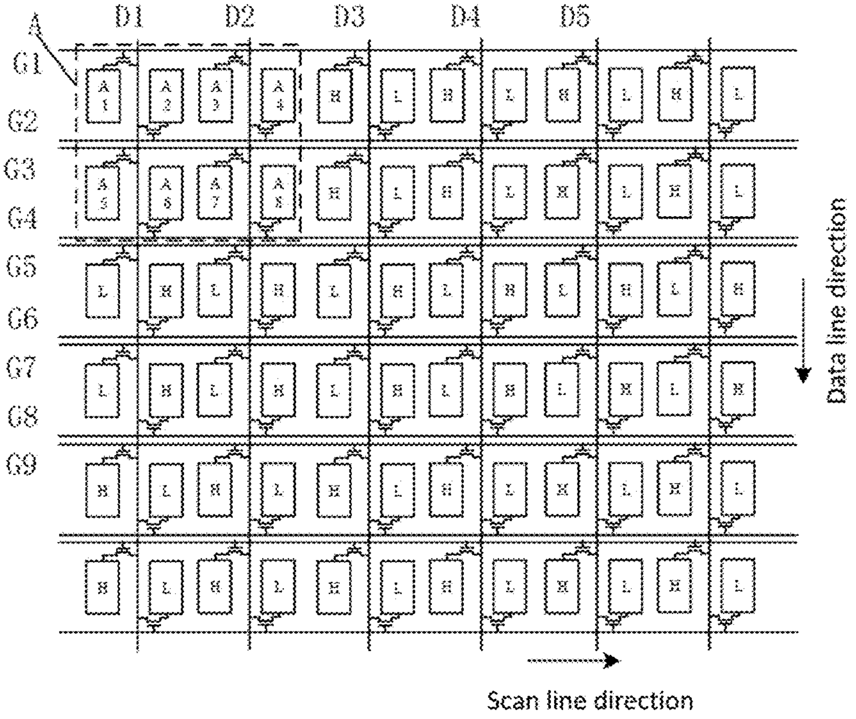
FIG. 10B is a schematic diagram of a sub-pixel area according to a twenty-third embodiment of the present invention.

Referring to FIG. 10B, FIG. 10B is a schematic diagram of another seed pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas.

In a specific embodiment, the voltages applied to the first pixel A1, the fourth pixel A4, the sixth pixel A6, and the seventh pixel A7 have the same polarity and are opposite in polarity to the voltages applied to the second pixel A2, the third pixel A3, the fifth pixel A5, and the eighth pixel A8.

The voltage gray scales loaded onto the first pixel A1, the third pixel A3, the fifth pixel A5, and the seventh pixel A7 are different from the voltage gray scales loaded onto the second pixel A2, the fourth pixel A4, the sixth pixel A6, and the eighth pixel A8.

According to the above-mentioned cooperation relationship between the polarity of the voltage applied to the sub-pixel and the gray scale of the voltage, a specific embodiment is shown. Within one frame, loading a positive polarity high gray scale voltage to the first pixel A1, which can be expressed as HP; loading a negative polarity gray scale voltage to the second pixel A2, which can be expressed as LN; loading a negative low gray scale voltage to the third pixel A3, which can be expressed as LN; loading a positive low-gray scale voltage to the fourth pixel A4, which can be expressed as LP; loading a negative polarity high gray scale voltage to the fifth pixel A5, which can be expressed as HN; loading a positive low-gray scale voltage to the sixth pixel A6, which can be expressed as LP; loading a positive polarity high gray scale voltage to the seventh pixel A7, which can be expressed as HP; loading the negative polarity gray scale voltage to the eighth pixel A8, which can be expressed as LN.

In order to more clearly describe the above voltage loading relationship, from a certain column, the voltage relationship loaded for each sub-pixel in any column is sequentially expressed as: HP, LN, HP, LN, HP, LN, HP, LN . . . sequentially cycle; from a certain line, the voltage relationship loaded for each sub-pixel in any row is sequentially expressed as: HP, HN, LP, LN, HP, HN, LP, LN . . . sequentially cycle.

Or, loading a negative polarity high gray scale voltage to the first pixel A1, which can be expressed as HN; loading a positive low-gray scale voltage to the second pixel A2, which can be expressed as LP; loading a positive low-gray scale voltage to the third pixel A3, which can be expressed as LP; loading a negative polarity gray scale voltage to the fourth pixel A4, which can be expressed as LN; loading a positive low-scale voltage to the fifth pixel A5, which can be expressed as HP; loading a negative polarity gray scale voltage to the sixth pixel A6, which can be expressed as LN; loading a negative polarity high gray scale voltage to the seventh pixel A7, which can be expressed as HN; loading a positive low-gray scale voltage to the eighth pixel A8, which can be expressed as LP.

In order to more clearly describe the above voltage loading relationship, from a certain column, the voltage relationship loaded for each sub-pixel in any column is sequentially expressed as: HN, LP, HN, LP, HN, LP, HN, LP . . . sequentially cycle; from a certain line, the voltage relationship loaded for each sub-pixel in any row is sequentially expressed as: HN, HP, LN, LP, HN, HP, LN, LP . . . sequentially cycle.

Embodiment 24

In a specific embodiment, in order to more clearly show the solution of the twentieth embodiment of the present invention, the pixel matrix includes a plurality of sub-pixel areas, and each of the sub-pixel areas includes: a first sub-pixel;

- a second sub-pixel adjacent to the first sub-pixel along a scan line direction;
- a third sub-pixel adjacent to the second sub-pixel along a scan line direction;
- a fourth sub-pixel adjacent to the third sub-pixel along a scan line direction;
- a fifth sub-pixel adjacent to the first sub-pixel along a data line direction;
- a sixth sub-pixel adjacent to the second sub-pixel along a data line direction;
- a seventh sub-pixel adjacent to the third sub-pixel along a data line direction;
- an eighth sub-pixel adjacent to the fourth sub-pixel along a data line direction;
- a first data line electrically connecting the first sub-pixel, the second sub-pixel, the fifth sub-pixel, and the sixth sub-pixel;
- a second data line electrically connecting the third sub-pixel, the fourth sub-pixel, the seventh sub-pixel, and the eighth sub-pixel;
- a first scan line electrically connecting the first sub-pixel and the fourth sub-pixel;
- a second scan line electrically connecting the second sub-pixel and the third sub-pixel;
- a third scan line electrically connecting the fifth sub-pixel and the eighth sub-pixel;
- a fourth scan line electrically connecting the sixth sub-pixel and the seventh sub-pixel.

Figure 10C:
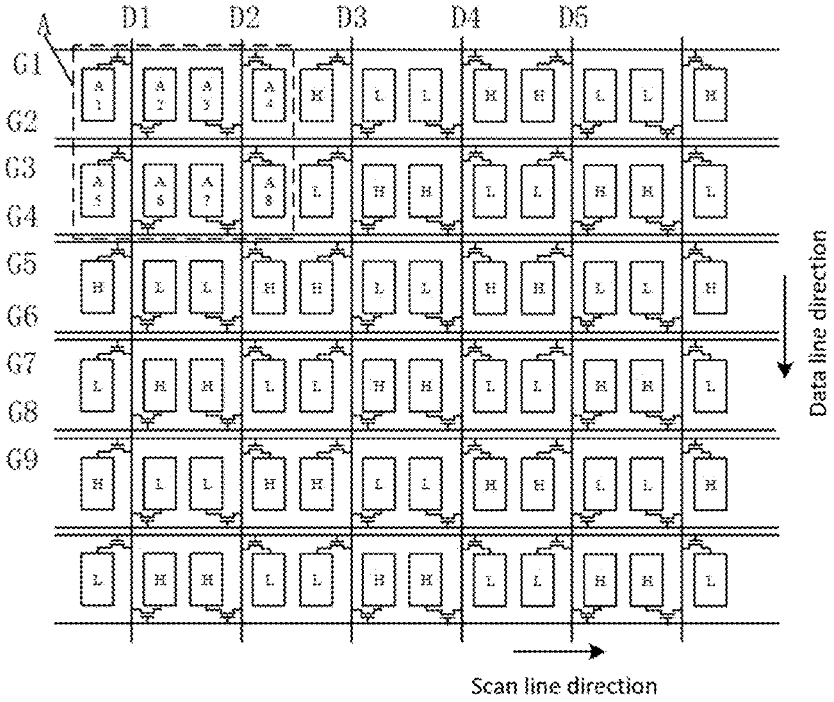
FIG. 10C is a schematic diagram of a sub-pixel area according to a twenty-fourth embodiment of the present invention.

Referring to FIG. 10C, FIG. 10C is a schematic diagram of still another sub-pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific embodiment, the voltages applied to the first pixel A1, the third pixel A3, the sixth pixel A6, and the eighth pixel A8 have the same polarity and are opposite in polarity to the voltages applied to the second pixel A2, the fourth pixel A4, the fifth pixel A5, and the seventh pixel A7.

The voltage gray scales loaded onto the first pixel A1, the fourth pixel A4, the sixth pixel A6, and the seventh pixel A7 are different from the voltage gray scales loaded onto the second pixel A2, the third pixel A3, the fifth pixel A5, and the eighth pixel A8.

According to the above-mentioned cooperation relationship between the polarity of the voltage applied to the sub-pixel and the gray scale of the voltage, a specific embodiment is shown. Within one frame, loading a positive polarity high gray scale voltage to the first pixel A1, which can be expressed as HP; loading a negative polarity gray scale voltage to the second pixel A2, which can be expressed as LN; loading a positive low-gray scale voltage to the third pixel A3, which can be expressed as LP; loading a negative polarity high gray scale voltage to the fourth pixel A4, which can be expressed as HN; loading a negative low gray scale voltage to the fifth pixel A5, which can be expressed as LN; loading a positive polarity high gray scale voltage to the sixth pixel A6, which can be expressed as HP; loading a negative polarity high gray scale voltage to the seventh pixel A7, which can be expressed as HN; loading a positive low-gray scale voltage to the eighth pixel A8, which can be expressed as LP.

In order to more clearly describe the above voltage loading relationship, from a certain column, the voltage relationship loaded for each sub-pixel in any column is sequentially expressed as: HP, LN, LP, HN, HP, LN, LP, HN . . . sequentially cycle; from a certain line, the voltage relationship loaded for each sub-pixel in any row is sequentially expressed as: HP, LN, HP, LN, HP, LN, HP, LN . . . sequentially cycle.

Or, loading a negative polarity high gray scale voltage to the first pixel A1, which can be expressed as HN; loading a positive low-gray scale voltage to the second pixel A2, which can be expressed as LP; loading a negative low gray scale voltage to the third pixel A3, which can be expressed as LN; loading a positive polarity high gray scale voltage to the fourth pixel A4, which can be expressed as HP; loading a positive low-gray scale voltage to the fifth pixel A5, which can be expressed as LP; loading a negative polarity high gray scale voltage to the sixth pixel A6, which can be expressed as HN; loading a positive polarity high gray scale voltage to the seventh pixel A7, which can be expressed as HP; loading the negative polarity gray scale voltage to the eighth pixel A8, which can be expressed as LN.

In order to more clearly describe the above voltage loading relationship, from a certain column, the voltage relationship loaded for each sub-pixel in any column is sequentially expressed as: HN, LP, LN, HP, HN, LP, LN, HP . . . sequentially cycle; from a certain line, the voltage relationship loaded for each sub-pixel in any row is sequentially expressed as: HN, LP, HN, LP, HN, LP, HN, LP . . . sequentially cycle.

Embodiment 25

Figure 10D:
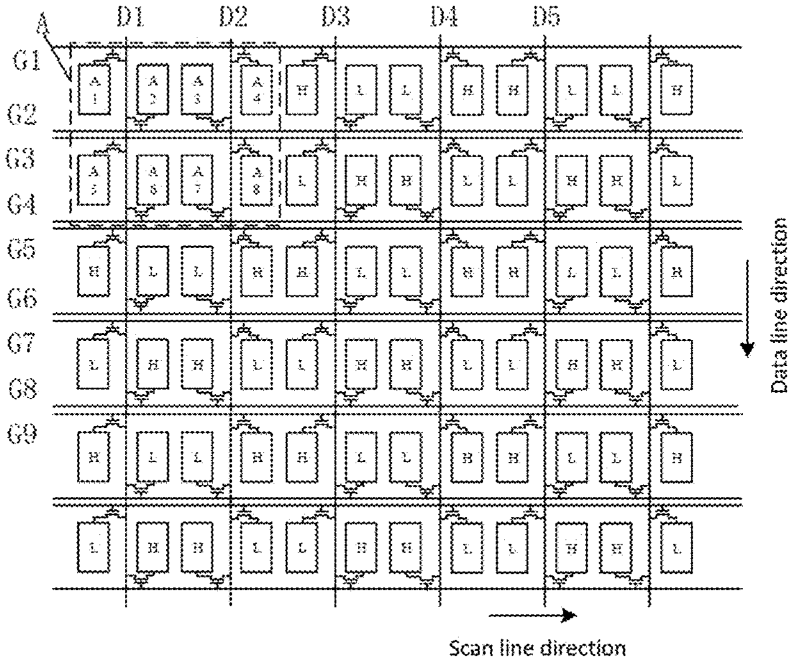
FIG. 10D is a schematic diagram of a pixel matrix driving manner according to a twenty-fifth embodiment of the present invention.
Figure 10E:
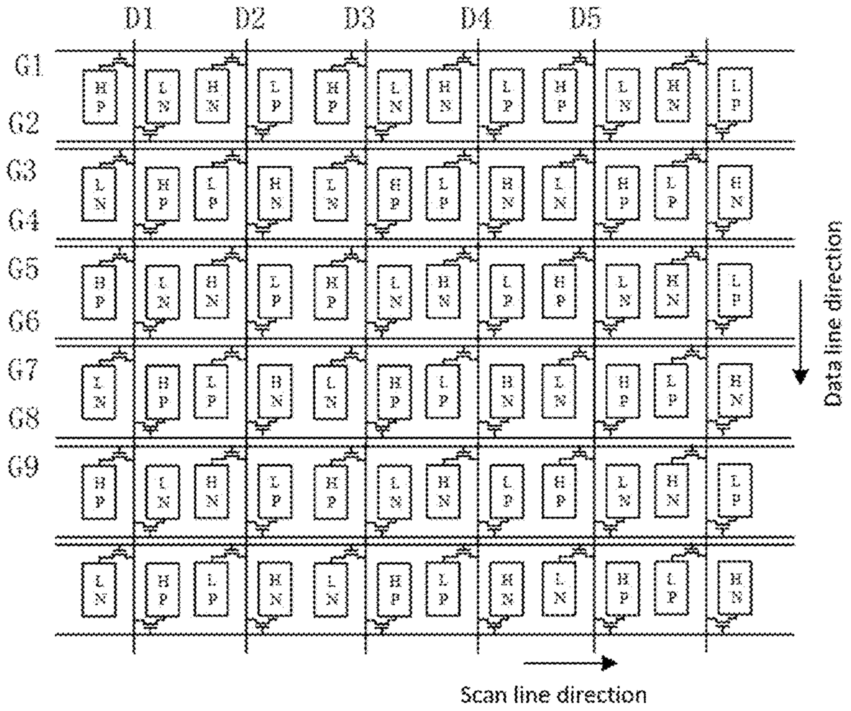
FIG. 10E is a schematic diagram of a specific implementation manner of the driving manner in FIG. 10D.

Please refer to FIG. 10D and FIG. 10E together. FIG. 10D is a schematic diagram of a pixel matrix driving manner according to an embodiment of the present invention; FIG. 10E is a schematic diagram of a specific implementation manner of the driving manner in FIG. 10D. In an optional 4×4 area, in this embodiment, the first pixel A1, the second pixel A2, the fifth pixel A5, the sixth pixel A6, the ninth pixel A9, the tenth pixel A10, the thirteenth pixel A13, and the fourteenth pixel A14 are connected to the first data line D1, the third pixel A3, the fourth pixel A4, the seventh pixel A7, the eighth pixel A8, the eleventh pixel A11, the twelfth pixel A12, the fifteenth pixel A15, the sixteenth pixel A16 are connected to the second data line D2;

- at the first moment in a frame, loading a scan signal on the first row of scan lines G1, and loading the voltage corresponding to HP to the first pixel A1 on the first data line D1, loading the voltage corresponding to the HN on the second data line D2 to the third pixel A3, and so on;
- at the next moment (the second moment), loading a scan signal on the second row of scan lines G2, and loading the voltage corresponding to LN on the first data line D1 to the second pixel A2, and loading the voltage corresponding to the LP on the second data line D2 to the fourth pixel A4, and so on;
- at the next moment (the third moment), loading a scan signal on the third row of scan lines G3, and loading the voltage corresponding to LN on the first data line D1 to the fifth pixel A5, and loading the voltage corresponding to the LP on the second data line D2 to the seventh pixel A7, and so on;
- at the next moment (the fourth moment), loading a scan signal on the fourth row of scan lines G4, and loading the voltage corresponding to HP to the sixth pixel A6 on the first data line D1, loading the voltage corresponding to the HN on the second data line D2 to the eighth pixel A8, and so on;
- at the next moment (the fifth moment), loading a scan signal on the fifth line scan line G5, and loading the voltage corresponding to HP to the ninth pixel A9 on the first data line D1, and loading the voltage corresponding to the HN on the second data line D2 to the eleventh pixel A11, and so on;
- at the next moment (the sixth moment), loading a scan signal on the sixth line scan line G6, and loading the voltage corresponding to LN on the first data line D1 to the tenth pixel A10, and loading the voltage corresponding to the LP on the third data line D2 to the twelfth pixel A12, and so on;
- at the next moment (the seventh moment), loading a scan signal on the seventh row of scan lines G7, and loading the voltage corresponding to LN to the thirteenth pixel A13 on the first data line D1, and loading the voltage corresponding to the LP on the second data line D2 to the fifteenth pixel A15, and so on;
- at the next moment (the eighth moment), the scan signal is loaded on the eighth line scan line G8, and the voltage corresponding to HP is loaded to the fourteenth pixel A14 on the first data line D1, and the voltage corresponding to HN is loaded on the second data line D2 to the sixteenth pixel A16, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 26

Figure 10F:
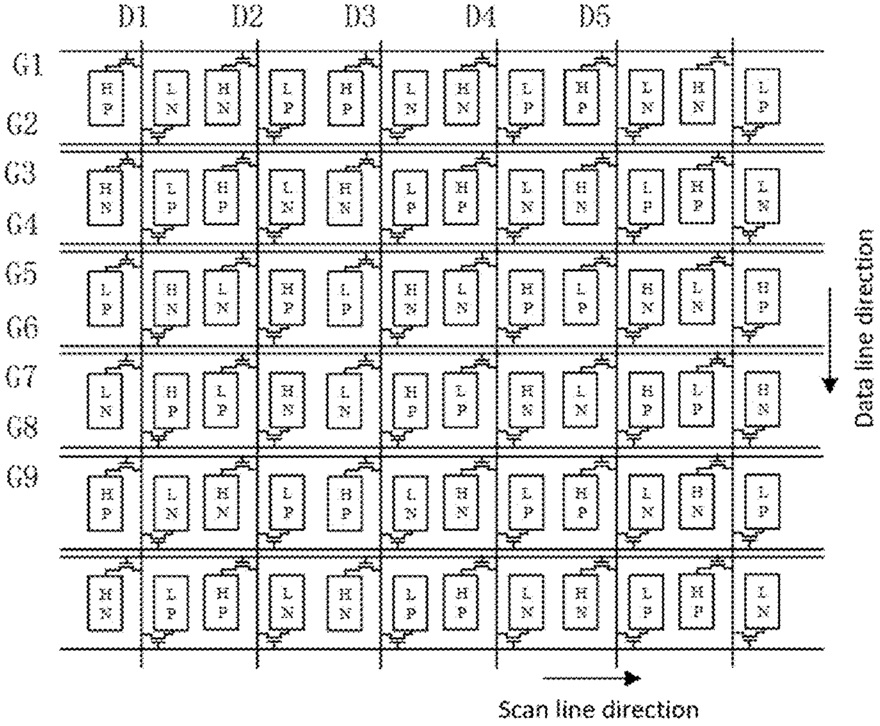
FIG. 10F is a schematic diagram of another specific embodiment of the driving method in FIG. 10D.

Please refer to FIG. 10D and FIG. 10F together. FIG. 10F is a schematic diagram of another specific implementation manner of the driving manner in FIG. 10D. In an optional 4×4 area, in this embodiment, the first pixel A1, the second pixel A2, the fifth pixel A5, the sixth pixel A6, the ninth pixel A9, the tenth pixel A10, the thirteenth pixel A13, and the fourteenth pixel A14 are connected to the first data line D1, the third pixel A3, the fourth pixel A4, the seventh pixel A7, the eighth pixel A8, the eleventh pixel A11, the twelfth pixel A12, the fifteenth pixel A15, the sixteenth pixel A16 are connected to the second data line D2;

at the first moment in a frame, loading a scan signal on the first row of scan lines G1, and loading the voltage corresponding to HP to the first pixel A1 on the first data line D1, loading the voltage corresponding to the HN on the second data line D2 to the third pixel A3, and so on;

at the next moment (the second moment), loading a scan signal on the second row of scan lines G2, and loading the voltage corresponding to LN on the first data line D1 to the second pixel A2, and loading the voltage corresponding to the LP on the second data line D2 to the fourth pixel A4, and so on;

at the next moment (the third moment), loading a scan signal on the third row of scan lines G3, and loading the voltage corresponding to HN on the first data line D1 to the fifth pixel A5, and loading the voltage corresponding to HP on the second data line D2 to the seventh pixel A7, and so on;

at the next moment (the fourth moment), loading a scan signal on the fourth row of scan lines G4, and loading the voltage corresponding to the LP on the first data line D1 to the sixth pixel A6, and loading the voltage corresponding to the LN on the second data line D2 to the eighth pixel A8, and so on;

at the next moment (the fifth moment), loading a scan signal on the fifth line scan line G5, and loading the voltage corresponding to the LP on the first data line D1 to the ninth pixel A9, and loading the voltage corresponding to the LN on the second data line D2 to the eleventh pixel A11, and so on;

at the next moment (the sixth moment), loading a scan signal on the sixth line scan line G6, and loading the voltage corresponding to HN on the first data line D1 to the tenth pixel A10, and loading the voltage corresponding to HP on the third data line D2 to the twelfth pixel A12, and so on;

at the next moment (the seventh moment), loading a scan signal on the seventh row of scan lines G7, and loading the voltage corresponding to LN to the thirteenth pixel A13 on the first data line D1, and loading the voltage corresponding to the LP on the second data line D2 to the fifteenth pixel A15, and so on;

at the next moment (the eighth moment), the scan signal is loaded on the eighth line scan line G8, and the voltage corresponding to HP is loaded to the fourteenth pixel A14 on the first data line D1, and the voltage corresponding to HN is loaded on the second data line D2 to the sixteenth pixel A16, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 27

Figure 10G:
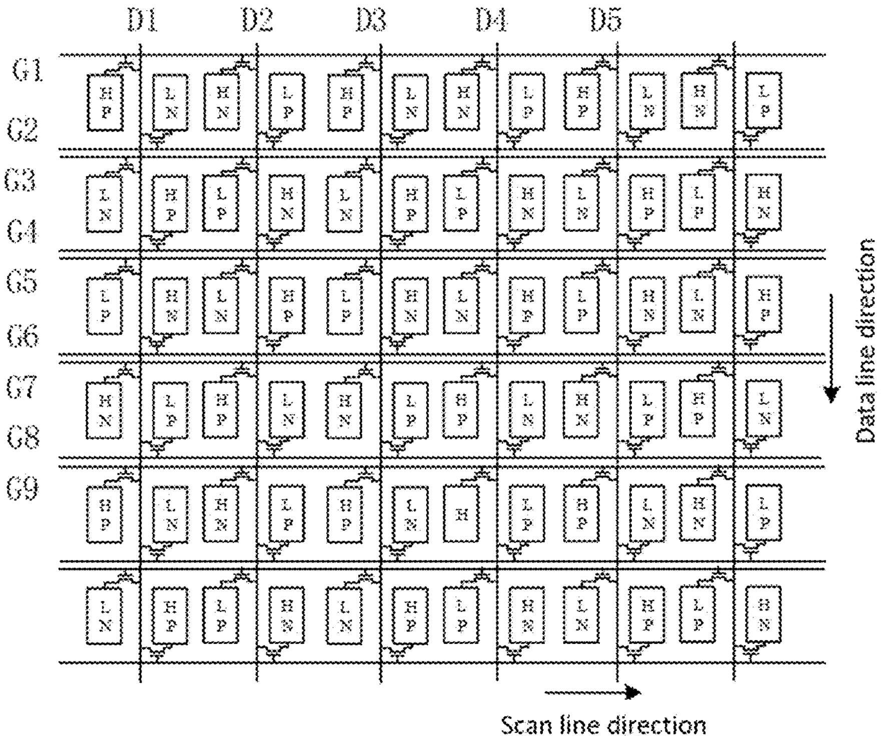
FIG. 10G is a schematic diagram of still another embodiment of the driving method in FIG. 10D.

Please refer to FIG. 10D and FIG. 10G together. FIG. 10G is a schematic diagram of still another specific implementation manner of the driving manner in FIG. 10D. In an optional 4×4 area, in this embodiment, the first pixel A1, the second pixel A2, the fifth pixel A5, the sixth pixel A6, the ninth pixel A9, the tenth pixel A10, the thirteenth pixel A13, and the fourteenth pixel A14 are connected to the first data line D1, the third pixel A3, the fourth pixel A4, the seventh pixel A7, the eighth pixel A8, the eleventh pixel A11, the twelfth pixel A12, the fifteenth pixel A15, the sixteenth pixel A16 are connected to the second data line D2;

at the first moment in a frame, loading a scan signal on the first row of scan lines G1, and loading the voltage corresponding to HP to the first pixel A1 on the first data line D1, loading the voltage corresponding to the HN on the second data line D2 to the third pixel A3, and so on;

at the next moment (the second moment), loading a scan signal on the second row of scan lines G2, and loading the voltage corresponding to LN on the first data line D1 to the second pixel A2, and loading the voltage corresponding to the LP on the second data line D2 to the fourth pixel A4, and so on;

at the next moment (the third moment), loading a scan signal on the third row of scan lines G3, and loading the voltage corresponding to LN on the first data line D1 to the fifth pixel A5, and loading the voltage corresponding to the LP on the second data line D2 to the seventh pixel A7, and so on;

fourth row of scan lines G4, and loading the voltage corresponding to HP to the sixth pixel A6 on the first data line D1, loading the voltage corresponding to the HN on the second data line D2 to the eighth pixel A8, and so on;

at the next moment (the fifth moment), loading a scan signal on the fifth line scan line G5, and loading the voltage corresponding to the LP on the first data line D1 to the ninth pixel A9, and loading the voltage corresponding to the LN on the second data line D2 to the eleventh pixel A11, and so on;

at the next moment (the sixth moment), loading a scan signal on the sixth line scan line G6, and loading the voltage corresponding to HN on the first data line D1 to the tenth pixel A10, and loading the voltage corresponding to HP on the third data line D2 to the twelfth pixel A12, and so on;

at the next moment (the seventh moment), loading a scan signal on the seventh row of scan lines G7, and loading the voltage corresponding to HN to the thirteenth pixel A13 on the first data line D1, and loading the voltage corresponding to HP to the fifteenth pixel A15 on the second data line D2, and so on;

at the next moment (the eighth moment), the scan signal is loaded on the eighth line scan line G8, and the voltage corresponding to the LP is loaded to the fourteenth pixel A14 on the first data line D1, and the voltage corresponding to the LN is loaded on the second data line D2 to the sixteenth pixel A16, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 28

Figure 10H:
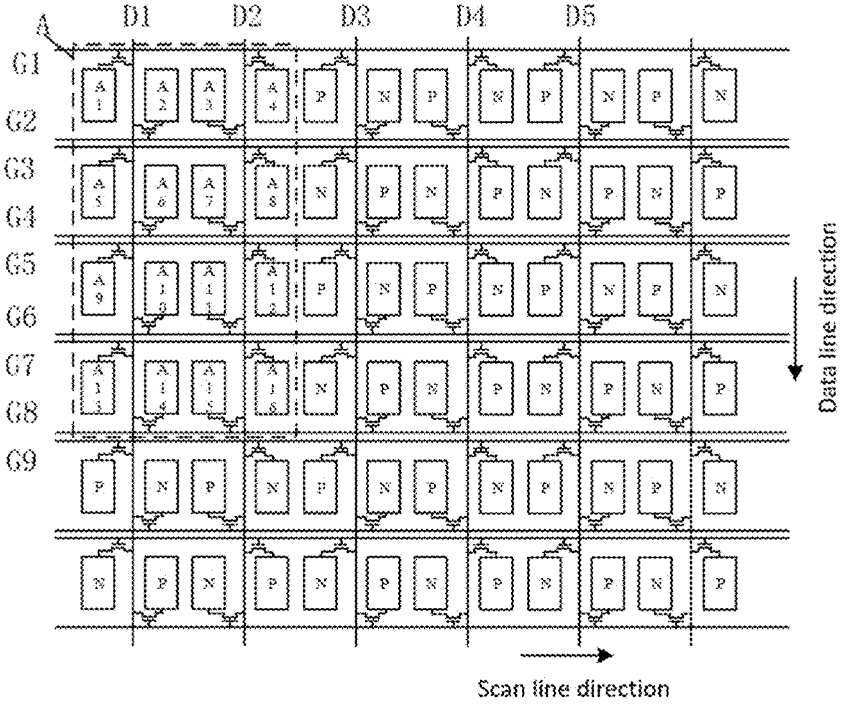
FIG. 10H is a schematic diagram of a pixel matrix driving manner according to a twenty-eighth embodiment of the present invention.
Figure 10I:
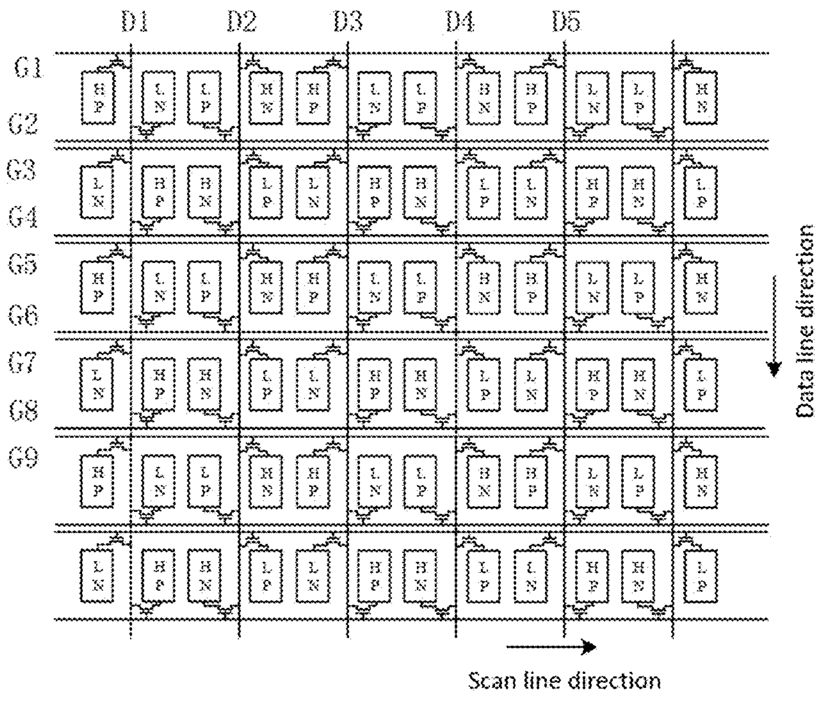
FIG. 10I is a schematic diagram of a specific implementation manner of the driving method in FIG. 10H.

Please refer to FIG. 10H and FIG. 10I. FIG. 10 is a schematic diagram of another pixel matrix driving manner according to an embodiment of the present invention; FIG. 10I is a schematic diagram of a specific implementation manner of the driving manner in FIG. 10H.

In an optional 4×4 area, in this embodiment, the first pixel A1, the second pixel A2, the fifth pixel A5, the sixth pixel A6, the ninth pixel A9, the tenth pixel A10, the thirteenth pixel A13, and the fourteenth pixel A14 are connected to the first data line D1, the third pixel A3, the fourth pixel A4, the seventh pixel A7, the eighth pixel A8, the eleventh pixel A11, the twelfth pixel A12, the fifteenth pixel A15, the sixteenth pixel A16 are connected to the second data line D2;

- at the first moment in a frame, loading a scan signal on the first row of scan lines G1, and loading the voltage corresponding to HP to the first pixel A1 on the first data line D1, loading the voltage corresponding to the HN on the second data line D2 to the fourth pixel A4, and so on;
- at the next moment (the second moment), loading a scan signal on the second row of scan lines G2, and loading the voltage corresponding to LN to the second pixel A2 on the first data line D1, loading the voltage corresponding to the LP on the second data line D2 to the third pixel A3, and so on;
- at the next moment (the third moment), loading a scan signal on the third row of scan lines G3, and loading the voltage corresponding to LN on the first data line D1 to the fifth pixel A5, and loading the voltage corresponding to the LP on the second data line D2 to the seventh pixel A7, and so on;
- at the next moment (the fourth moment), loading a scan signal on the fourth row of scan lines G4, and loading the voltage corresponding to HP to the sixth pixel A6 on the first data line D1, loading the voltage corresponding to the HN on the second data line D2 to the seventh pixel A7, and so on;
- at the next moment (the fifth moment), loading a scan signal on the fifth row of scan lines G5, and loading the voltage corresponding to HP to the ninth pixel A9 on the first data line D1, and loading the voltage corresponding to the HN to the twelfth pixel A12 on the second data line D2, and so on;
- at the next moment (the sixth moment), loading a scan signal on the sixth line scan line G6, and loading the voltage corresponding to LN on the first data line D1 to the tenth pixel A10, and loading the voltage corresponding to the LP on the third data line D2 to the eleventh pixel A11, and so on;
- at the next moment (the seventh moment), loading a scan signal on the seventh row of scan lines G7, and loading the voltage corresponding to LN to the thirteenth pixel A13 on the first data line D1, and loading the voltage corresponding to the LP on the second data line D2 to the sixteenth pixel A16, and so on;
- at the next moment (the eighth moment), the scan signal is loaded on the eighth line scan line G8, and the voltage corresponding to HP is loaded to the fourteenth pixel A14 on the first data line D1, and the voltage corresponding to HN is loaded on the second data line D2 to the fifteenth pixel A15, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 29

Referring to FIG. 3 again, the method for driving the pixel matrix of the present embodiment is applicable to a display having a pixel array, such as an LCD display, an LED display, an OLED display, or the like.

Further, the pixel matrix includes a plurality of sub-pixels arranged in a matrix, and adjacent data lines have opposite polarities, that is, the data line polarity is column inversion. In one row, any one of the data lines controls the voltage input of the two sub-pixels on one side, and the voltage applied to the sub-pixels in the direction of the data line changes a polarity for each sub-pixel, and in the direction of the scan line, the voltage applied to the sub-pixels is changed once every two sub-pixels. Specifically, for the sub-pixel polarity, the inversion mode in the scan line direction is 2N inversion, and the inversion in the data line direction is 1+2N inversion.

Specifically, the method may include the following steps:

Step 1, receiving an image data, and acquiring original pixel data according to the image data;

Step 2, obtaining a first gray scale data and a second gray scale data according to the original pixel data;

Step 3, generating the first driving voltage corresponding to the first gray scale data and the second driving voltage corresponding to the second gray scale data according to the first gray scale data and the second gray scale data;

Step 4, loading the first driving voltage or the second driving voltage into the pixel matrix along a data line direction in one frame.

Wherein, the image data refers to a digital signal input to the timing controller TCON, and the image data is input frame by frame, and the original pixel data is parsed by the image data. In an existing technique, the original pixel data, that is, a specific gray scale value corresponding to each sub-pixel in the pixel matrix, is displayed in each frame. The gray scale value input to each sub-pixel is directly determined by the image data input into the TCON, and the original pixel data is not processed. Such methods are affected by the polarity of the sub-pixels, which causes the sub-pixel polarity to easily cause negative effects such as crosstalk and dark lines.

In this embodiment, by processing the original pixel data, further first gray scale data and second gray scale data are obtained, and the gray scales of the first gray scale data and the second gray scale data are different. Furthermore, the image is loaded into the corresponding sub-pixels at different intervals between different pixels or between different frames. The solution in this embodiment can generate two sets of different gray scales, respectively corresponding to different sub-pixels. In this way, it is possible to prevent the voltage applied to the sub-pixel from being affected by the polarity inversion, thereby avoiding the occurrence of crosstalk and bright and dark lines.

In a specific example, the first gray scale data is considered to be high gray scale data, and the second gray scale data is considered to be low gray scale data. Correspondingly, the magnitude of the voltage input to the sub-pixel is determined by the gray scale, the high gray scale voltage generated corresponding to the high gray scale data, that is, the first driving voltage; and the low gray scale voltage generated corresponding to the low gray scale data, that is, the second driving voltage. It is worth mentioning that the above-mentioned high gray scale and low gray scale represent the relative values of the gray scale sizes of the two groups, and the magnitude of the values is not separately limited.

Figure 11A:
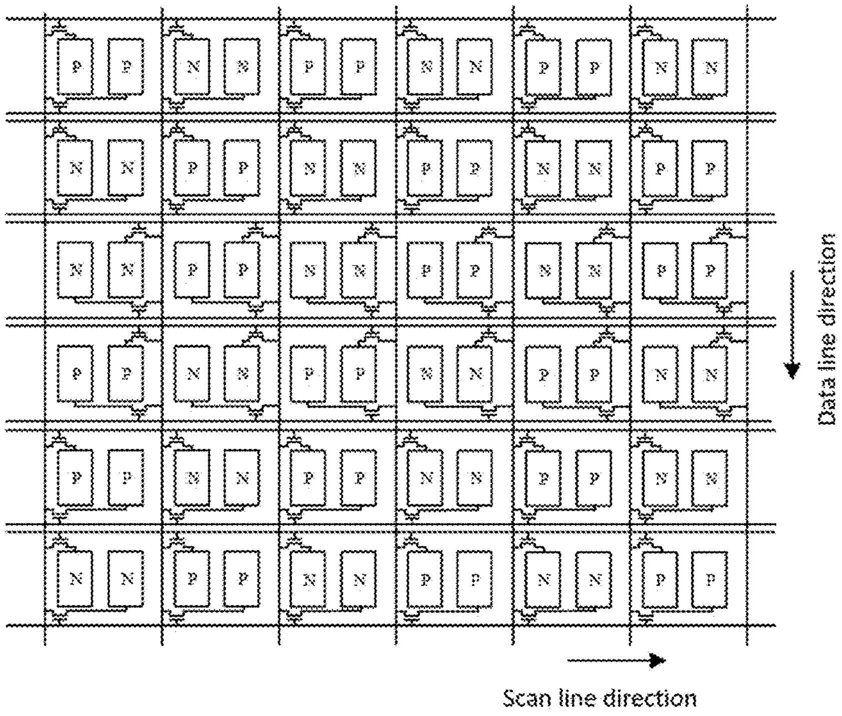
FIG. 11A is a schematic diagram of polarity loading of a pixel matrix according to a twenty-ninth embodiment of the present invention.

Referring to FIG. 11A, FIG. 11A is a schematic diagram of polarity loading of a pixel matrix according to an embodiment of the present invention. From the perspective of a column, the two consecutive sub-pixels have the same polarity, and the subsequent two sub-pixel polarities are opposite to the above two polarities. From a certain line, the sub-pixel polarities are alternately inverted, and so on. Overall, the voltage applied to the sub-pixels is inverted once every two sub-pixels in the direction of the data line, and the voltage applied to the sub-pixels is inverted once every sub-pixel polarity in the direction of the scan line. In FIG. 11A, P represents a positive voltage and N represents a negative voltage. From a certain column, the polarity transformation can be expressed as NNPP . . . NNPP or PPNN . . . PPNN. From a certain line, the polarity transformation can be expressed as NNPP . . . NNPP or NNPP . . . NNPP.

In a specific embodiment, the step of obtaining a first gray scale data and a second gray scale data according to the original pixel data includes: obtaining an original gray scale value of each pixel position according to the original pixel data, and converting the original gray scale value of each pixel position into the first gray scale data or the second gray scale data according to a predetermined conversion manner.

After determining the gray scale corresponding to each pixel position according to the rule of the present invention, the timing controller adjusts the original gray scale correspondence of the pixel position to a high gray scale or a low gray scale, and sends the adjusted gray scale value to the data driving unit, and the number driving unit outputs a corresponding voltage according to the gray scale value.

For example, the original gray scale value of the A position is 128 gray scale. If the above rule according to the present invention, the A position should output a high gray scale, that is, H, after calculation, in this example, 128 gray scale corresponding H=138 gray scale value, then output 138 gray scale to the A position, the data driving unit receives 138 gray scale, according to the established conversion rule, the voltage corresponding to 138 gray scale is 10V, and finally the voltage signal of 10V is output to the A position. Generally, the adjustment range of the high and low gray scales is determined by the difference of materials such as liquid crystal.

For another example, the original gray scale value of the B position is 128 gray scale. If the above rule is used according to the present invention, the B position should output a low gray scale, that is, L, after calculation, in this example, the 128 gray scale corresponds to the L=118 gray scale value, then the output is 118 gray scale to the B position, and the data driving unit receives the 118 gray scale, according to the established conversion rules, the voltage corresponding to the gray scale of 118 is 8V, and finally the voltage signal of 8V is output to the B position.

In a specific embodiment, the step of loading the first driving voltage or the second driving voltage to the pixel matrix along the data lines includes:

loading the first driving voltage or the second driving voltage to adjacent pixel sub-pixels to the pixel matrix in a data line direction; and loading the first driving voltage or the second driving voltage alternately to the adjacent pixel in the scan line direction to the pixel matrix.

The pixel matrix is physically divided into a plurality of small blocks arranged in a matrix by a plurality of interleaved data lines and scan lines. Each small block is one sub-pixel, and each two sub-pixels are divided by a corresponding one of the data lines or the scan lines. In the direction of the data line, the first driving voltage or the second driving voltage is alternately loaded to the pixel matrix representation every other scan line, as far as a column is concerned, different driving voltages are loaded between adjacent sub-pixels; alternatively, as far as a row is concerned, a different driving voltage is applied between each adjacent two sub-pixels; it is alternately applied to the sub-pixels in accordance with the above relationship.

Figure 11B:
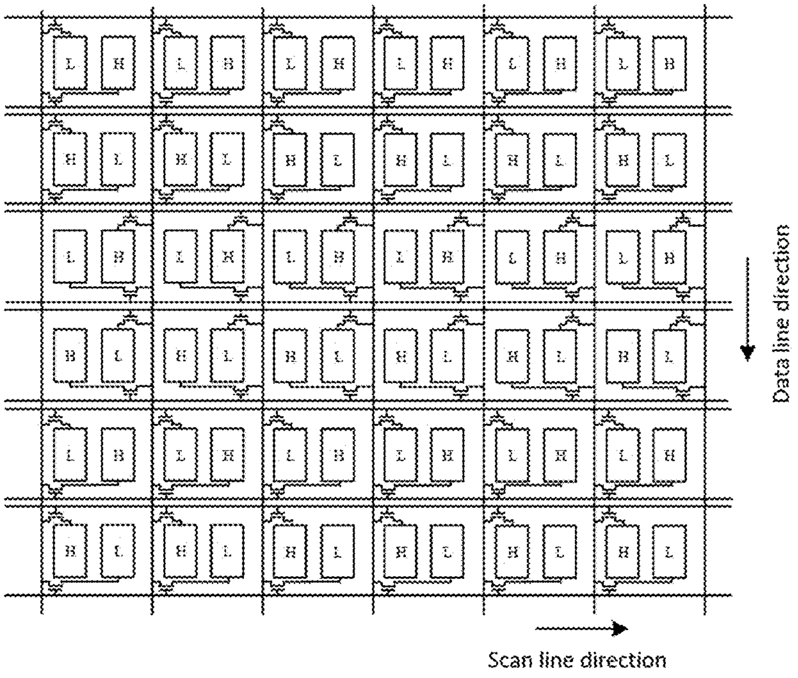
FIG. 11B is a schematic diagram of a gray matrix loading of a pixel matrix according to a twenty-ninth embodiment of the present invention.

For example, refer to FIG. 11B, which is a schematic diagram of a gray matrix loading of a pixel matrix according to an embodiment of the present invention. From a certain line, the gray scale voltages of two consecutive sub-pixels loaded are the same, and the gray scale voltages of two consecutive sub-pixels loaded are different from the previous two. From a certain line, the gray-scale voltages loaded into the sub-pixels alternately change, and so on. In FIG. 11B, H represents a high gray scale voltage, and L represents a low gray scale voltage. From a certain column, the gray scale voltage transformation can be expressed as HLHL . . . HLHL or LHLH . . . LHLH. From a certain line, the gray scale voltage transformation can be expressed as HLHL . . . HLHL or LHLH . . . LHLH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Embodiment 30

Figure 11C:
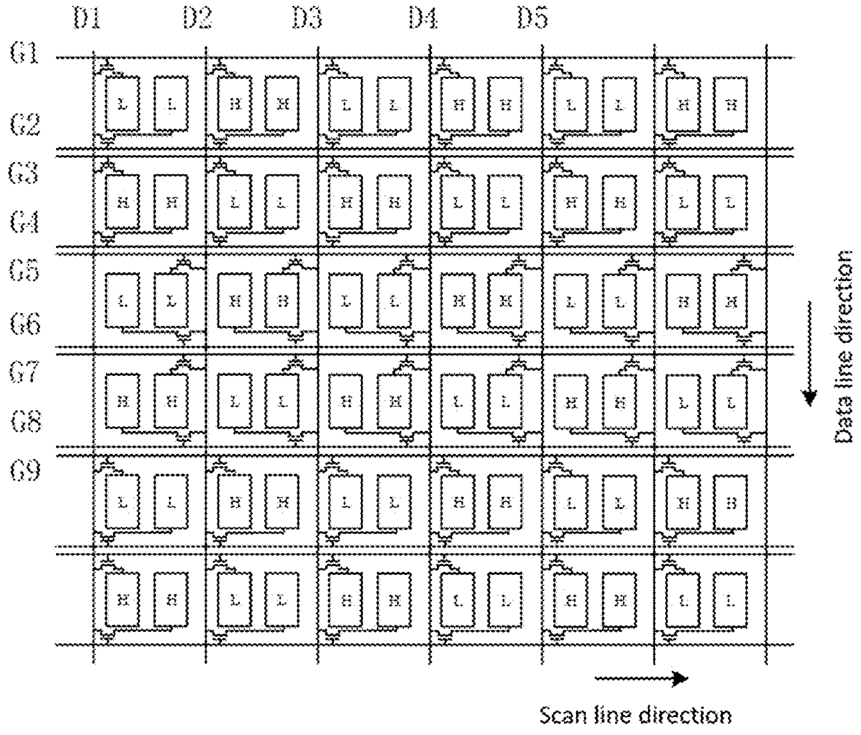
FIG. 11C is a schematic diagram of a gray matrix loading of a pixel matrix according to a thirtieth embodiment of the present invention.

For example, refer to FIG. 11C, which is another schematic diagram of gray matrix loading of a pixel matrix according to an embodiment of the present invention. The step of loading the first driving voltage or the second driving voltage into the pixel matrix along a data line direction includes:

loading the first driving voltage and the second driving voltage alternately to adjacent sub-pixels along a data line direction, and gray scales on adjacent sub-pixels on both sides of the data line are different; and loading the first driving voltage and the second driving voltage alternately as per every two sub-pixels along the scan line direction.

The gray scale on the adjacent sub-pixels on both sides of the data line is different, that is, when the adjacent sub-pixel on the left side of the data line is H, the adjacent sub-pixel on the right side of the data line is L, and vice versa.

From a certain line, the gray scale voltages of two consecutive sub-pixels are the same, and the gray scale voltages of two consecutive sub-pixels loaded are different from the previous two. From a certain line, the gray-scale voltages loaded into the sub-pixels alternately change, and so on. In FIG. 11C, H represents a high gray scale voltage, and L represents a low gray scale voltage. From a certain column, the gray scale voltage transformation can be expressed as HLHL . . . HLHL or LHLH . . . LHLH. From a certain line, the gray scale voltage transformation can be expressed as HHLL . . . HHLL or LLHH . . . LLHH.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Embodiment 31

Figure 11D:
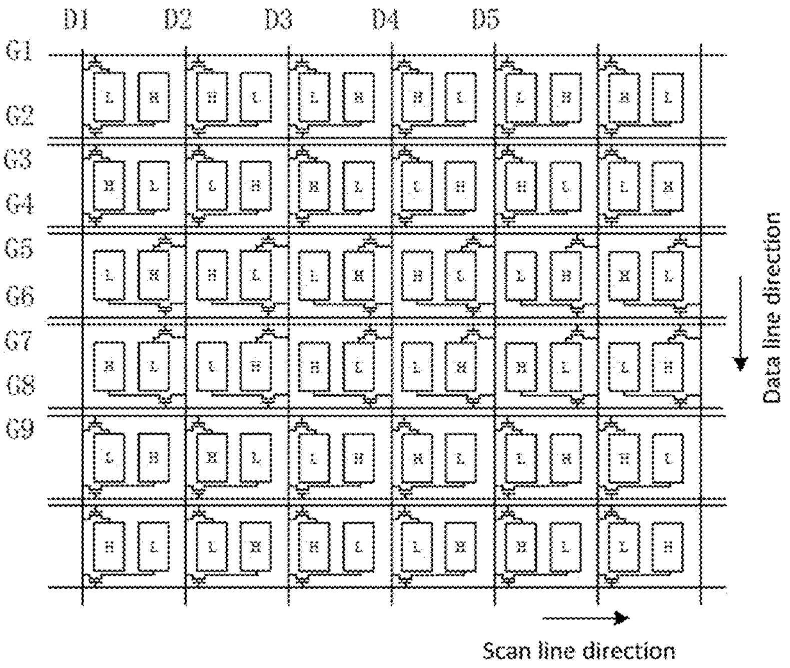
FIG. 11D is a schematic diagram of a gray matrix loading of a pixel matrix according to a thirty-first embodiment of the present invention.

For example, refer to FIG. 11D, which is a schematic diagram of another gray matrix loading of a pixel matrix according to an embodiment of the present invention. The step of loading the first driving voltage or the second driving voltage into the pixel matrix along a data line direction includes:

loading the first driving voltage or the second driving voltage alternately to adjacent sub-pixels along a data line direction, and gray scales on adjacent sub-pixels on both sides of the data line are the same; and loading the first driving voltage or the second driving voltage alternately to every two sub-pixels in the scan line direction.

The gray scale on the adjacent sub-pixels on both sides of the data line is different, that is, when the adjacent sub-pixel on the left side of the data line is H, the adjacent sub-pixel on the right side of the data line is H. When the adjacent sub-pixel on the left side of the data line is L, the adjacent sub-pixel on the right side of the data line is L.

From a certain line, the gray scale voltages of two consecutive sub-pixels are the same, and the gray scale voltages of two consecutive sub-pixels loaded are different from the previous two. From a certain line, the gray-scale voltages loaded into the sub-pixels alternately change, and so on. In FIG. 11D, H represents a high gray scale voltage, and L represents a low gray scale voltage. From a certain column, the gray scale voltage transformation can be expressed as HLHL . . . HLHL or LHLH . . . LHLH. From a certain line, the gray scale voltage transformation can be expressed as HLLH . . . HLLH or LHHL . . . LHHL.

The driving method of the pixel matrix of the invention is matched with the low gray scale voltage by a reasonable high gray scale voltage, so that the pixels in the pixel matrix are not affected by the polarity, the crosstalk, the bright dark line and the like are avoided, and the display effect is improved.

Embodiment 32

Referring to FIG. 5 again, in the method for driving the pixel matrix of the embodiment, the pixel matrix includes a plurality of sub-pixels arranged in a matrix, the voltages applied to the sub-pixels are inverted once every two sub-pixels in the direction of the data line, and the voltages applied to the sub-pixels are inverted once per sub-pixel polarity in the scan line direction.

Specifically, the method includes:

Step 1, receiving an image data, and acquiring original pixel data according to the image data;

Step 2, obtaining original data driving signals for each pixel positions according to the original pixel data;

Step 3, converting the original data driving signals into the first driving voltage or the second driving voltage according to a preset conversion rule;

Step 4, loading the first driving voltage or the second driving voltage into the pixel matrix along a data line direction in one frame.

Loading the first driving voltage or the second driving voltage to adjacent pixel sub-pixels to the pixel matrix in a data line direction; and loading the first driving voltage or the second driving voltage alternately to the adjacent pixel in the scan line direction to the pixel matrix.

Or in a frame, along the data line direction, loading the first driving voltage and the second driving voltage alternately to adjacent sub-pixels, and gray scales on adjacent sub-pixels on both sides of the data line are different; and loading the first driving voltage and the second driving voltage alternately as per every two sub-pixels along the scan line direction.

Or in a frame, along the data line direction, loading the second driving voltage of the first driving voltage alternately to adjacent sub-pixels, and gray scales on adjacent sub-pixels on both sides of the data line are the same; and loading the second driving voltage of the first driving voltage alternately to every two sub-pixels along the scan line direction.

In the method, the original pixel data of the embodiment corresponds to a set of gray scale values. In the data driving circuit, the original data driving signal corresponding to the gray scale value is generated, and the original data driving signal is adjusted to two different driving voltages. That is, the first driving voltage or the second driving voltage is output correspondingly, in this embodiment, by using two sets of different gammas to generate driving signals for driving sub-pixels, a set of original data driving signals are generated under different gamma to generate two sets of driving voltages, and then the driving control of the present invention is implemented. In a specific implementation of the solution of the embodiment, the TCON outputs a set of gray scales, and the data driving circuit generates two sets of gammas, and each group respectively drives different sub-pixels, thereby achieving the same technical effect as the first embodiment.

In a specific embodiment, the step of obtaining original data driving signals for each pixel positions according to the original pixel data includes:

obtaining an original gray scale value of each pixel position according to the original pixel data, and obtaining the original data driving signals according to the original gray scale value.

The timing controller of the present invention analyzes the original image, analyzes the original gray scale value of each pixel position, and determines a conversion rule corresponding to the position, and the conversion rule adjusts the original gray scale value to a high gray scale H or a low gray scale L. The method of the present invention does not directly perform gray scale conversion in the timing controller, and sends the original gray scale value and the corresponding H or L conversion rule to the data driving unit, the data driving unit directly outputs the corresponding driving voltage according to the original gray scale value and the corresponding H or L according to the rule.

For example, in one embodiment, the original gray scale value of the A position is 128 gray scales, and 128 gray scales are output for the A position. According to the conversion rule, the position of A should be H. After the driver circuit receives 128 gray scales, find the corresponding voltage 10V in the gray-scale corresponding voltage conversion table of H, and finally output the driving voltage signal of 10V to the A position.

For example, the original gray scale value of the B position is 128 gray scale, for the B position output 128 gray scale according to the conversion rule B position should be L drive circuit after receiving 128 gray scale, find the corresponding voltage 8V in the gray scale corresponding pressure conversion table of L, and finally output 8V data signal to the A position.

In this embodiment, the reasonable high gray scale voltage is matched with the low gray scale voltage, so that the pixels in the pixel matrix are not affected by the polarity, and the problems such as crosstalk, bright and dark lines are avoided, and the display effect is improved.

Embodiment 33

In a specific embodiment, in order to more clearly show the solution of the twenty-ninth embodiment of the present invention, the pixel matrix includes a plurality of sub-pixel areas, and each of the sub-pixel areas includes:

- a first sub-pixel;
- a second sub-pixel adjacent to the first sub-pixel along a scan line direction;
- a third sub-pixel adjacent to the second sub-pixel along a scan line direction;
- a fourth sub-pixel adjacent to the third sub-pixel along a scan line direction;
- a fifth sub-pixel adjacent to the first sub-pixel along a data line direction;
- a sixth sub-pixel adjacent to the second sub-pixel along a data line direction;
- a seventh sub-pixel adjacent to the third sub-pixel along a data line direction;
- an eighth sub-pixel adjacent to the fourth sub-pixel along a data line direction;
- a first data line electrically connecting the first sub-pixel, the second sub-pixel, the fifth sub-pixel, and the sixth sub-pixel;
- a second data line electrically connecting the third sub-pixel, the fourth sub-pixel, the seventh sub-pixel, and the eighth sub-pixel;
- a first scan line electrically connecting the first sub-pixel and the third sub-pixel;
- a second scan line electrically connecting the second sub-pixel and the fourth sub-pixel;
- a third scan line electrically connecting the fifth sub-pixel and the seventh sub-pixel;
- a fourth scan line electrically connecting the sixth sub-pixel and the eighth sub-pixel.

Figure 12A:
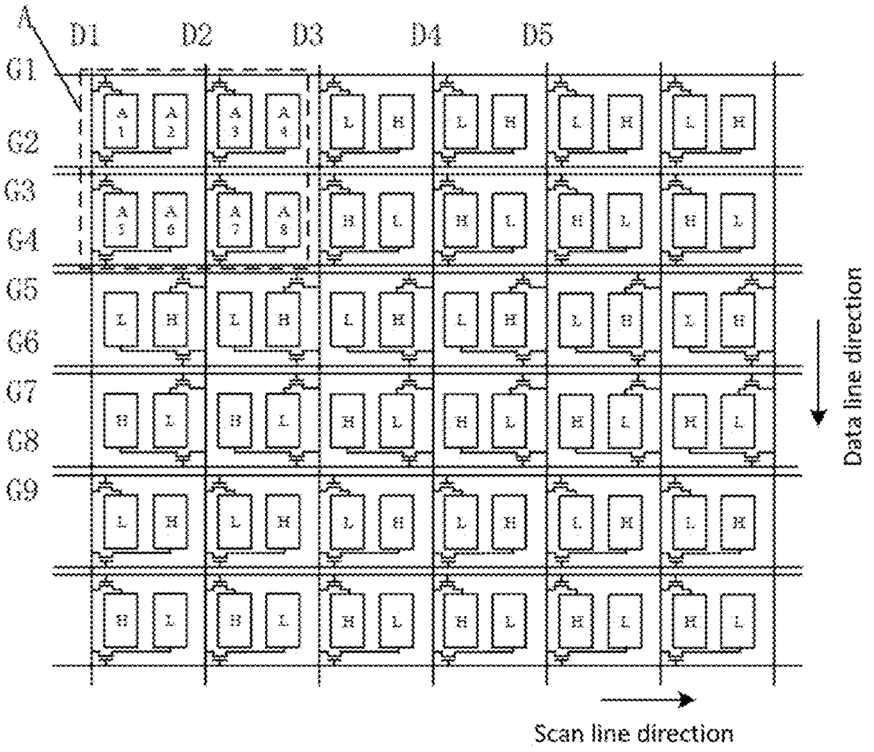
FIG. 12A is a schematic diagram of a sub-pixel area according to a thirty-third embodiment of the present invention.

Referring to FIG. 12A, FIG. 12A is a schematic diagram of a sub-pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific embodiment, the voltages applied to the first pixel A1, the second pixel A2, the fifth pixel A5, and the sixth pixel A6 have the same polarity, and are opposite in polarity to the voltages applied to the third pixel A3, the fourth pixel A4, the seventh pixel A7, and the eighth pixel A8.

The voltage gray scales loaded onto the first pixel A1, the third pixel A3, the sixth pixel A6, and the eighth pixel A8 are different from the voltage gray scales loaded onto the second pixel A2, the fourth pixel A4, the fifth pixel A5, and the seventh pixel A7.

According to the above-mentioned cooperation relationship between the polarity of the voltage applied to the sub-pixel and the gray scale of the voltage, a specific embodiment is shown. Within one frame, loading a negative polarity gray scale voltage to the first pixel A1, which can be expressed as LN; loading a negative polarity high gray scale voltage to the second pixel A2, which can be expressed as HN; loading a positive low-gradation voltage to the third pixel A3, which can be expressed as LP; loading a positive polarity high gray scale voltage to the fourth pixel A4, which can be expressed as HP; loading a negative polarity high gray scale voltage to the fifth pixel A5, which can be expressed as HN; loading a negative polarity gray scale voltage to the sixth pixel A6, which can be expressed as LN; loading a positive polarity high gray scale voltage to the seventh pixel A7, which can be expressed as HP; loading a positive low-gradation voltage to the eighth pixel A8, which can be expressed as LP.

In order to more clearly describe the above voltage loading relationship, from a certain column, the voltage relationship loaded for each sub-pixel in any column is sequentially expressed as: LN, HN, LP, HP, LN, HN, LP, HP . . . sequentially cycle; from a certain line, the voltage relationship loaded for each sub-pixel in any row is sequentially expressed as: LN, HN, LP, HP, LN, HN, LP, HP . . . sequentially cycle.

Or, loading a positive low-gradation voltage to the first pixel A1, which can be expressed as LP; loading a positive polarity high gray scale voltage to the second pixel A2, which can be expressed as HP; loading a negative low gray scale voltage to the third pixel A3, which can be expressed as LN; loading a negative polarity high gray scale voltage to the fourth pixel A4, which can be expressed as HN; loading a positive polarity high gray scale voltage to the fifth pixel A5, which can be expressed as HP; loading a positive low-gradation voltage to the sixth pixel A6, which can be expressed as LP; loading a negative polarity high gray scale voltage to the seventh pixel A7, which can be expressed as HN; loading the negative polarity gray scale voltage to the eighth pixel A8, which can be expressed as LN.

In order to more clearly describe the above voltage loading relationship, from a certain column, the voltage relationship loaded for each sub-pixel in any column is sequentially expressed as: LP, HP, LN, HN, LP, HP, LN, HN . . . sequentially cycle; from a certain line, the voltage relationship loaded for each sub-pixel in any row is sequentially expressed as: LP, HP, LN, HN, LP, HP, LN, HN . . . sequentially cycle.

In another embodiment, the voltages applied to the first pixel A1, the second pixel A2, the seventh pixel A7, and the eighth pixel A8 have the same polarity, and are opposite in polarity to the voltages applied to the third pixel A3, the fourth pixel A4, the fifth pixel A5, and the sixth pixel A6. The voltage gray scales loaded onto the first pixel A1, the third pixel A3, the sixth pixel A6, and the eighth pixel A8 are different from the voltage gray scales loaded onto the second pixel A2, the fourth pixel A4, the fifth pixel A5, and the seventh pixel A7. In this driving mode, other pixels are correspondingly arranged in the above manner. And the gray-scale voltage relationship loaded on the pixel is re-acquired according to the above example, and will not be described again.

Embodiment 34

In a specific embodiment, in order to more clearly show the solution of the thirtieth embodiment of the present invention, the pixel matrix includes a plurality of sub-pixel areas, and each of the sub-pixel areas includes:

- a first sub-pixel;
- a second sub-pixel adjacent to the first sub-pixel along a scan line direction;
- a third sub-pixel adjacent to the second sub-pixel along a scan line direction;
- a fourth sub-pixel adjacent to the third sub-pixel along a scan line direction;
- a fifth sub-pixel adjacent to the first sub-pixel along a data line direction;
- a sixth sub-pixel adjacent to the second sub-pixel along a data line direction;
- a seventh sub-pixel adjacent to the third sub-pixel along a data line direction;
- an eighth sub-pixel adjacent to the fourth sub-pixel along a data line direction;
- a first data line electrically connecting the first sub-pixel, the second sub-pixel, the fifth sub-pixel, and the sixth sub-pixel;
- a second data line electrically connecting the third sub-pixel, the fourth sub-pixel, the seventh sub-pixel, and the eighth sub-pixel;
- a first scan line electrically connecting the first sub-pixel and the third sub-pixel;
- a second scan line electrically connecting the second sub-pixel and the fourth sub-pixel;
- a third scan line electrically connecting the fifth sub-pixel and the seventh sub-pixel;
- a fourth scan line electrically connecting the sixth sub-pixel and the eighth sub-pixel.

Figure 12B:
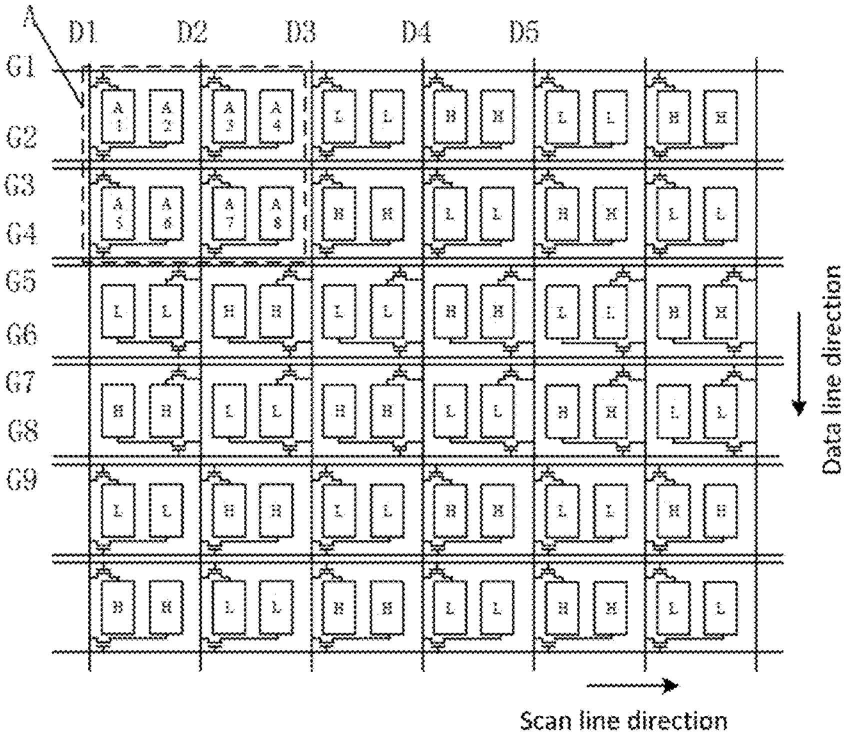
FIG. 12B is a schematic diagram of a sub-pixel area according to a thirty-fourth embodiment of the present invention.

Referring to FIG. 12B, FIG. 12B is a schematic diagram of another seed pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific embodiment, the voltages applied to the first pixel A1, the second pixel A2, the fifth pixel A5, and the sixth pixel A6 have the same polarity, and are opposite in polarity to the voltages applied to the third pixel A3, the fourth pixel A4, the seventh pixel A7, and the eighth pixel A8.

The voltages applied to the first pixel A1, the second pixel A2, the seventh pixel A7, and the eighth pixel A8 have the same gray scale, that is, the same as H or the same as L, and opposite to the voltage gray scale loaded on the third pixel A3, the fourth pixel A4, the fifth pixel A5, and the sixth pixel A6.

According to the above-mentioned cooperation relationship between the polarity of the voltage applied to the sub-pixel and the gray scale of the voltage, a specific embodiment is shown. Within one frame, loading a negative polarity gray scale voltage to the first pixel A1, which can be expressed as LN; loading a negative polarity gray scale voltage to the second pixel A2, which can be expressed as LN; loading a positive polarity high gray scale voltage to the third pixel A3, which can be expressed as HP; loading a positive polarity high gray scale voltage to the fourth pixel A4, which can be expressed as HP; loading a negative polarity high gray scale voltage to the fifth pixel A5, which can be expressed as HN; loading a negative polarity high gray scale voltage to the sixth pixel A6, which can be expressed as HN; loading a positive low-gradation voltage to the seventh pixel A7, which can be expressed as LP; loading a positive low-gradation voltage to the eighth pixel A8, which can be expressed as LP.

In order to more clearly describe the above voltage loading relationship, from a certain column, the voltage relationship loaded for each sub-pixel in any column is sequentially expressed as: LN, HN, LP, HP, LN, HN, LP, HP . . . sequentially cycle; from a certain line, the voltage relationship loaded for each sub-pixel in any row is sequentially expressed as: LN, LN, HP, HP, LN, LN, HP, HP . . . sequentially cycle.

Or, within one frame, loading a positive low-gradation voltage to the first pixel A1, which can be expressed as LP; loading a positive low-gradation voltage to the second pixel A2, which can be expressed as LP; loading a negative polarity high gray scale voltage to the third pixel A3, which can be expressed as HN; loading a negative polarity high gray scale voltage to the fourth pixel A4, which can be expressed as HN; loading a positive polarity high gray scale voltage to the fifth pixel A5, which can be expressed as HP; loading a positive polarity high gray scale voltage to the sixth pixel A6, which can be expressed as HP; loading a negative polarity gray scale voltage to the seventh pixel A7, which can be expressed as LN; loading the negative polarity gray scale voltage to the eighth pixel A8, which can be expressed as LN.

In order to more clearly describe the above voltage loading relationship, from a certain column, the voltage relationship loaded for each sub-pixel in any column is sequentially expressed as: LP, HP, LN, HN, LP, HP, LN, HN . . . sequentially cycle; from a certain line, the voltage relationship loaded for each sub-pixel in any row is sequentially expressed as: LP, LP, HN, HN, LP, LP, HN, HN . . . sequentially cycle.

In another embodiment, the voltages applied to the first pixel A1, the second pixel A2, the seventh pixel A7, and the eighth pixel A8 have the same polarity, and are opposite in polarity to the voltages applied to the third pixel A3, the fourth pixel A4, the fifth pixel A5, and the sixth pixel A6. The voltages applied to the first pixel A1, the second pixel A2, the seventh pixel A7, and the eighth pixel A8 are the same gray scale, that is, both H or the same L, and are opposite to the voltage gray scales applied to the third pixel A3, the fourth pixel A4, the fifth pixel A5, and the sixth pixel A6. In this driving mode, other pixels are correspondingly arranged in the above manner. And the gray-scale voltage relationship loaded on the pixel is re-acquired according to the above example, and details are not described herein again.

Embodiment 35

In a specific embodiment, in order to more clearly show the solution of the thirty-first embodiment of the present invention, the pixel matrix includes a plurality of sub-pixel areas, and each of the sub-pixel areas includes:

a first sub-pixel;

a second sub-pixel adjacent to the first sub-pixel along a scan line direction;

a third sub-pixel adjacent to the second sub-pixel along a scan line direction;

a fourth sub-pixel adjacent to the third sub-pixel along a scan line direction;

a fifth sub-pixel adjacent to the first sub-pixel along a data line direction;

a sixth sub-pixel adjacent to the second sub-pixel along a data line direction;

a seventh sub-pixel adjacent to the third sub-pixel along a data line direction;

an eighth sub-pixel adjacent to the fourth sub-pixel along a data line direction;

a first data line electrically connecting the first sub-pixel, the second sub-pixel, the fifth sub-pixel, and the sixth sub-pixel;

a second data line electrically connecting the third sub-pixel, the fourth sub-pixel, the seventh sub-pixel, and the eighth sub-pixel;

a first scan line electrically connecting the first sub-pixel and the third sub-pixel;

a second scan line electrically connecting the second sub-pixel and the fourth sub-pixel;

a third scan line electrically connecting the fifth sub-pixel and the seventh sub-pixel;

a fourth scan line electrically connecting the sixth sub-pixel and the eighth sub-pixel.

Figure 12C:
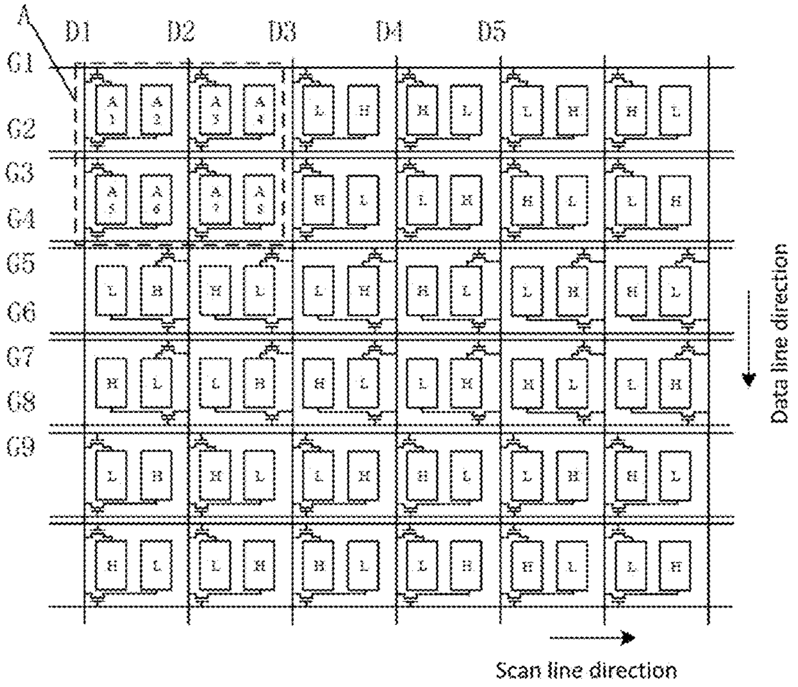
FIG. 12C is a schematic diagram of a sub-pixel area according to a thirty-fifth embodiment of the present invention.

Referring to FIG. 12C, FIG. 12C is a schematic diagram of still another sub-pixel area according to an embodiment of the present invention. The area indicated by the mark A is represented as a sub-pixel area, and each sub-pixel area includes eight sub-pixels, which are divided into upper and lower lines, four sub-pixels in each line. The first pixel A1, the second pixel A2, the third pixel A3, and the fourth pixel A4 are in a row, and the fifth pixel A5, the sixth pixel A6, the seventh pixel A7, and the eighth pixel A8 are in the next row facing the uplink. The pixel matrix is sequentially filled by a plurality of sub-pixel areas. The first data line D1 is electrically connected to the first sub-pixel A1, the second sub-pixel A2, the fifth sub-pixel A5, and the sixth sub-pixel A6; the second data line D2 is electrically connected to the third sub-pixel A3, the fourth sub-pixel A4, the seventh sub-pixel A7, and the eighth sub-pixel A8; the first scan line G1 is electrically connected to the first sub-pixel A1 and the third sub-pixel A3; the second scan line G2 is electrically connected to the second sub-pixel A2 and the fourth sub-pixel A4; the third scan line G3 is electrically connected to the fifth sub-pixel A5 and the seventh sub-pixel A7; the fourth scan line G4 is electrically connected to the sixth sub-pixel A6 and the eighth sub-pixel A8.

In a specific embodiment, the voltages applied to the first pixel A1, the second pixel A2, the fifth pixel A5, and the sixth pixel A6 have the same polarity, and are opposite in polarity to the voltages applied to the third pixel A3, the fourth pixel A4, the seventh pixel A7, and the eighth pixel A8.

The voltages applied to the first pixel A1, the fourth pixel A4, the sixth pixel A6, and the seventh pixel A7 are the same gray scale, that is, both H or the same L, and opposite to the voltage gray scale loaded onto the second pixel A2, the third pixel A3, the fifth pixel A5, and the eighth pixel A8.

According to the above-mentioned cooperation relationship between the polarity of the voltage applied to the sub-pixel and the gray scale of the voltage, a specific embodiment is shown. Within one frame, loading a negative polarity gray scale voltage to the first pixel A1, which can be expressed as LN; loading a negative polarity high gray scale voltage to the second pixel A2, which can be expressed as HN; loading a positive polarity high gray scale voltage to the third pixel A3, which can be expressed as HP; loading a positive low-gradation voltage to the fourth pixel A4, which can be expressed as LP; loading a negative polarity high gray scale voltage to the fifth pixel A5, which can be expressed as HN; loading a negative polarity gray scale voltage to the sixth pixel A6, which can be expressed as LN; loading a positive low-gradation voltage to the seventh pixel A7, which can be expressed as LP; loading a positive polarity high gray scale voltage to the eighth pixel A8, which can be expressed as HP.

In order to more clearly describe the above voltage loading relationship, from a certain column, the voltage relationship loaded for each sub-pixel in any column is sequentially expressed as: LN, HN, LP, HP, LN, HN, LP, HP . . . sequentially cycle; from a certain line, the voltage relationship loaded for each sub-pixel in any row is sequentially expressed as: LN, HN, HP, LP, LN, HN, HP, LP . . . sequentially cycle.

Or, within one frame, loading a positive low-gradation voltage to the first pixel A1, which can be expressed as LP; loading a positive polarity high gray scale voltage to the second pixel A2, which can be expressed as HP; loading a negative polarity high gray scale voltage to the third pixel A3, which can be expressed as HN; loading a negative polarity gray scale voltage to the fourth pixel A4, which can be expressed as LN; loading a positive polarity high gray scale voltage to the fifth pixel A5, which can be expressed as HP; loading a positive low-gradation voltage to the sixth pixel A6, which can be expressed as LP; loading a negative polarity gray scale voltage to the seventh pixel A7, which can be expressed as LN; loading a negative polarity high gray scale voltage to the eighth pixel A8, which can be expressed as HN.

In order to more clearly describe the above voltage loading relationship, from a certain column, the voltage relationship loaded for each sub-pixel in any column is sequentially expressed as: LP, HP, LN, HN, LP, HP, LN, HN . . . sequentially cycle; from a certain line, the voltage relationship loaded for each sub-pixel in any row is expressed as follows: LP, HP, HN, LN, LP, HP, HN, LN . . . sequentially cycle.

In another embodiment, the voltages applied to the first pixel A1, the second pixel A2, the seventh pixel A7, and the eighth pixel A8 have the same polarity, and are opposite in polarity to the voltages applied to the third pixel A3, the fourth pixel A4, the fifth pixel A5, and the sixth pixel A6. The voltages applied to the first pixel A1, the fourth pixel A4, the sixth pixel A6, and the seventh pixel A7 are the same gray scale, that is, both H or the same L, and are opposite to the voltage gray scales applied to the second pixel A2, the third pixel A3, the fifth pixel A5, and the eighth pixel A8. In this driving mode, other pixels are correspondingly arranged in the above manner. And the gray-scale voltage relationship loaded on the pixel is re-acquired according to the above example, and details are not described herein again.

Embodiment 36

Figure 12D:
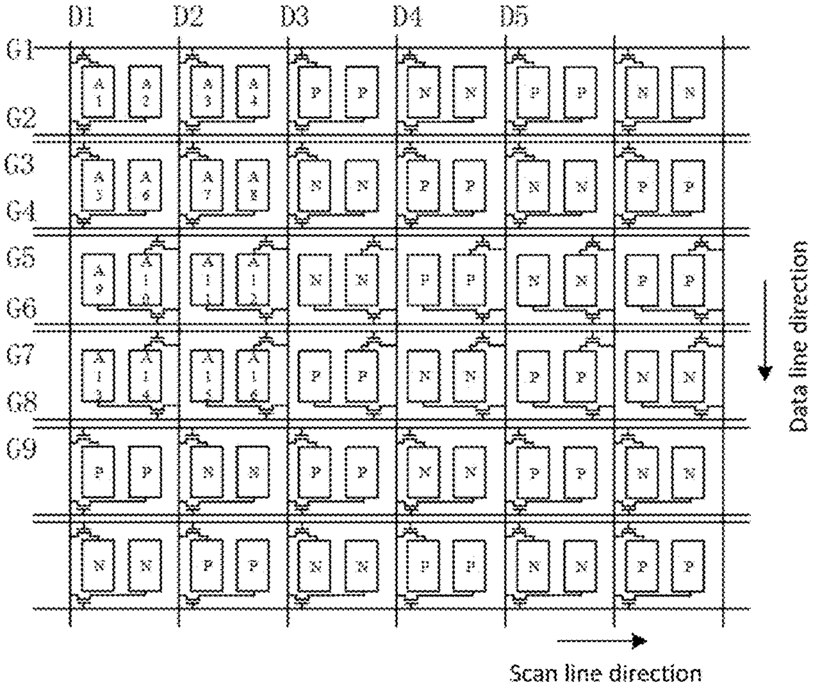
FIG. 12D is a schematic diagram of a pixel matrix driving manner according to a thirty-sixth embodiment of the present invention.
Figure 12E:
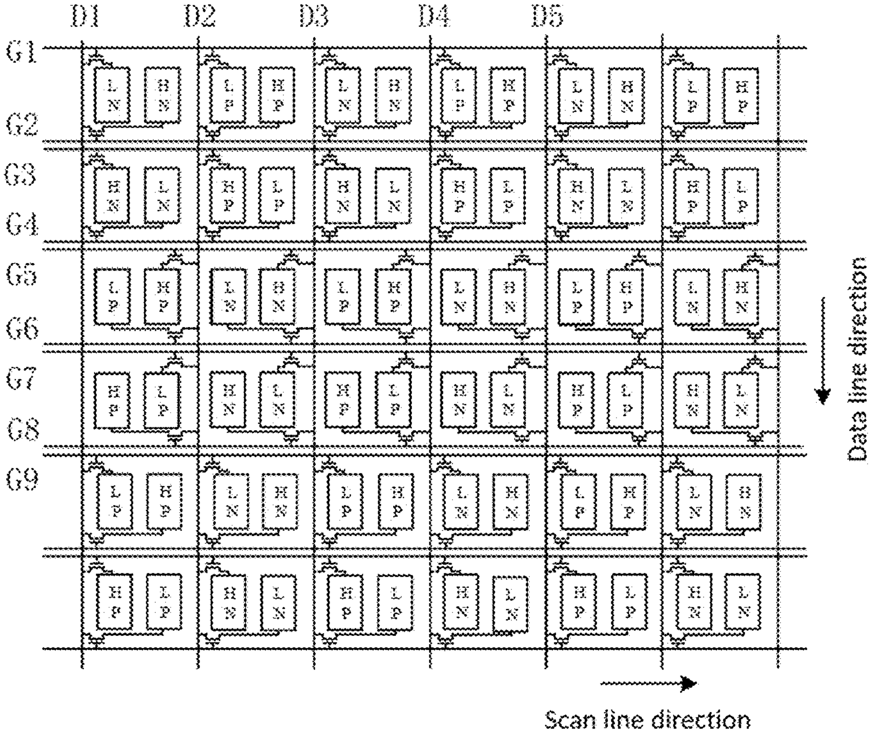
FIG. 12E is a schematic diagram of a specific implementation manner of the driving manner in FIG. 12D.

Please refer to FIG. 12D and FIG. 12E together. FIG. 12D is a schematic diagram of a pixel matrix driving manner according to an embodiment of the present invention; FIG. 12E is a schematic diagram of a specific implementation manner of the driving manner in FIG. 12D. In an optional 4×4 area, in this embodiment, the first pixel A1, the second pixel A2, the fifth pixel A5, and the sixth pixel A6 are connected to the first data line D1, the third pixel A3, the fourth pixel A4, the seventh pixel A7, the eighth pixel A8, the ninth pixel A9, the tenth pixel A10, the thirteenth pixel A13, and the fourteenth pixel A14 are connected to the second data line D2, the eleventh pixel A11, the twelfth pixel A12, the fifteenth pixel A15, the sixteenth pixel A16 are connected to the third data line D3;

at the first moment in a frame, loading a scan signal on the first row of scan lines G1, and loading the voltage corresponding to LN on the first data line D1 to the first pixel A1, and loading the voltage corresponding to the LP on the second data line D2 to the third pixel A3, and so on;

at the next moment (the second moment), loading a scan signal on the second row of scan lines G2, and loading the voltage corresponding to HN on the first data line D1 to the second pixel A2, loading the voltage corresponding to HP on the second data line D2 to the fourth pixel A4, and so on;

at the next moment (the third moment), loading a scan signal on the third row of scan lines G3, and loading the voltage corresponding to HN on the first data line D1 to the fifth pixel A5, and loading the voltage corresponding to HP on the second data line D2 to the seventh pixel A7, and so on;

at the next moment (the third moment), loading a scan signal on the fourth row of scan lines G4, and loading the voltage corresponding to LN on the first data line D1 to the sixth pixel A6, and loading the voltage corresponding to the LP on the second data line D2 to the eighth pixel A8, and so on;

at the next moment (the fifth moment), loading a scan signal on the fifth row of scan lines G5, and loading the voltage corresponding to HP to the tenth pixel A10 on the second data line D2, and loading the voltage corresponding to the HN to the twelfth pixel A12 on the third data line D3, and so on;

at the next moment (the sixth moment), loading a scan signal on the sixth line scan line, and loading the voltage corresponding to the LP on the second data line D2 to the ninth pixel A9, and loading the voltage corresponding to the LN on the third data line D3 to the eleventh pixel A11, and so on;

at the next moment (the seventh moment), loading a scan signal on the seventh line scan line G7, and loading the voltage corresponding to the LP on the second data line D2 to the fourteenth pixel A14, and loading the voltage corresponding to the LN on the third data line D3 to the sixteenth pixel A16, and so on;

at the next moment (the eighth moment), loading a scan signal on the eighth row of scan lines G8, and loading the voltage corresponding to HP to the thirteenth pixel on the second data line D2, and loading the voltage corresponding to the HN to the fifteenth pixel on the third data line D3, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Embodiment 37

Figure 12F:
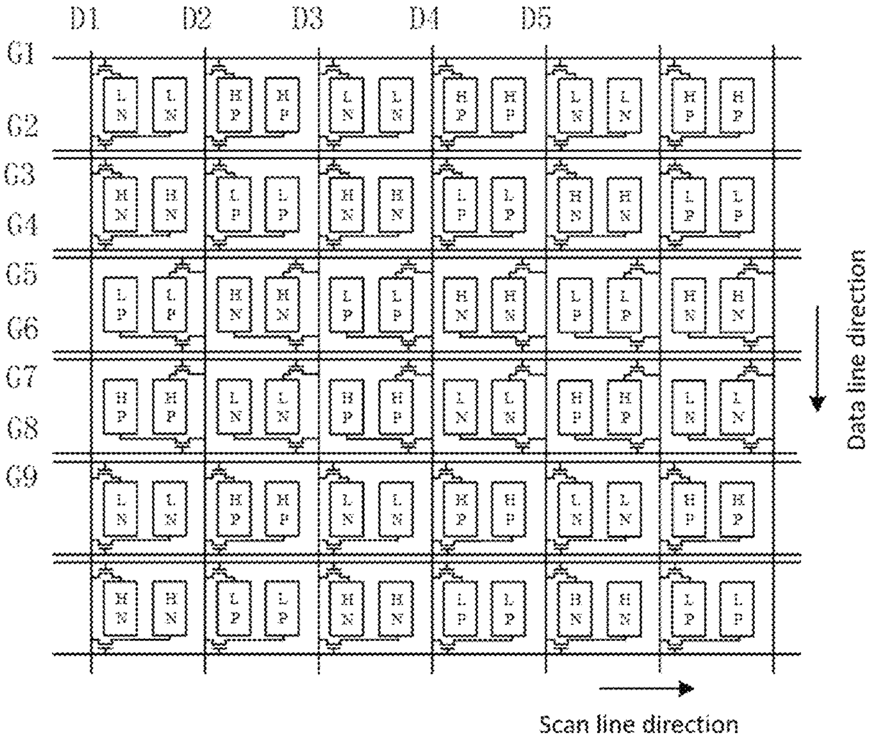
FIG. 12F is a schematic diagram of another specific embodiment of the driving method in FIG. 12D.

Referring to FIG. 12D and FIG. 12F together, FIG. 12F is a schematic diagram of another specific implementation manner of the driving manner in FIG. 12D. In an optional 4×4 area, in this embodiment, the first pixel A1, the second pixel A2, the fifth pixel A5, and the sixth pixel A6 are connected to the first data line D1, the third pixel A3, the fourth pixel A4, the seventh pixel A7, the eighth pixel A8, the ninth pixel A9, the tenth pixel A10, the thirteenth pixel A13, and the fourteenth pixel A14 are connected to the second data line D2, the eleventh pixel A11, the twelfth pixel A12, the fifteenth pixel A15, the sixteenth pixel A16 are connected to the third data line D3;

at the first moment in a frame, loading a scan signal on the first row of scan lines G1, and loading the voltage corresponding to LN on the first data line D1 to the first pixel A1, loading the voltage corresponding to HP on the second data line D2 to the third pixel A3, and so on;

at the next moment (the second moment), loading a scan signal on the second row of scan lines G2, and loading the voltage corresponding to LN on the first data line D1 to the second pixel A2, and loading the voltage corresponding to HP on the second data line D2 to the fourth pixel A4, and so on;

at the next moment (the third moment), loading a scan signal on the third row of scan lines G3, and loading the voltage corresponding to HN on the first data line D1 to the fifth pixel A5, and loading the voltage corresponding to the LP on the second data line D2 to the seventh pixel A7, and so on;

at the next moment (the fourth moment), loading a scan signal on the fourth row of scan lines G4, and loading the voltage corresponding to HN on the first data line D1 to the sixth pixel A6, and loading the voltage corresponding to the LP on the second data line D2 to the eighth pixel A8, and so on;

at the next moment (the fifth moment), loading a scan signal on the fifth line scan line G5, and loading the voltage corresponding to the LP on the second data line D2 to the tenth pixel A10, and loading the voltage corresponding to the HN on the third data line D3 to the twelfth pixel A12, and so on;

at the next moment (the sixth moment), loading a scan signal on the sixth line scan line G6, and loading the voltage corresponding to the LP on the second data line D2 to the ninth pixel A9, and loading the voltage corresponding to the HN on the third data line D3 to the eleventh pixel A11, and so on;

at the next moment (the seventh moment), loading a scan signal on the seventh row of scan lines G7, and loading the voltage corresponding to HP to the fourteenth pixel A14 on the second data line D2, and loading the voltage corresponding to LN to the sixteenth pixel A16 on the third data line D3, and so on;

at the next moment (the eighth moment), loading the scan signal on the eighth line scan line G8, and loading the voltage corresponding to HP to the thirteenth pixel A13 on the second data line D2, and loading the voltage corresponding to the LN to the fifteenth pixel A15 on the third data line D3, and so on.

This scheme lists the voltage loading in the case of 4×4, and the other sub-pixels and other times are sequentially loaded with the corresponding voltages according to the above rules.

In the embodiment of the present invention, the side visibility can be improved by alternately loading the positive and negative polarity voltages and the high and low gray scale voltages to the pixel matrix. The pixels in the pixel matrix are not affected by the polarity, the crosstalk, the bright and dark lines and the like are improved, and the display effect is improved.

Embodiment 38

Figure 12G:
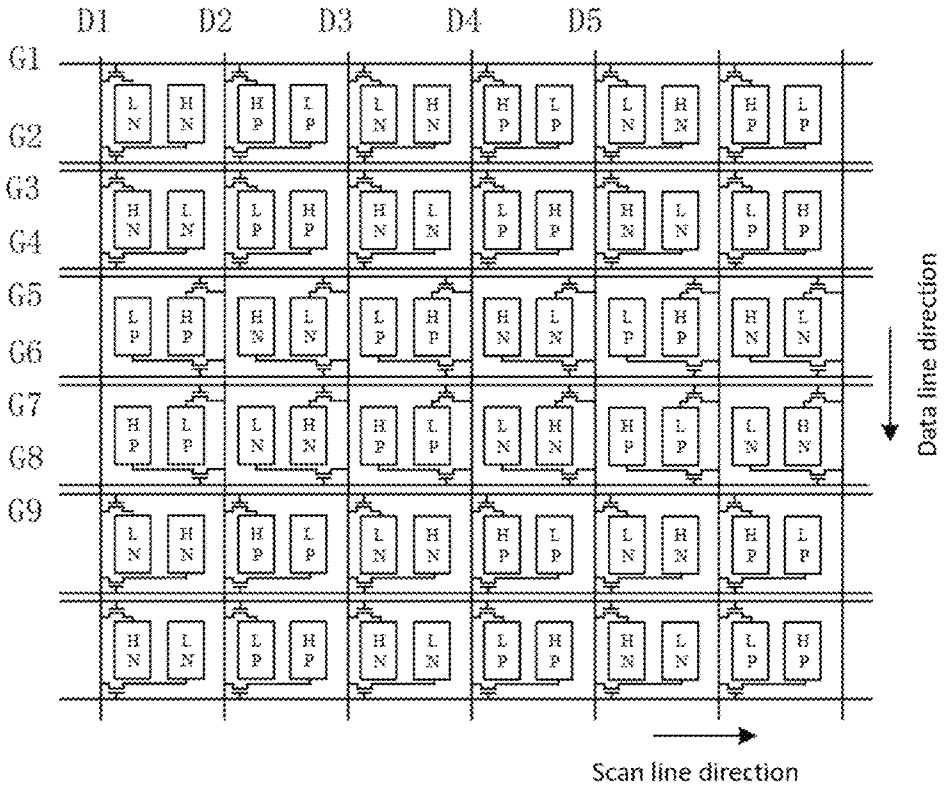
FIG. 12G is a schematic illustration of still another embodiment of the driving method of FIG. 12D.

Referring to FIG. 12D and FIG. 12G together, FIG. 12G is a schematic diagram of another specific implementation manner of the driving manner in FIG. 12D;

in an optional 4×4 area, in this embodiment, the first pixel A1, the second pixel A2, the fifth pixel A5, and the sixth pixel A6 are connected to the first data line D1, the third pixel A3, the fourth pixel A4, the seventh pixel A7, the eighth pixel A8, the ninth pixel A9, the tenth pixel A10, the thirteenth pixel A13, and the fourteenth pixel A14 are connected to the second data line D2, the eleventh pixel A11, the twelfth pixel A12, the fifteenth pixel A15, the sixteenth pixel A16 are connected to the third data line D3;

at the first moment in a frame, loading a scan signal on the first row of scan lines G1, and loading the voltage corresponding to LN on the first data line D1 to the first pixel A1, loading the voltage corresponding to HP on the second data line D2 to the third pixel A3, and so on;

at the next moment (the second moment), loading a scan signal on the second row of scan lines G2, and loading the voltage corresponding to HN on the first data line D1 to the second pixel A2, and loading the voltage corresponding to HL on the second data line D2 to the fourth pixel A4, and so on;

at the next moment (the third moment), loading a scan signal on the third row of scan lines G3, and loading the voltage corresponding to HN on the first data line D1 to the fifth pixel A5, and loading the voltage corresponding to the LP on the second data line D2 to the seventh pixel A7, and so on;

at the next moment (the fourth moment), loading a scan signal on the fourth row of scan lines G4, and loading the voltage corresponding to LN on the first data line D1 to the sixth pixel A6, and loading the voltage corresponding to HP on the second data line D2 to the eighth pixel A8, and so on;

at the next moment (the fifth moment), loading a scan signal on the fifth line scan line G5, and loading the voltage corresponding to the LP on the second data line D2 to the tenth pixel A10, and loading the voltage corresponding to the HN on the third data line D3 to the twelfth pixel A12, and so on;

at the next moment (the sixth moment), loading a scan signal on the sixth line scan line G6, and loading the voltage corresponding to HP to the ninth pixel A9 on the second data line D2, and loading the voltage corresponding to the LN on the third data line D3 to the eleventh pixel A11, and so on;

at the next moment (the seventh moment), loading a scan signal on the seventh row of scan lines G7, and loading the voltage corresponding to HP to the fourteenth pixel A14 on the second data line D2, and loading the voltage corresponding to LN to the sixteenth pixel A16 on the third data line D3, and so on;

at the next moment (the eighth moment), loading a scan signal on the eighth line scan line G8, and loading the voltage corresponding to the LP to the thirteenth pixel on the second data line D2, and loading the voltage corresponding to the HN to the fifteenth pixel on the third data line D3, and so on.

This scheme lists the voltage loading in the case of 4×4, and the other sub-pixels and other times are sequentially loaded with the corresponding voltages according to the above rules.

According to the above embodiment of the present invention, by alternately loading the positive and negative polarity voltages and the high and low gray scale voltages to the pixel matrix, the side visibility can be improved, and the pixels in the pixel matrix are not affected by the polarity, which improves crosstalk, bright and dark lines, and the like, and improves the display effect.

Figure 13A:
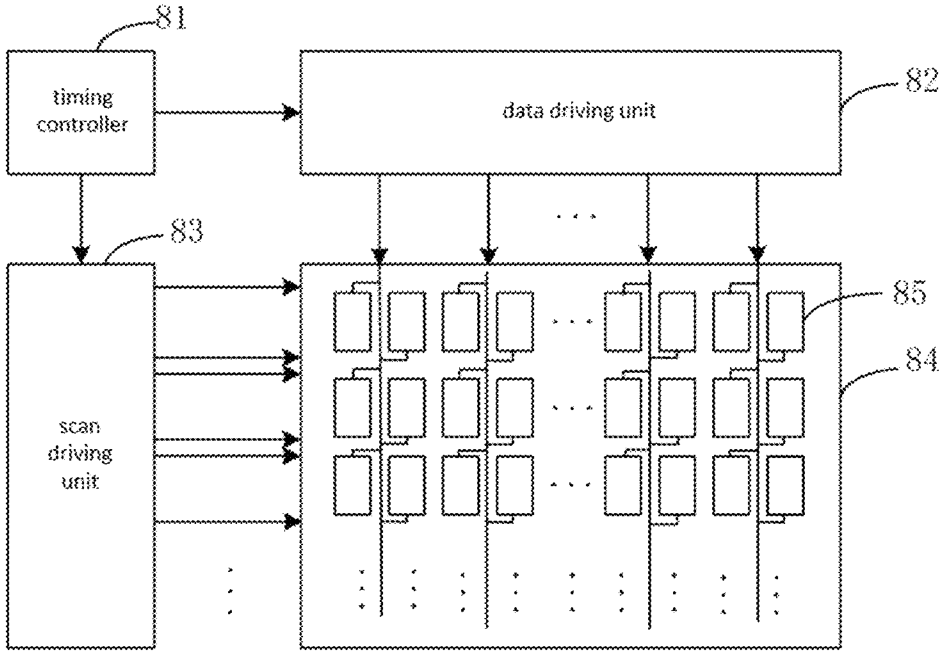
FIG. 13A is a schematic structural diagram of a display device according to an embodiment of the present invention.
Figure 13B:
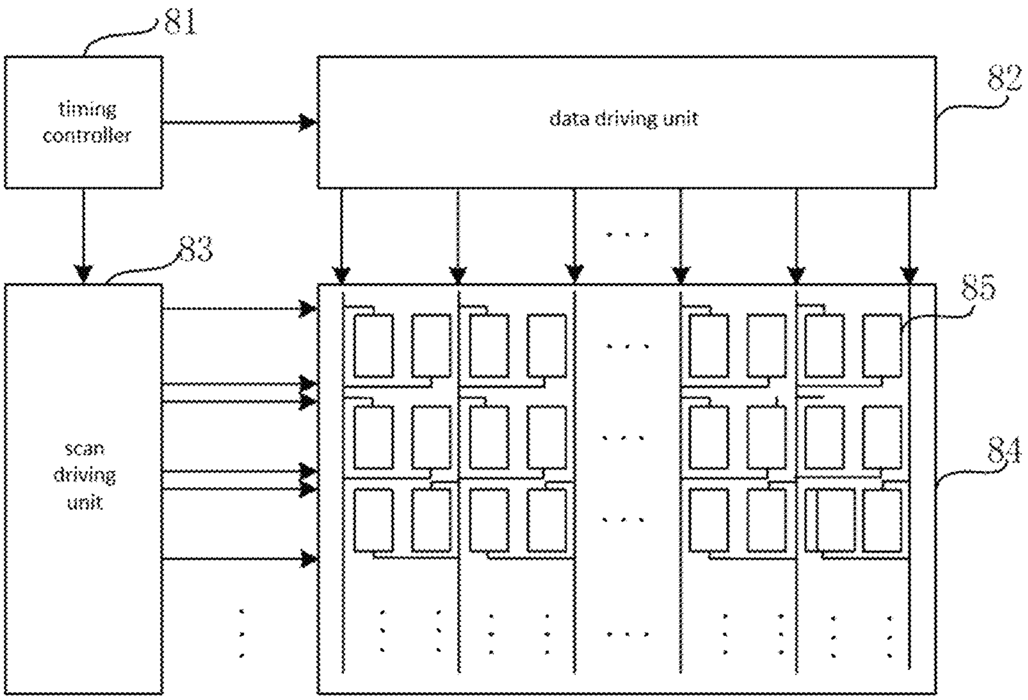
FIG. 13B is a schematic structural diagram of another display device according to an embodiment of the present invention.

In addition, please refer to FIG. 13A and FIG. 13B, the display device shown in FIG. 13A is adapted to perform the method for driving the pixel matrix described in the foregoing first to twenty-eighth embodiments. The display device shown in FIG. 13B is adapted to perform the method for driving the pixel matrix described in the aforementioned twenty-ninth to thirty-eighth embodiments. As shown in FIG. 13A and FIG. 13B, the display device provided by the embodiment of the present invention includes a timing controller 81, a data driving unit 82, a scan driving unit 83, and a display panel 84. The display panel 84 is provided with a pixel matrix 85; the timing controller 81 is connected to the data driving unit 82 and the scan driving unit 83, and the data driving unit 82 and the scan driving unit 83 are respectively connected to the pixel matrix 85.

In a specific embodiment, the timing controller 81 is configured to receive image data, acquire original pixel data according to the image data, obtain first gray scale data and second gray scale data according to the original pixel data, and output the first gray scale data and the second gray scale data to the data driving unit 82; the data driving unit 82 is configured to generate a first driving voltage according to the first gray scale data and generate a second driving voltage according to the second gray scale data, and in a frame, is also used to load a first driving voltage corresponding to the first gray scale data or a second driving voltage corresponding to the second gray scale data in the data line direction to the pixel matrix 85; and the scan driving unit 83 is configured to load a scan signal to the pixel matrix 85. The display panel 84 includes a plurality of data lines, a plurality of scan lines, and a plurality of sub-pixels connected to the data lines and the scan lines. The sub-pixels are arranged on the display panel 84 in the data line direction and along the scan line direction to form a pixel matrix 85.

Specifically, the timing controller 81 inputs an RGB data signal of an image from the outside, such as red image data R, green image data G, blue image data B, or image data of other colors, and generates corresponding original pixel data according to the image data, and causes the original pixel data to correspond to two sets of gray scales according to the above rule of the present invention, that is High gray scale data and low gray scale data. The data driving unit 82 converts the high gray scale data and the low gray scale data into a corresponding high gray scale voltage and low gray scale voltage by using a fixed gamma. The data driving unit 82 controls a specific output operation according to the above method of the present invention, and outputs an output of high gray scale, low gray scale, positive voltage, and negative voltage in accordance with timing correspondence.

In another specific embodiment, the timing controller 81 is configured to receive image data, acquire original pixel data according to the image data, and obtain an original data driving signal of each pixel position according to the original pixel data; the data driving unit 82 is configured to convert the original data driving signal into a first driving voltage or a second driving voltage according to a preset conversion rule, and in one frame, to load the first driving voltage or the second driving voltage to the pixel matrix 85 in a data line direction; and the scan driving unit 83 is configured to load a scan signal to the pixel matrix 85.

Specifically, the timing controller 81 inputs image data from the outside, generates corresponding original pixel data from the image data, and outputs the original data driving signal to the data driving unit 82. Since the data driving unit 82 only receives the original gray scale value and the corresponding H or L conversion rule, the data driving unit 82 generates a high gamma high gray scale voltage and a low gamma low gray scale voltage through two different gamma correspondences. The data driving unit 82 controls a specific output operation according to the above method of the present invention, and outputs an output of high gray scale, low gray scale, positive voltage, and negative voltage in accordance with timing correspondence.

The functional details of the timing controller 81 and the data driving unit 82 of the present embodiment are not described herein again, and reference may be made to the related descriptions of the foregoing first to thirty-eighth embodiments.

The above is a further detailed description of the present invention in connection with the specific preferred embodiments, and the specific embodiments of the present invention are not limited to the description. It will be apparent to those skilled in the art that the present invention may be made without departing from the spirit and scope of the invention.

What is claimed is:

1. A method for driving a pixel matrix, the pixel matrix comprising a plurality of sub-pixels arranged in a matrix, wherein voltages applied along any one of data lines change in polarity once every two sub-pixels; any one of the data lines controls voltage inputs of sub-pixels in a scan line direction and respectively connected to two sides of the data line; and the method comprises:

receiving an image data, and acquiring original pixel data according to the image data;

generating a first driving voltage and a second driving voltage according to the original pixel data; and loading the first driving voltage or the second driving voltage to the pixel matrix along each of the data lines;

wherein the first driving voltage and the second driving voltage correspond to different gray voltage values, the first driving voltage is one of a high gray scale voltage value and a low gray scale voltage value, and the second driving voltage is the other of the high gray scale voltage value and the low gray scale voltage value;

wherein the step of loading the first driving voltage or the second driving voltage to the pixel matrix along each of the data lines comprises:

loading the first driving voltage and the second driving voltage alternately as per every sub-pixel along a data line direction, and loading the first driving voltage and the second driving voltage alternately as per every two sub-pixels along the scan line direction.

2. The method according to claim 1, wherein the step of generating a first driving voltage and a second driving voltage according to the original pixel data comprises:

obtaining a first gray scale data and a second gray scale data according to the original pixel data; and generating the first driving voltage corresponding to the first gray scale data and the second driving voltage corresponding to the second gray scale data, according to the first gray scale data and the second gray scale data.

3. The method according to claim 2, wherein the step of obtaining a first gray scale data and a second gray scale data according to the original pixel data comprises:

obtaining an original gray scale value of each pixel position according to the original pixel data, and converting the original gray scale value of each pixel position into the first gray scale data or the second gray scale data according to a predetermined conversion manner.

4. The method according to claim 1, wherein the step of generating a first driving voltage and a second driving voltage according to the original pixel data comprises:

obtaining an original data driving signal for each pixel position according to the original pixel data; and converting the original data driving signal into the first driving voltage or the second driving voltage according to a preset conversion rule.

5. The method according to claim 4, wherein the step of obtaining an original data driving signal for each pixel position according to the original pixel data comprises:

obtaining an original gray scale value for each pixel position according to the original pixel data; and obtaining the original data driving signal according to the original gray scale value.

6. The method according to claim 1, wherein the plurality of sub-pixels comprises eight sub-pixels connected to a same data line; the eight sub-pixels are a first sub-pixel, a second sub-pixel, a third sub-pixel, a fourth sub-pixel, a fifth sub-pixel, a sixth sub-pixel, a seventh sub-pixel, and an eighth sub-pixel; the first sub-pixel and the second sub-pixel are respectively arranged at two opposite sides of the same data line and are arranged in the scan line direction; the third sub-pixel and the fourth sub-pixel are respectively arranged at two opposite sides of the same data line and are arranged in the scan line direction; the fifth sub-pixel and the sixth sub-pixel are respectively arranged at two opposite sides of the same data line and are arranged in the scan line direction; the seventh sub-pixel and the eighth sub-pixel are respectively arranged at two opposite sides of the same data line and are arranged in the scan line direction; the first sub-pixel, the third sub-pixel, the fifth sub-pixel, and the seventh sub-pixel are arranged at a first side of the same data line and are sequentially arranged in that order in the data line direction, and the second sub-pixel, the fourth sub-pixel, the sixth sub-pixel, and the eighth sub-pixel are arranged at a second side opposite to the first side of the same data line and are sequentially arranged in that order in the data line direction; and the first sub-pixel, the second sub-pixel, the third sub-pixel, the fourth sub-pixel, the sixth sub-pixel, the fifth sub-pixel, the eighth sub-pixel, and the seventh sub-pixel are respectively connected to a first scan line, a second scan line, a third scan line, a fourth scan line, a fifth scan line, a sixth scan line, a seventh scan line, and an eight scan line, which are sequentially arranged in that order along the same data line.

7. The method according to claim 6, wherein the eight sub-pixels are defined as a pixel unit, and the plurality of sub-pixels is consisted of the pixel units, which are repeatedly and continuously arranged in rows and columns.

8. The method according to claim 1, wherein the plurality of sub-pixels is consisted of pixel units repeatedly and continuously arranged in rows and columns; each of the pixel units is consisted of four sub-pixels; the four sub-pixels are a first sub-pixel, a second sub-pixel, a third sub-pixel, and a fourth sub-pixel, which are sequentially arranged in that order along the scan line direction; the first sub-pixel and the second sub-pixel are respectively arranged at two opposite sides of a first data line, and the third sub-pixel and the fourth sub-pixel are respectively arranged at two opposite sides of a second data line adjacent to the first data line; the first sub-pixel, the second sub-pixel, the third sub-pixel, and the fourth sub-pixel are arranged between a first scan line and a second scan line adjacent to the first scan line; the first sub-pixel and the fourth sub-pixel are connected to the first scan line, and the second sub-pixel and the third sub-pixel are connected to the second scan line.

9. The method according to claim 1, wherein two adjacent sub-pixels along the scan line direction are arranged between every two adjacent data lines, and the two adjacent sub-pixel are connected to a same side of a same data line and are respectively connected to two adjacent scan lines.

10. The method according to claim 1, wherein the plurality of sub-pixels is consisted of pixel units repeatedly and continuously arranged in rows and columns; each of the pixel units is consisted of eight sub-pixels; the eight sub-pixels are a first sub-pixel, a second sub-pixel, a third sub-pixel, a fourth sub-pixel, a fifth sub-pixel, a sixth sub-pixel, a seventh sub-pixel, and an eighth sub-pixel, which are individually connected to a same side of a same data line; the first sub-pixel and the second sub-pixel are arranged in the scan line direction; the third sub-pixel and the fourth sub-pixel are arranged in the scan line direction; the fifth sub-pixel and the sixth sub-pixel are arranged in the scan line direction; the seventh sub-pixel and the eighth sub-pixel are arranged in the scan line direction; the first sub-pixel, the third sub-pixel, the fifth sub-pixel, and the seventh sub-pixel are sequentially arranged in that order in the data line direction, and the second sub-pixel, the fourth sub-pixel, the sixth sub-pixel, and the eighth sub-pixel are sequentially arranged in that order in the data line direction; and the first sub-pixel, the second sub-pixel, the third sub-pixel, the fourth sub-pixel, the sixth sub-pixel, the fifth sub-pixel, the eighth sub-pixel, and the seventh sub-pixel are respectively connected to a first scan line, a second scan line, a third scan line, a fourth scan line, a fifth scan line, a sixth scan line, a seventh scan line, and an eight scan line, which are sequentially arranged in that order along the same data line.

11. A display device, comprising a timing controller, a data driving unit, a scan driving unit and a pixel matrix, wherein in the pixel matrix, voltages applied along any one of data lines change in polarity once every two sub-pixels, any one of the data lines controls voltage inputs of sub-pixels in a scan line direction and respectively connected to two sides of the data line, in the scan line direction, two adjacent sub-pixels in a row, which are opposite to each other in position and respectively located at two sides of each of the data lines, are directly respectively connected to the two sides of the data line and have opposite polarities, and the two adjacent sub-pixels in the row are respectively directly connected to two adjacent scan lines and are arranged between the two adjacent scan lines; the timing controller is individually connected to the data driving unit and the scan driving unit, and the data driving unit and the scan driving unit are individually connected to the pixel matrix;

wherein the scan driving unit is configured to load a scan signal to the pixel matrix; and the timing controller is configured to receive an image data, acquire original pixel data according to the image data, and obtain a first gray scale data and a second gray scale data according to the original pixel data; and the data driving unit is configured to generate a first driving voltage corresponding to the first gray scale data and a second driving voltage corresponding to the second gray scale data according to the first gray scale data and the second gray scale data, and load the first driving voltage or the second driving voltage into the pixel matrix along any one of the data lines; or the timing controller is configured to receive an image data, acquire original pixel data according to the image data, and obtain an original data driving signal for each pixel position according to the original pixel data; and the data driving unit is configured to convert the original data driving signal into a first driving voltage or a second driving voltage according to a preset conversion rule, and load the first driving voltage or the second driving voltage into the pixel matrix along any one of the data lines;

wherein the first driving voltage and the second driving voltage correspond to different gray voltage values, the first driving voltage is one of a high gray scale voltage value and a low gray scale voltage value, and the second driving voltage is the other of the high gray scale voltage value and the low gray scale voltage value;

wherein the data driving unit is specifically configured to load the first driving voltage and the second driving voltage alternately as per every sub-pixel along a data line direction, and load the first driving voltage and the second driving voltage alternately as per every two sub-pixels along the scan line direction.

12. A method for driving a pixel matrix, the pixel matrix comprising a plurality of sub-pixels arranged in a matrix, wherein voltages applied along any one of data lines change in polarity once every two sub-pixels; any one of the data lines controls voltage inputs of two adjacent sub-pixels in a row, which are arranged in a scan line direction and respectively directly connected to two sides of the data line; the two adjacent sub-pixels in the row are opposite to each other in position and have opposite polarities, and the method comprises:

receiving an image data, and acquiring original pixel data according to the image data;

generating a first driving voltage and a second driving voltage according to the original pixel data; and loading the first driving voltage and the second driving voltage alternately as per every sub-pixel along the data line direction, and loading the first driving voltage and the second driving voltage alternately as per every two sub-pixels along the scan line direction;

wherein the first driving voltage and the second driving voltage correspond to different gray voltage values, the first driving voltage is one of a high gray scale voltage value and a low gray scale voltage value, and the second driving voltage is the other of the high gray scale voltage value and the low gray scale voltage value.

* * * * *